United States Patent [19]
Nosaki et al.

[11] Patent Number: 5,627,650
[45] Date of Patent: May 6, 1997

[54] IMAGE FORMING APPARATUS HAVING ELECTRONIC SORTING BY IMAGE ROTATION

[75] Inventors: Takefumi Nosaki, Odawara; Hironobu Machida, Tokyo; Kouichi Watanabe; Kazuo Sasama, both of Kawasaki, all of Japan

[73] Assignee: Kabushiki Kaisha Toshiba, Kanagawa-ken, Japan

[21] Appl. No.: 309,906

[22] Filed: Sep. 21, 1994

[30] Foreign Application Priority Data

Sep. 24, 1993 [JP] Japan ................................. 5-258919

[51] Int. Cl.⁶ ............................ H04N 1/23; H04N 1/387; G03G 21/00
[52] U.S. Cl. ........................ 358/296; 358/444; 399/408
[58] Field of Search ........................... 358/296, 300, 358/401, 404, 406, 444, 448, 452, 488, 496, 498; 395/115, 116, 137; 355/244, 318–321, 323, 324; 382/297

[56] References Cited

U.S. PATENT DOCUMENTS

| | | | |
|---|---|---|---|
| 4,733,275 | 3/1988 | Sugiura et al. | 358/300 X |
| 4,763,165 | 8/1988 | Watanabe et al. | 355/324 |
| 4,814,822 | 3/1989 | Acquaviva et al. | 355/244 |
| 5,117,266 | 5/1992 | Takemura et al. | 355/321 |
| 5,220,431 | 6/1993 | Yamagguchi | 358/296 |
| 5,239,388 | 8/1993 | Matsumoto | 358/296 X |
| 5,301,036 | 4/1994 | Barrett et al. | 382/297 |
| 5,333,057 | 7/1994 | Marikawa et al. | 358/296 |

*Primary Examiner*—Eric Frahm
*Attorney, Agent, or Firm*—Limbach & Limbach

[57] ABSTRACT

An image forming apparatus has a function for recognizing a sorting mode, a function of recognizing a copy specification, a function of storing an original image, and a function of rotating this stored image. The apparatus has a function of alternately outputting sets of copy sheets in an angular difference of about 90° in accordance with the copy specifications. An operator can discriminate the sets of copy sheets from each other using landscape and portrait copy sheets without using a mechanical sorter mechanism. When a binding unit is added to this image forming apparatus, the apparatus has a function of reversing the reading order of the pages of each set to reproduce the images and alternately binding and outputting the copy sheets at an angular interval of about 90° in units of sets.

9 Claims, 62 Drawing Sheets

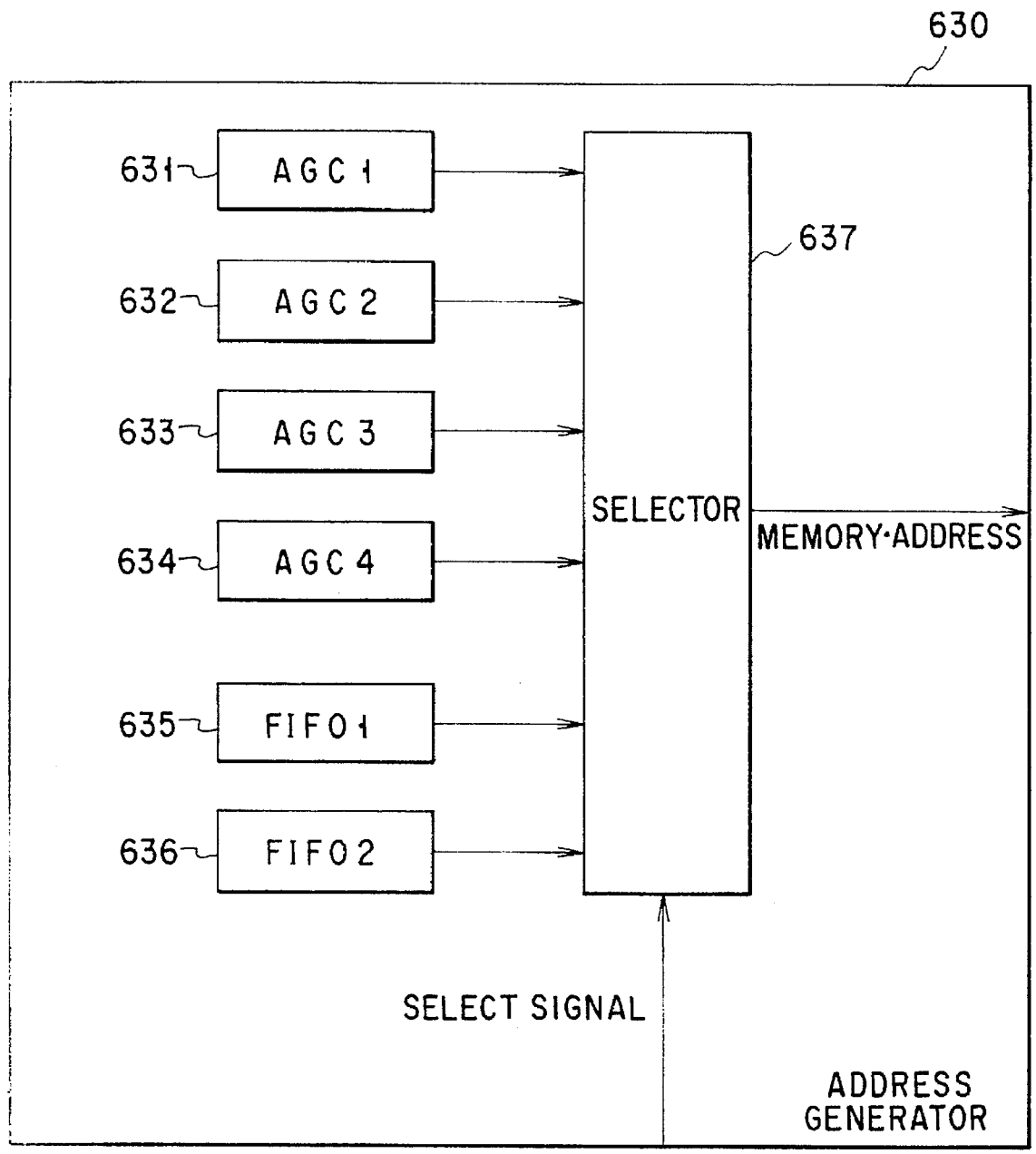
F I G. 6

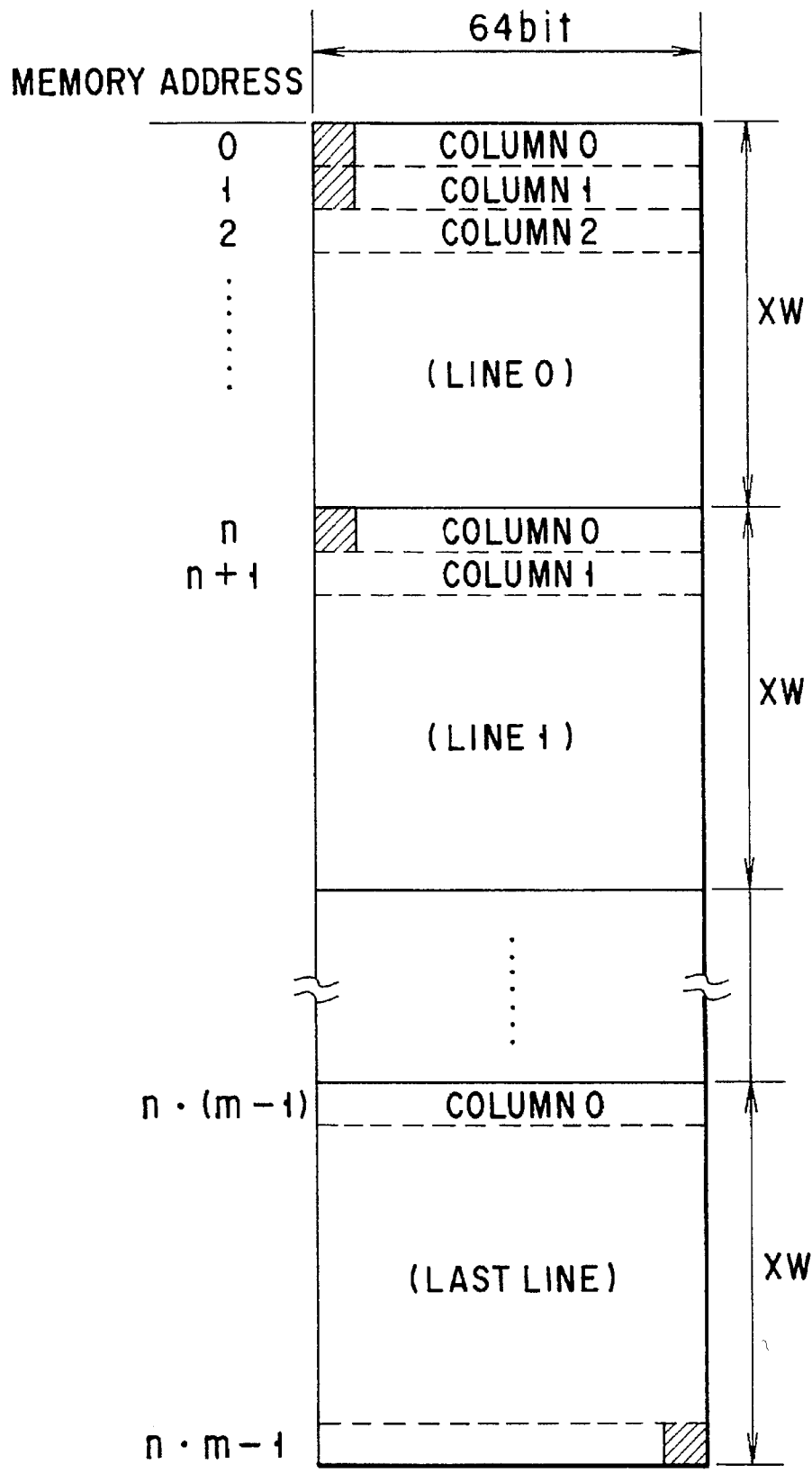
F I G. 10

| 4 BITS/PIXEL | EIGHTH PIXEL | SEVENTH PIXEL | SIXTH PIXEL | FIFTH PIXEL | FOURTH PIXEL | THIRD PIXEL | SECOND PIXEL | FIRST PIXEL | |
|---|---|---|---|---|---|---|---|---|---|
| BIPD | (31) | (27) | (23) | (19) | (15) | (11) | (07) | (03) | ←─ PXD7 |
| BIPD | (30) | (26) | (22) | (18) | (14) | (10) | (06) | (02) | ←─ PXD6 |
| BIPD | (29) | (25) | (21) | (17) | (13) | (09) | (05) | (01) | ←─ PXD5 |
| BIPD | (28) | (24) | (20) | (16) | (12) | (08) | (04) | (00) | ←─ PXD4 |

| 1 BIT / PIXEL | 32ND PIXEL | 31ST PIXEL | 30TH PIXEL | ... | THIRD PIXEL | SECOND PIXEL | FIRST PIXEL | |
|---|---|---|---|---|---|---|---|---|
| BIPD | (31) | (30) | (29) | | (02) | (01) | (00) | ←─ PXD7 |
| | 0 | 0 | 0 | | 0 | 0 | 0 | ←─ PXD6 |
| | 0 | 0 | 0 | | 0 | 0 | 0 | ←─ PXD5 |
| | 0 | 0 | 0 | | 0 | 0 | 0 | ←─ PXD4 |

F I G. 14

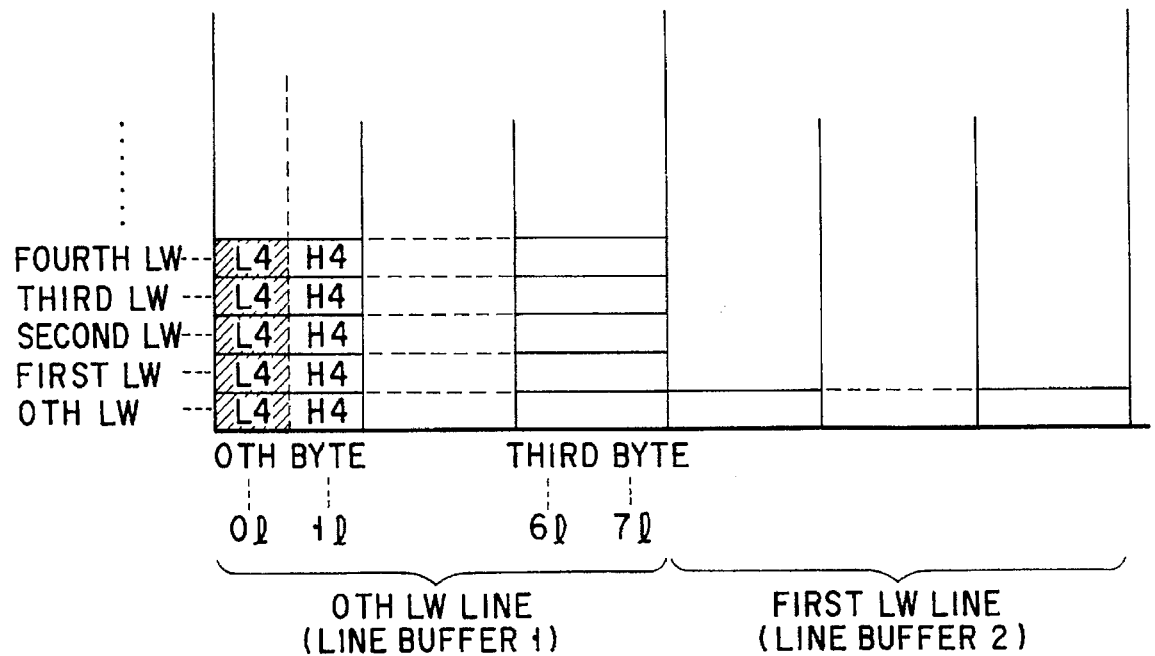
F I G. 15A
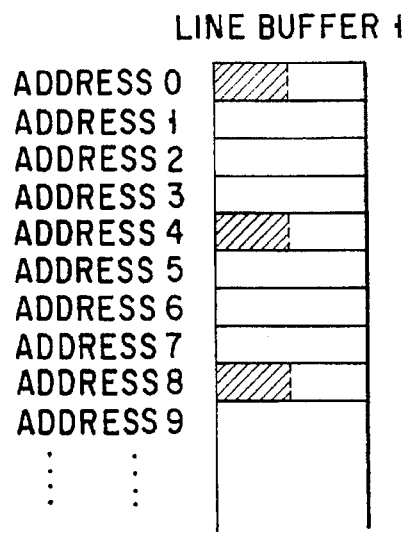
F I G. 15B
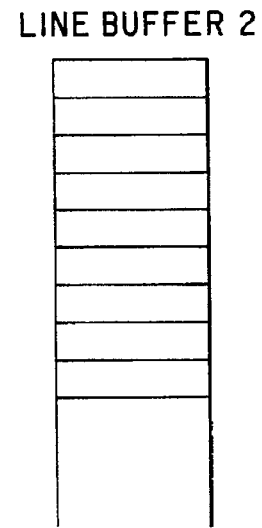
F I G. 15C

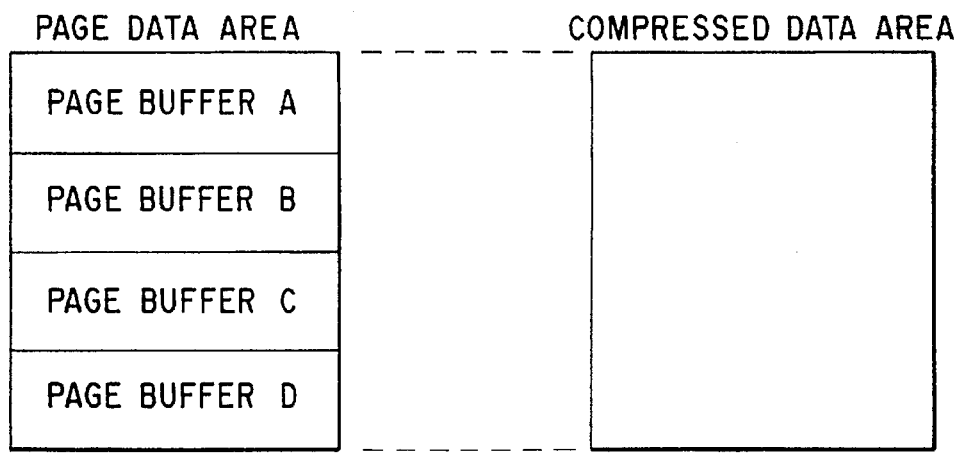
F I G. 17
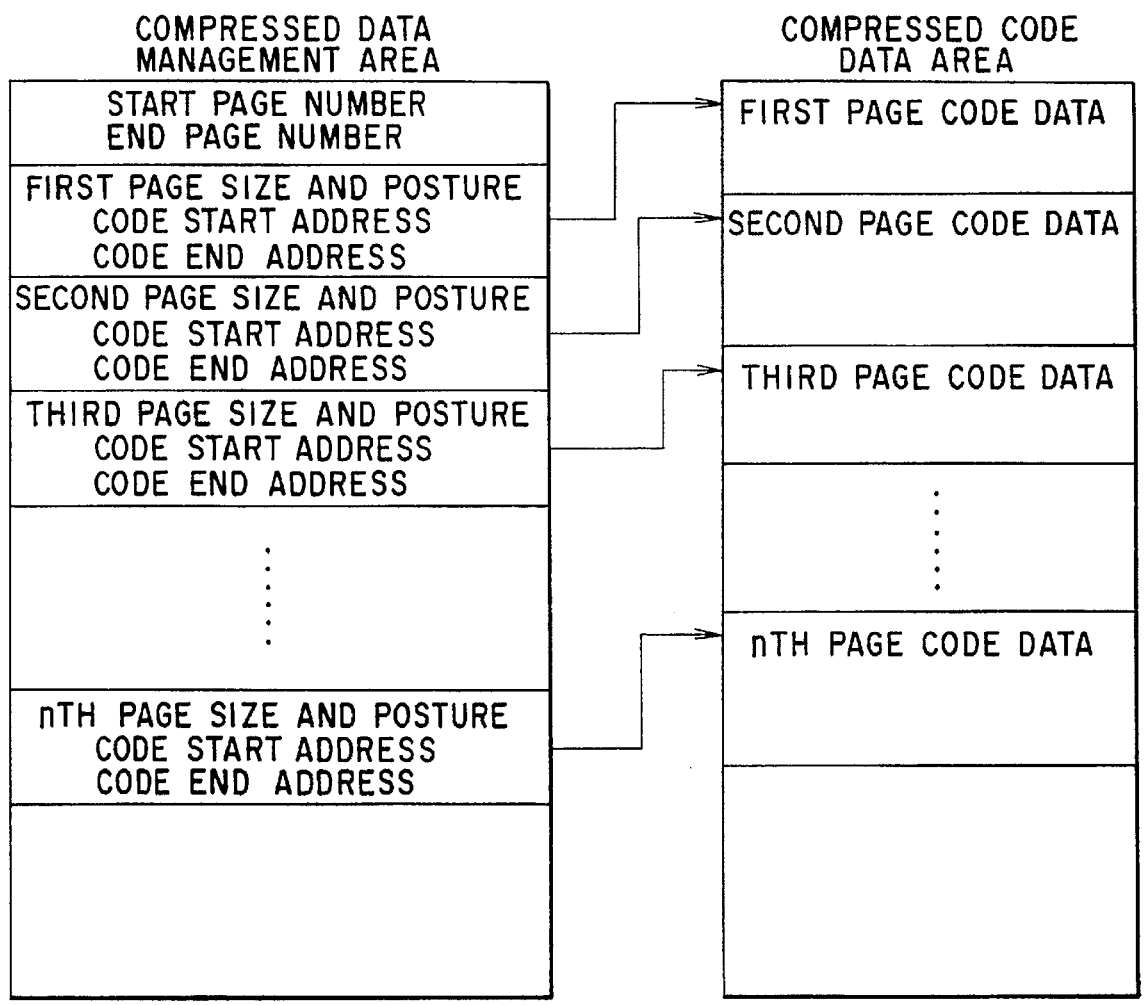
F I G. 18

VERTICAL ALIGNMENT OF LANDSCAPE ORIGINAL IN SUBSCANNING DIRECTION

VERTICAL ALIGNMENT OF PORTRAIT ORIGINAL IN MAIN SCANNING DIRECTION

VERTICAL ALIGNMENT OF LANDSCAPE ORIGINAL IN MAIN SCANNING DIRECTION

VERTICAL ALIGNMENT OF PORTRAIT ORIGINAL IN SUBSCANNING DIRECTION

EVEN-NUMBERED SHEET

ODD-NUMBERED SHEET

FIG. 32A EVEN-NUMBERED SHEET

FIG. 32B ODD-NUMBERED SHEET

EVEN-NUMBERED SHEET

ODD-NUMBERED SHEET (ONE-SIDE PRINTING IN REPRODUCTION)

EVEN-NUMBERED SHEET

ODD-NUMBERED SHEET

EVEN-NUMBERED SHEET

ODD-NUMBERED SHEET (ONE-SIDE PRINTING IN REPRODUCTION)

EVEN-NUMBERED SHEET

ODD-NUMBERED SHEET (ONE-SIDE PRINTING AND ADD REVERSAL)

EVEN-NUMBERED SHEET

ODD-NUMBERED SHEET

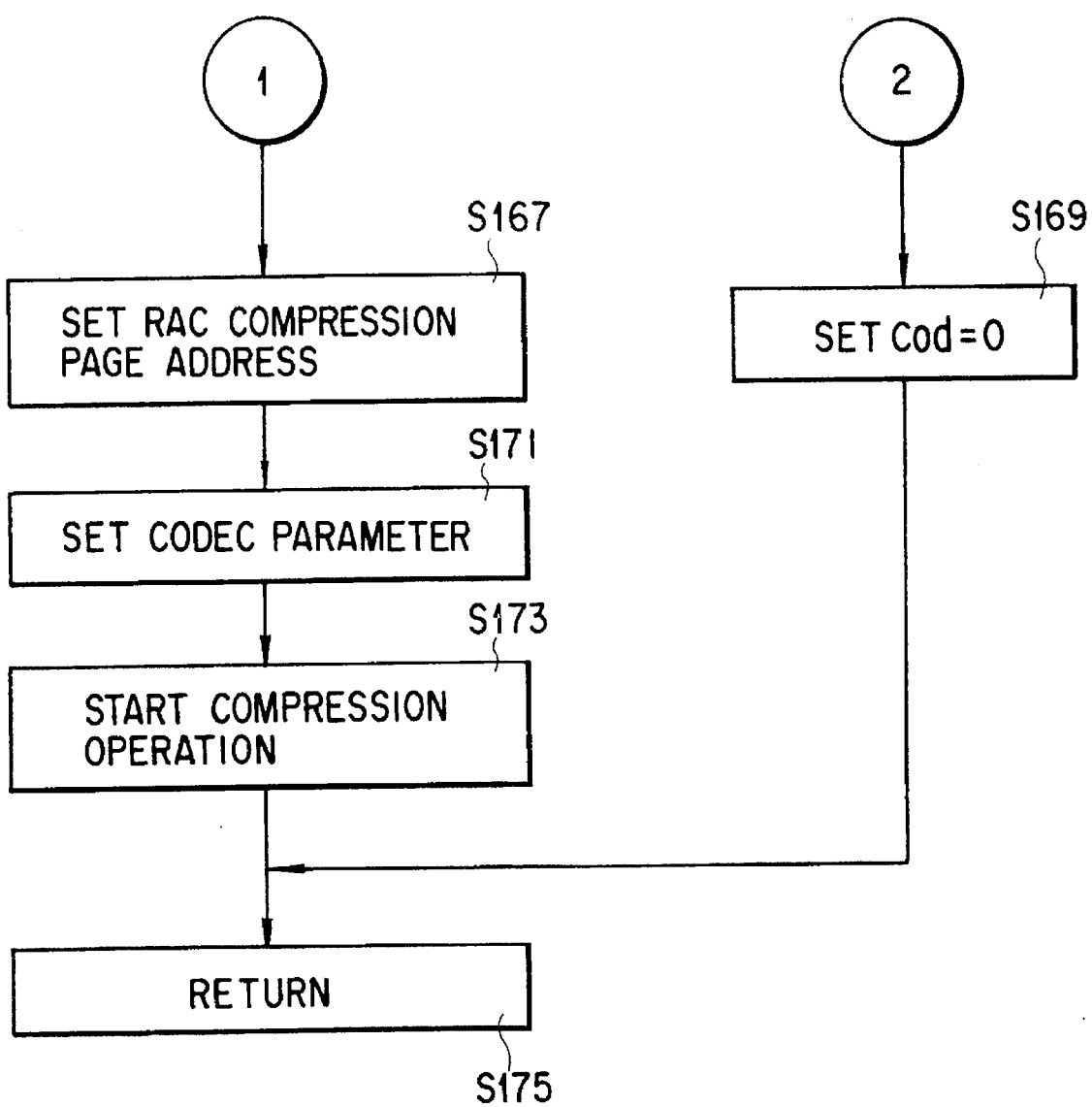
F I G. 54B

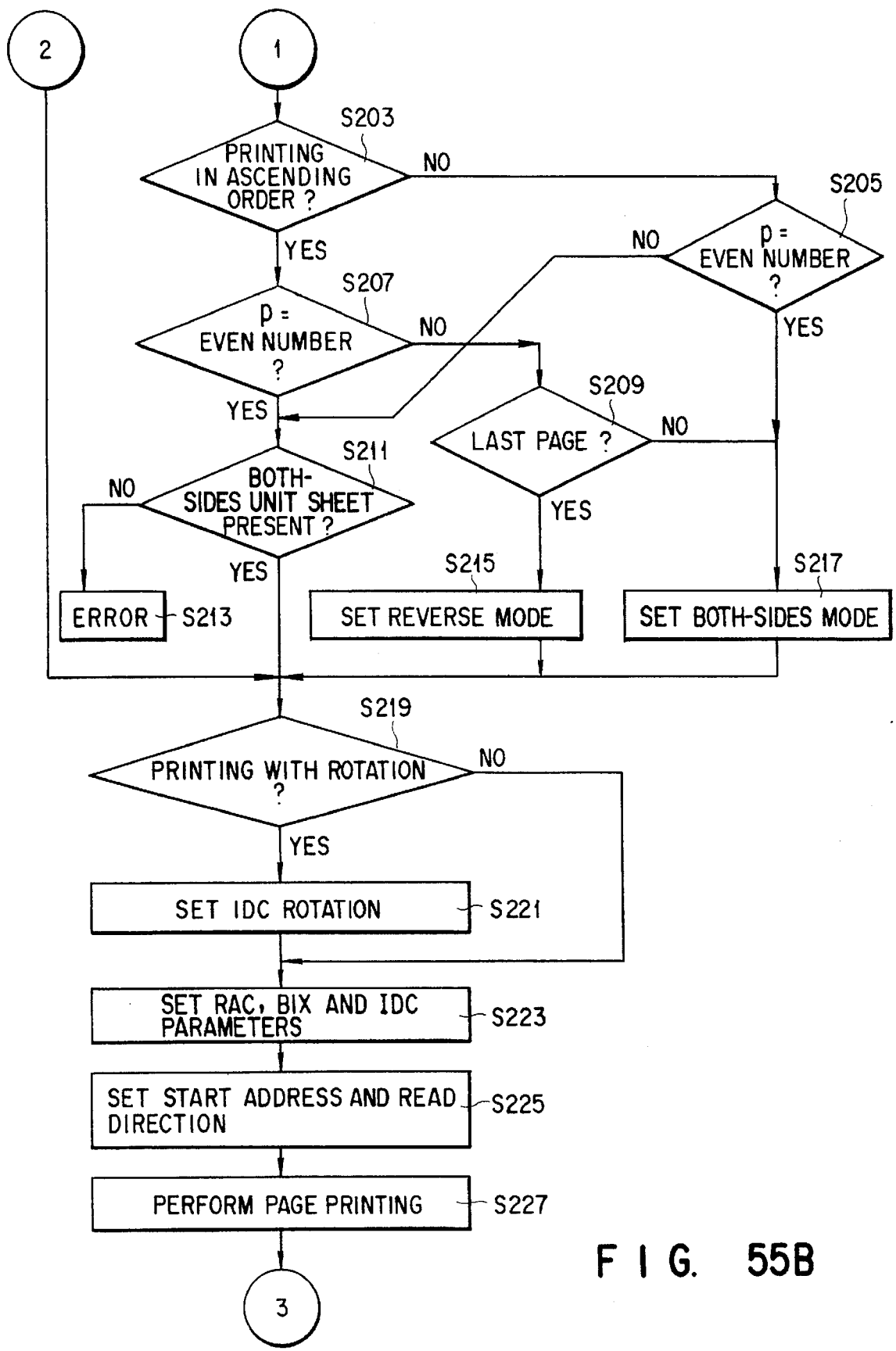
F I G. 55B

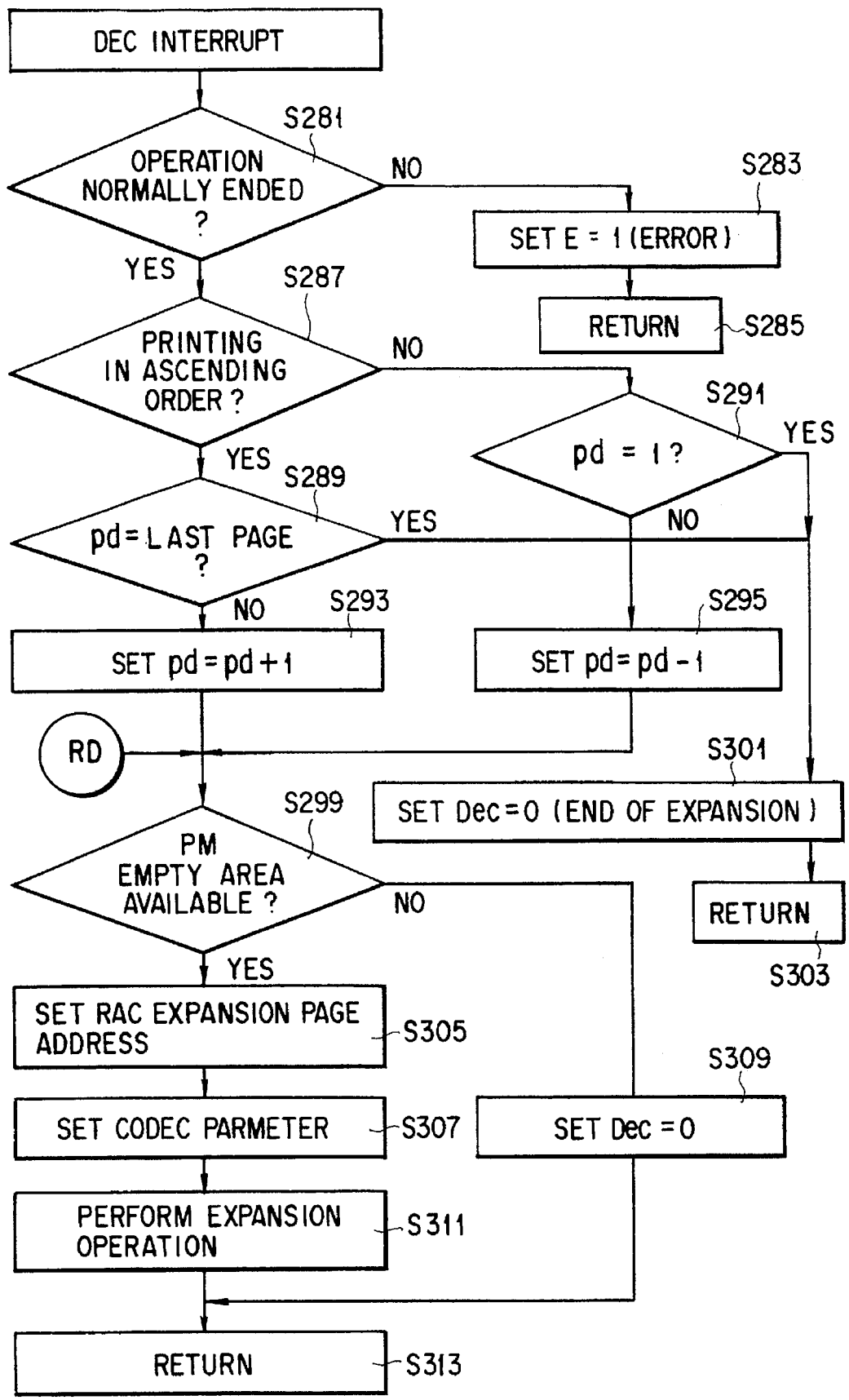
F I G. 57

IMAGE FORMING APPARATUS HAVING ELECTRONIC SORTING BY IMAGE ROTATION

BACKGROUND OF THE INVENTION

1. Field of the Invention

The present invention relates to an image forming apparatus having a sorting function, such as a digital copying machine.

2. Description of the Related Art

In recent years, a digital copying machine for causing a scanner to read an image from an original, storing the read image in a memory, reading out the image stored in the memory, and causing an image forming unit such as a laser printer to print out the image on a sheet has been put into practice.

The above image forming apparatus uses a mechanical sorter mechanism in copying originals as a plurality of pages for a predetermined number of persons. However, this sorter mechanism is structurally complicated, causes a failure, results in an increase in weight of the apparatus, and avoids a reduction in cost.

A digital copying machine having a stapler mechanism for automatically binding the sheets having images thereon is also used. However, the stapling positions vary depending on various copying specifications, thus posing a problem.

SUMMARY OF THE INVENTION

It is an object of the present invention to provide an image forming apparatus for realizing low-cost, smooth sorting in accordance with electronic image processing without providing a mechanical sorter mechanism.

It is another object of the present invention to provide an image forming/storage apparatus capable of automatically binding, with a stapler, a plurality of sets of copy sheets copied in various copy modes, upon properly rotating the stored original images.

In order to achieve the above objects of the present invention, there is provided an image forming apparatus comprising: means for storing a plurality of image data; means for sequentially reading the plurality of image data stored in the storing means, the reading means having first reading means for reading out the image data in the same direction as a data storage direction of the storing means and second reading means for receding the image data through about 90° with respect to the data storage direction of the storing means; means for forming an imaging corresponding to the image data read by the reading means on an image forming medium; means for supplying the image forming medium formed the image by the image forming means, the supply means having first supply means for supplying the image forming medium in a first direction and second supply means for supplying the image forming medium in a second direction substantially perpendicular to the first direction; means for designating image formation of a plurality of sets for the plurality of image data stored in the storing means; first control means for controlling the reading means so as to alternately switch the first and the second reading means in units of sets when the image data are sequentially read out from the storing means upon designation from the designating means; and second control means for controlling the supply means so as to alternately switch the first and the second supply means in units of sets upon the designation from the designating means.

In order to solve the above problem, the present invention also has the following structure.

The present invention provides an image forming apparatus obtained by adding a stapling function to the above image forming apparatus. That is, there is provided an image forming apparatus for forming an original image of a first medium having a vertical direction on second media in a plurality of predetermined specifications, comprising: first means for determining whether a sorting mode for repeatedly forming, by a predetermined number of sets, a plurality of the second media on which the original images on a plurality of the first media are formed is selected; second means for determining a specific one of the plurality of predetermined specifications; means for scanning the original image on the first medium, the scanning means scanning the original images on all the first media if the first determining means determines that the sorting mode is selected; means for storing the original image obtained by the scanning means, the storing means storing all original images to be formed if the first determining means determines that the sorting mode is selected; means for binding one end of each of a plurality of the second media having images formed thereon and the same binding direction; third means for determining an angular difference in the binding direction of the binding means and the vertical direction of the original image in the storing means if the first determining means determines that the sorting mode is selected; fourth means for determining to form an angular difference of about 90° for each set upon formation of the original images on the second media constituting the predetermined number of sets and determining a rotation angle of the original image in the storing means so as to eliminate the angular difference determined by the third determining means in correspondence with the copy specification determined by the second determining means if the first determining means determines that the sorting mode is selected; means for reading out the original image in accordance with the rotation angle determined by the fourth determining means if the first determining means determines that the sorting mode is selected; means for determining a readout order of the original image stored in the storing means regardless of a storage order, the readout order being determining such that copy results are bound in the same direction when the vertical directions of the original images are aligned in the same direction and the copy results are bound by the binding means; and means for forming the original image stored in the storing means on the second medium in accordance with the readout order determined by the readout order determining means, thereby causing the forming means to form the second media having the original images formed in the same direction and constituting the predetermined number of sets respectively having the angular difference of about 90° so as to correspond to the copy specification determined by the second determining means and match the binding direction of the binding means if the first determining means determines that the sorting mode is selected.

The above image forming apparatus has the following functions and effects due to the above structure.

In the former image forming apparatus, when image data stored in the storing means are to be copied and output in a plurality of sets, the image data are alternately read out under the control of the first control means by the first readout means for reading out the stored image data in the forward direction and the second readout means for rotating the image data through about 90° and reading out the rotated image data. These data are formed on the image forming media by the image forming means. Under the control of the second control means, the image forming media are alternately supplied by the first supply means for supplying the image forming medium and the second supply means for rotating the image recording medium through about 90° and supplying the rotated image forming medium. Therefore, when image formation for a plurality of sets is performed, the adjacent sets of the image forming media are stacked, output, and supplied at an angular difference of about 90°.

In the latter image forming apparatus, when the first determining means determines that the sorting mode is selected, the third determining means determines the rotational direction and rotation angle (normally 0° or about 90°) of the original images in consideration of the copy specification from the second determining means in such a manner that output directions of the adjacent sets of second media constituting the predetermined number of sets have an angular difference of about 90°. A rotating means rotates the original image in accordance with the determination by the third determining means, and the image forming means obtains landscape and portrait copy sheets which are rotated through about 90° in units of sets. The operator can obtain the sorted copy sheets whose adjacent ones of the predetermined number of sets can be easily distinguished from each other without using a mechanical sorter mechanism. In addition, the image forming apparatus also has the binding means. The fourth means rotates the original image also in consideration of the binding direction of the binding means. In this image forming apparatus, the binding positions of the stapler and the directions of the original images on the copy sheets can be aligned.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6 is a schematic block diagram showing an address generator;

FIG. 10 is a view showing the two-dimensional memory of the page memory in a linear address expression;

FIG. 14 is a view showing conversion in a pixel converter;

FIGS. 15A to 15C are views for explaining the operation of a rotation processor for 4 bits/pixel;

FIG. 17 is a view for explaining a storage example of the page memory;

FIG. 18 is a view for explaining another storage example of the page memory;

FIGS. 32A to 32D are views for explaining still another storage direction or still another read start position or read direction of each image in the page memory;

FIGS. 54A and 54B are flow charts for explaining a COD interrupt routine as one of the reproduction operations of the image forming/storage apparatus according to the present invention;

FIGS. 55A to 55C are flow charts for explaining a print routine as one of the reproduction operations of the image forming/storage apparatus according to the present invention;

FIG. 57 is a flow chart for explaining a DEC interrupt routine as one of the reproduction operations of the image forming/storage apparatus according to the present invention.

DETAILED DESCRIPTION OF THE PREFERRED EMBODIMENTS

An embodiment of the present invention will be described with reference to the accompanying drawings.

Figure 1A:
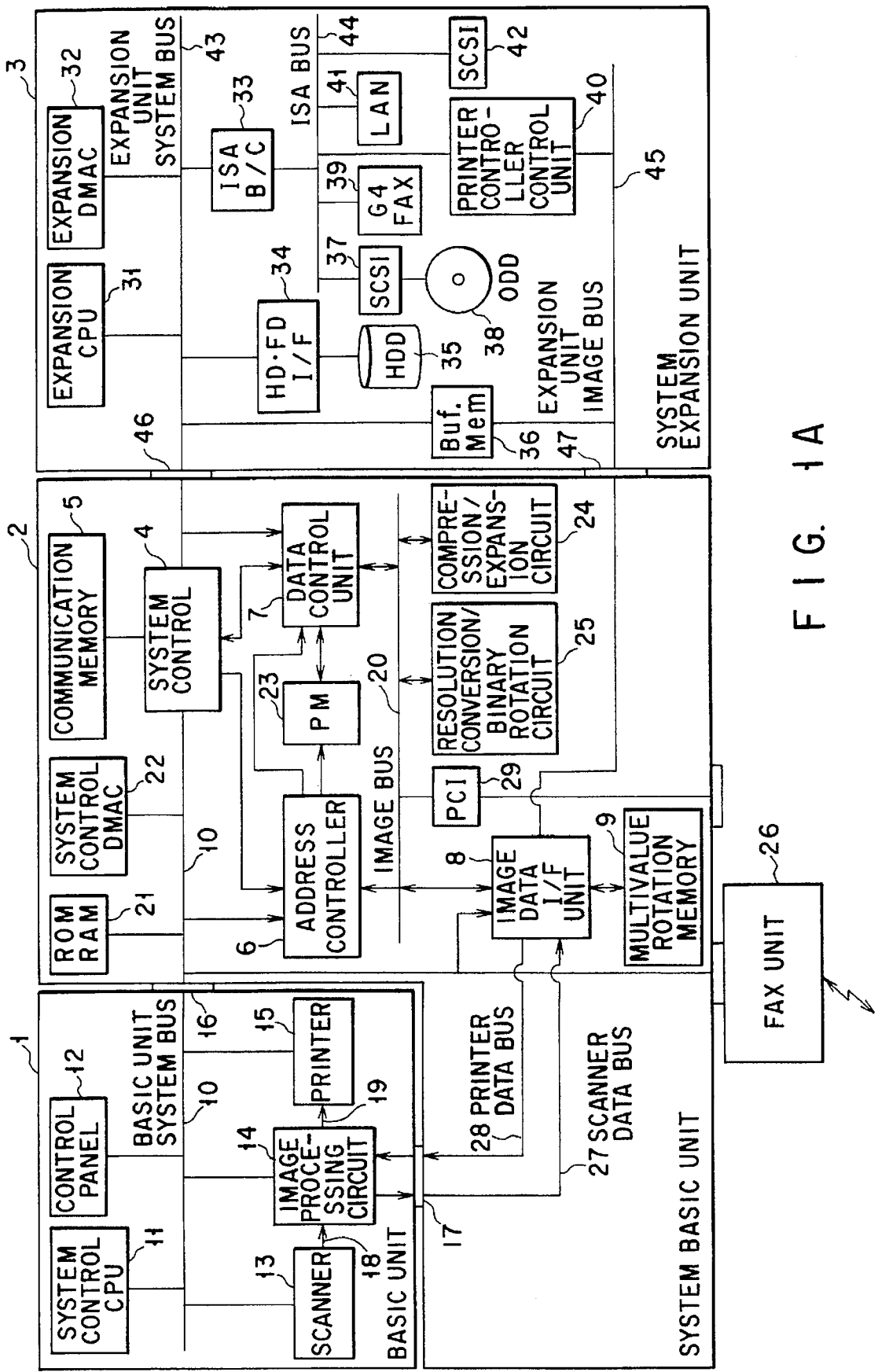
FIG. 1A is a block diagram showing the overall arrangement of an image forming/storage apparatus according to an embodiment of the present invention.

FIG. 1A is a schematic block diagram showing an image forming/storage apparatus according to an embodiment of the present invention.

The image forming/storage apparatus comprises three systems, i.e., a basic unit 1, a system basic unit 2, and a system expansion unit 3. The basic unit 1 executes a basic copy function. The system basic unit 2 has a temporary storage means (page memory: PM) 23 for temporarily storing image data in connection of this apparatus with another system, and temporarily storing image data to be edited and processed, thereby copying this image. The system expansion system 3 has a storage means (ODD: Optical Disk Drive) 38 for electronically and semi-permanently storing image data input from the basic unit 1, and a control means for converting image data and control data into a control system and an image format of another system when the apparatus exchanges the image data or control data with this another system.

The basic unit 1 and the system basic unit 2 are connected through a basic unit system interface 16 for exchanging control data and a basic unit image interface 17 for exchanging image data. The system basic unit 2 and the system expansion unit 3 are connected through an expansion unit system interface 46 for exchanging control data and an expansion unit image interface 47 for exchanging image data. The basic unit 1 and the system expansion unit 3 are not directly connected to each other and always exchange control and image data through the system basic unit 2.

The system expansion system 3 can be disconnected from the system basic unit 2 at the expansion unit system interface 46 and the expansion unit image interface 47. The system basic unit 2 can be disconnected from the basic unit 1 at the basic unit system interface 16 and the basic unit image interface 17.

Figure 1B:
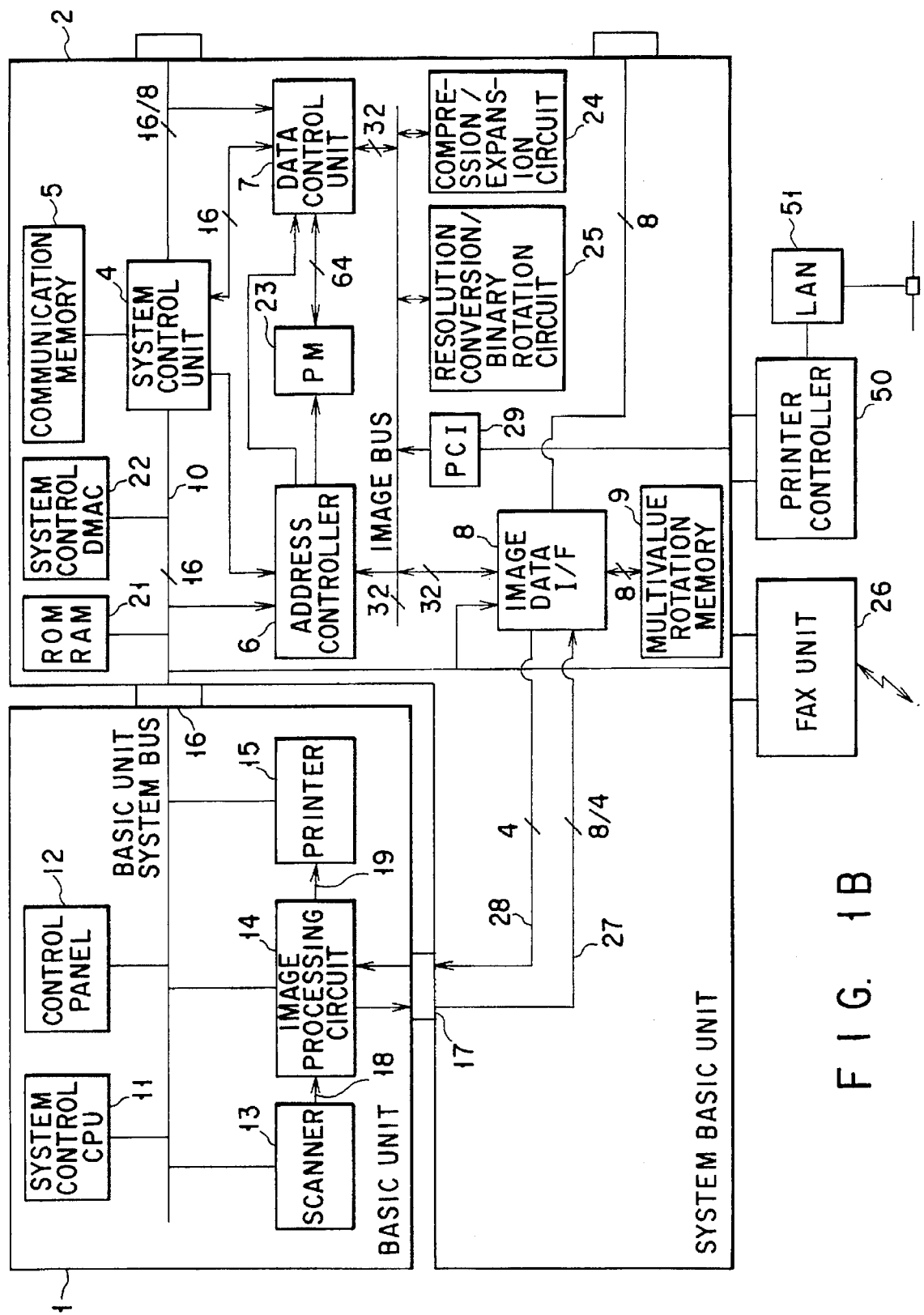
FIG. 1B is a block diagram showing the overall arrangement of the image forming/storage apparatus.

The image forming/storage apparatus takes three forms in accordance with the presence/absence of the system basic unit 2 and the system expansion unit 3. The first form is constituted by only the basic unit 1. In this arrangement, the basic function is a copy function. Copy processes accompanying simple editing processes, such as an enlargement/reduction process and a masking/trimming process can be performed. As shown in FIG. 1B, the second form is constituted by connecting the system basic unit 2 to the basic unit 1. In this arrangement, in addition to the copy functions of the basic unit 1, editing processes such as an image rotation process and a process for synthesizing a plurality of images can be performed using the page memory 23 for temporarily storing image data. In addition to the system expansion unit 3, the system basic unit 2 can be connected, through a local area network line control means (LAN) 51, to a FAX unit (FAX board) 26 serving as a communication line control means for a facsimile machine and a printer controller 50 using an output means (printer) 15 of the basic unit 1 as a remote printer of a control device such as an external personal computer. An image can be transmitted from the FAX unit 26 to another system or device through a communication line or received through the reverse path. The received image data is sent to the basic unit 1 and visualized at the printer 15. As shown in FIG. 1A, the third form is obtained by connecting the basic unit 1, the system basic unit 2, and the system expansion unit 3 to each other. In this arrangement, in addition to the functions of the first and second forms, the following functions can be performed: a data storage/management function of electronically and semi-permanently storing image data and managing the stored image data; a transmission/reception function of transmitting an image from the local area network line control means (LAN) 41 to another system or device through a LAN line and receiving the image data from another system or device through the LAN 41; and a printer function of converting a print control code sent from a personal computer through a general interface into image data and outputting and printing the image data at the printer 15 of the basic unit 1 through the page memory 23 as the temporary storage means of the system basic unit. The internal arrangements of the three systems will be generally described below.

The basic unit 1 comprises an input means (scanner) 13, the output means (printer) 15, an image processing means 14, an operation/display means (control panel) 12, and a control means (system control CPU) 11 for controlling these components.

The scanner 13 has a CCD line sensor 71 (to be described later) having a plurality of light-receiving elements constituting one line. The scanner 13 reads an image of an original O placed on an original table 63 line by line in accordance with an instruction from the control means 11, converts an image density into 8-bit digital data, and outputs it as a time-series digital data together with a sync signal to the image processing means 14 through a scanner interface 18.

Figure 3:
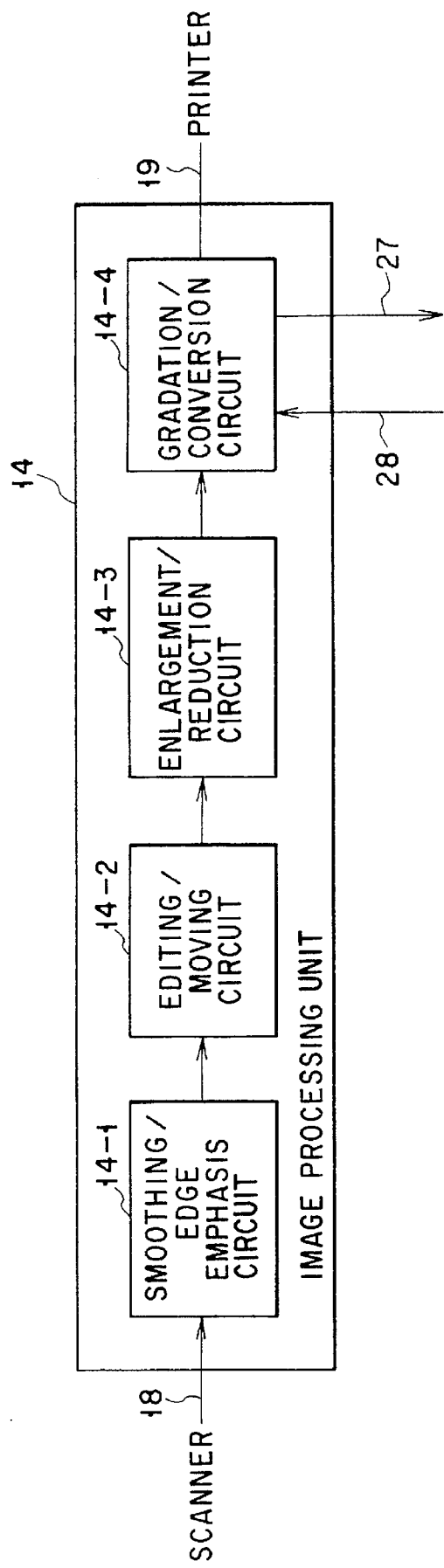
FIG. 3 is a schematic block diagram showing an image processing means.

The schematic arrangement of the image processing means 14 is shown in FIG. 3. A smoothing/edge emphasis means 14-1 causes a smoothing circuit to remove noise mixed during image reading and causes an edge emphasis circuit to emphasize the edge blurred by smoothing. An editing/moving means 14-2 is a simple editing processing block for each line. For example, the editing/moving means 14-2 performs a movement process and a masking/trimming process in the direction of line. An enlargement/reduction means 14-3 performs an enlargement/reduction process using a pixel repetition process corresponding to a designated magnification or a combination of an extraction process and an interpolation process. A gradation conversion means 14-4 performs gradation conversion of image data (8 bits/pixel) read by the scanner 13 into a designated gradation level in accordance with an area gradation technique. The gradation-converted image data is image data (4 bits/pixel) corresponding to the bit count of the printer 15 and is sent to the system basic unit 2 through the printer 15 or a scanner data bus 27 or the basic unit image interface 17. The nonlinear characteristics of the input/output characteristics of the printer 15 are corrected simultaneously with the gradation process using the area gradation technique.

The operation/display means (control panel) 12 comprises an operation unit for setting operating modes and parameters of the image forming/storage apparatus and a display unit for displaying a system state or an image stored in the page memory 23 of the system basic unit 2.

The control means 11 controls the above means and the respective means (to be described below) of the system basic unit 2. The system basic unit 2 comprises a system control means 4, the storage means (page memory) 23, an address controller 6, an image bus 20, a data control means 7, an image data I/F means 8, a resolution conversion/binary rotation means 25, a compression/expansion means 24, a system memory (ROM/RAM) 21, a DMA controller (system control DMAC) 22, a printer controller interface (PCI) 29, a communication memory 51, and a multivalue rotation memory 9. The system control means 4 controls communication of control information between the control means 11 in the basic unit 1 and a control means (expansion CPU) 31 in the system control unit 3 and controls access from the basic unit 1 and the system expansion unit 3 to the page memory 23. The page memory 23 temporarily stores image data. The address controller 6 generates an address to the page memory 23. The image bus 20 allows data transfer between devices in the system basic unit 2. The data control means 7 controls data transfer between the page memory 23 and another device through the image bus 20. The image data I/F means 8 interfaces the image data when image data is transferred to the basic unit 1 through the basic unit image interface 17. The resolution conversion/binary rotation means 25 converts image data into a resolution of a partner device when the image data is to be transmitted to the partner device having a resolution different from that of the apparatus, converts the resolution of the image data received from the partner device having a resolution different from that of the apparatus into the resolution of the printer 15 of the basic unit 1, and performs a 90° rotation process of binary image data. The compression/expansion means 24 sends the compressed image data as in facsimile transmission or storage using an optical disk, compresses the image data input to a storage device, and expands the compressed image data to visualize it through the printer 15. The system memory (ROM/RAM) 21 includes a FONT memory storing character fonts, a work memory for temporarily storing control information used by the control means 11, and a program memory storing programs executed using the system basic system 2. The system control DMAC 22 performs high-speed data transfer between the devices through the basic unit system bus 10. The PCI 29 interfaces the control information and image data when the control information is to be exchanged between the printer controller 50 and the control means 11 and the image data is transferred between the printer controller 50 and the image bus 20. The communication memory 5 is connected to the system control means 4 to store control information when the control information is to be exchanged between the control means 11 and the control means 31 in the system expansion unit 3. The multivalue rotation memory 9 is connected to the image data I/F means 8 and used to rotate the image data through 90° or 180° and output the rotated data when the image data is to be output from the printer 15. The FAX unit 26 and the printer controller control means 50 are optionally connected to this system basic unit 2. The respective means in the system basic unit 2 will be described in detail later.

The system expansion unit 3 comprises the control means (expansion CPU) 31, a DMA controller (expansion DMAC) 32, a general ISA bus 44, an ISA bus controller (ISA·B/C) 33, a storage means (HDD/FDD) 35, its HD/FD interface (HD·FD I/F) 34, a storage means (Optical Disk Drive: ODD) 38, its SCSI interface 37, a local area network line control means 41, a printer controller control means 40, a G4·FAX control means 39, an expansion SCSI interface 42, an expansion unit image bus 45, and a buffer memory 36. The expansion CPU 31 controls the devices in the system expansion unit 3 through an expansion unit system bus 43. The expansion DMAC 32 controls data transfer on the expansion unit system bus 43. The ISA bus controller 33 interfaces the expansion unit system bus 43 and the ISA bus 44. The HDD/FDD 35 is connected to the expansion unit system bus 43 to electronically store the image data. The ODD 38 is connected to the ISA bus 44 to electrically store the image data. The LAN 41 realizes the LAN function. The printer controller control means 40 realizes the printer function. The G4-FAX control means 39 has a G4-FAX control function. The expansion SCSI interface 42 is used to connect a SCSI device. The expansion unit image bus 45 is used to output the image data from the printer controller control means to the system basic unit 2 through the expansion image interface 47. The buffer memory 36 interfaces data exchange between the expansion system bus 43 and the expansion unit image bus 45. Of all the means, the SCSI interface 37, the ODD 38, the G4-FAX control means 39, the printer controller control means 37, the LAN 41, and the expansion SCSI interface 42, all of which are connected to the ISA bus 44, are optional and detachable from the system expansion unit 3.

The storage means (ODD) 38 is connected to the ISA bus 44 through the SCSI interface 37, and the control means 31 control the storage means 38 through the expansion unit system bus 43, the ISA-B/C 33, and the ISA bus 44 using a SCSI command.

The local area network line control means (LAN) 41 comprises a line control unit for controlling communication of control data and image data with another device on the network on the basis of a protocol of the connected network system, a common memory for temporarily storing communication control data and image data from the LAN and the control data and image data from the system expansion bus, and a system expansion bus interface.

The printer controller control means 40 comprises a Centronics parallel interface for exchanging a control code and image data with a personal computer, a system expansion image bus interface for interfacing with the system expansion unit image bus 45 for transferring the bit image data to the page memory 23 in the system basic unit 2, an image data transfer controller for controlling transfer of image data in the printer controller control means 40, a control means for decoding a control code from the personal computer, signaling control information to the control means 31 through the expansion unit system bus 43 and the ISA bus 44, decoding a print control code from the personal computer, converting it into bit information, and storing the bit information in the memory in the printer controller control means 40, and a system expansion bus interface for interfacing with the ISA bus 44.

The arrangements and functions of the main means in the system basic unit 2 which serve as the basis for systematization will be described in detail below.

Figure 4:
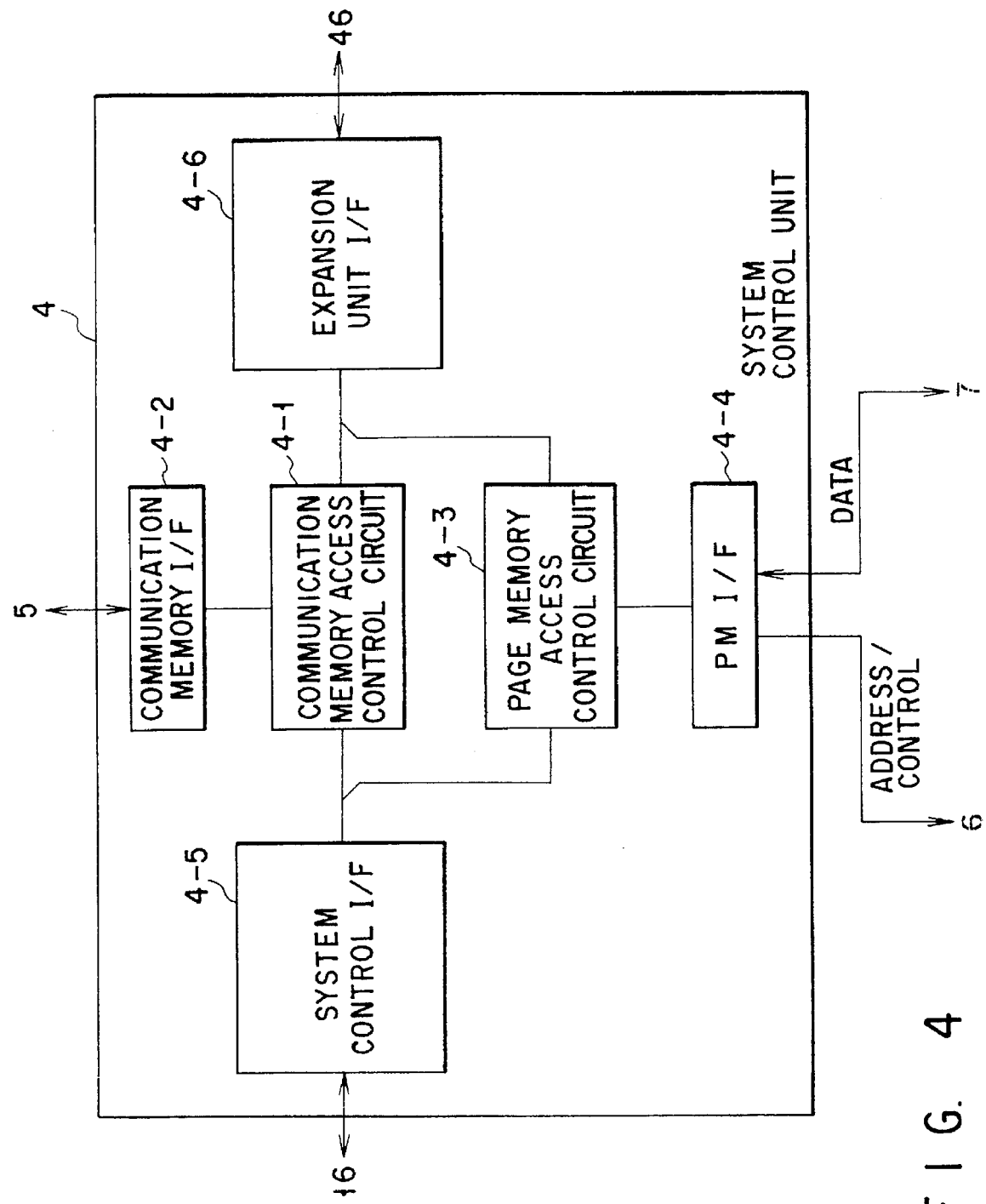
FIG. 4 is a schematic block diagram showing a system control means.

First of all, the arrangement and function of the system control means 4 will be described below. FIG. 4 is a schematic block diagram of the system control means 4. The system control means 4 comprises a communication memory access control means 4-1, a communication memory I/F 4-2, a page memory access control means 4-3, a basic unit system bus interface (system control I/F) 4-5, a system expansion bus interface (expansion unit I/F) 4-6, and a page memory interface (PM I/F) 4-4. The communication memory access control means 4-1 controls communication of control information between the control means 11 and the control means 31 in the system expansion unit 3. The communication memory I/F 4-2 interfaces with the communication memory 5. The page memory access control means 4-3 controls access from the basic unit 1 and the system expansion unit 3 to the page memory 23. The system control I/F 4-5 decodes an address simultaneously sent with the control information and the image information sent from the control means 11 of the basic unit 1 through the basic unit system bus 10 to sort the control or image information to a corresponding block in the system basic unit 2. The expansion unit I/F 4-6 decodes an address simultaneously sent with the control information and image information from the system expansion unit 3 and sorts the sent information to a corresponding block in the system control means 4. The PM I/F 4-4 interfaces image data between the page memory 23 and the page memory access control means 4-3 in the system control means 4 when a page memory accessible means (i.e., the control means 11 and the DMA controller 22 in the basic unit) on the basic unit system bus 10 or a memory accessible means (i.e., the control means 31 and the DMA controller 32 in the system expansion unit 3) on the system expansion bus 43 is to access image information in the page memory through the basic unit system bus 10.

The communication memory access control means 4-1 controls access to the communication memory 5 when the control means 11 in the basic unit 1 and the control means 31 in the system expansion unit 3 exchange a control code through the communication memory 5 connected to the communication memory access control means 4-1 through the communication memory interface 4-2 in the system control means 4. The communication memory 5 is mapped to the memory space of the control means 11 and the control means 31 in the system expansion unit. These control means can perform data read/write access to the communication memory 5 by accessing a specific area.

The DMA controller (system control DMAC) 22 in the basic unit 1 is a control means for performing high-speed hardware data transfer between the devices on the basic unit system bus 10 without going through the control means 11 in the basic unit 1.

The data transfer processes using the system control DMAC 22 include compressed data (code data) transfer between the page memory 23 and the FAX unit 26 in the FAX transmission/reception process, image data transfer between the page memory 23 and the control panel 12 to display image data from the page memory 23 on the control panel 12, and data transfer between the program ROM 21 and the control panel 12 to display an operation screen on the control panel 12.

The address controller 6 for generating an address for the page memory 23 will be described below.

Figure 5:
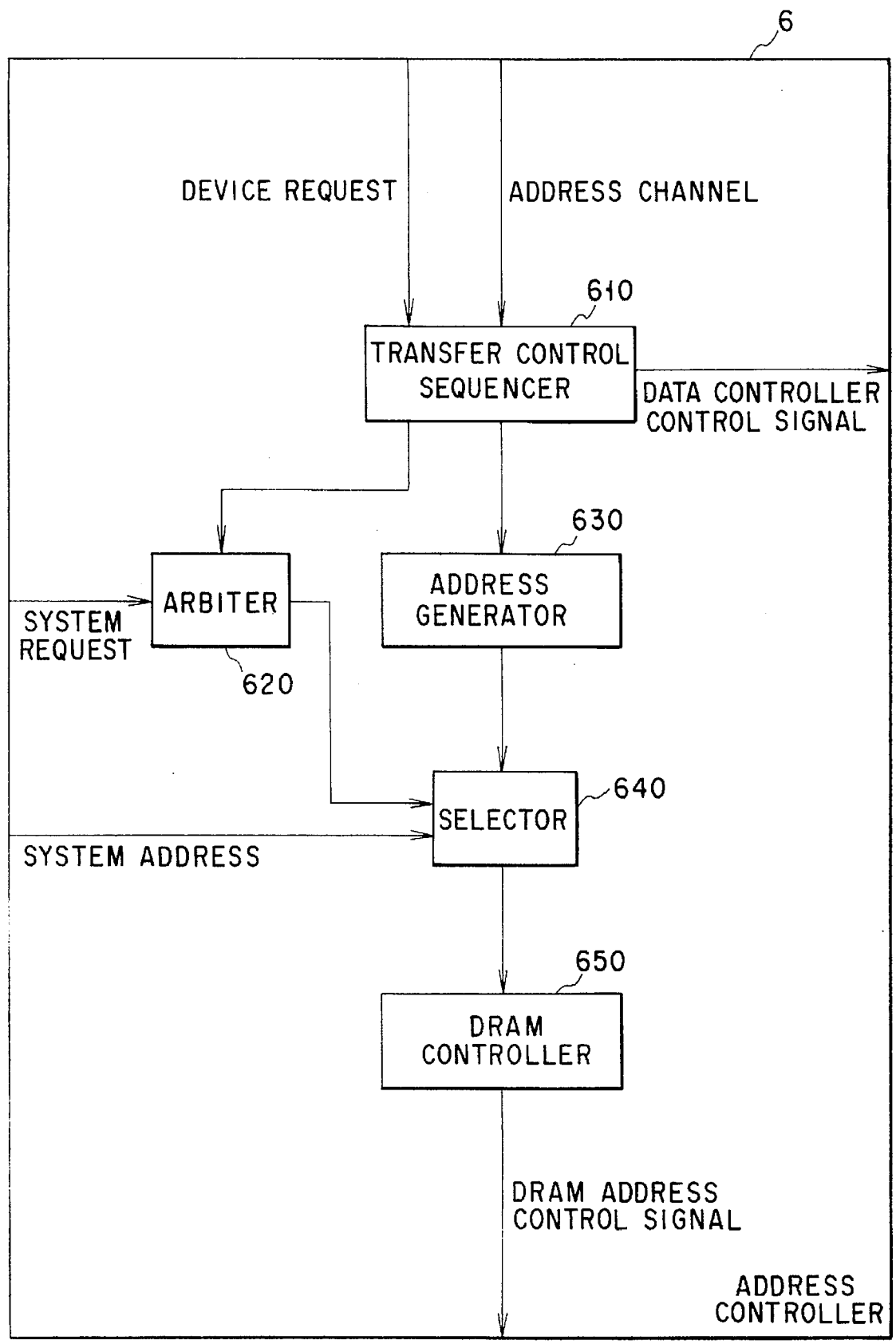
FIG. 5 is a schematic block diagram showing an address controller.

FIG. 5 is a schematic block diagram showing the address controller 6.

The address controller 6 comprises a transfer control sequencer 610, an arbiter 620, an address generator 630, a selector 640, and a DMA controller 650. The transfer control sequencer 610 executes various transfer sequences in accordance with requests from the image bus 20. The arbiter 620 arbitrates between the request on the image bus 20 and the request in the basic unit system bus 10. The address generator 630 generates various memory addresses for a plurality of channels in transfer from the image bus 20. The selector 640 selects an address output from the address generator 630 and a system address. The DRAM controller 650 generates a DMA address and a DMA control signal.

The address controller 6 receives memory access request from the two buses, i.e., the image bus 20 and the basic unit system bus 10. These requests are arbitrated by the arbiter 620, and the data transfer process of the winning request is performed.

When the request on the basic unit system bus 10 side wins, the system address selected by the selector 640 is input to the DRAM controller 650. The DRAM controller 650 translates the input address into a DRAM address and generates control signals necessary for read/write access.

The transfer control sequencer 610 also receives the request from the image bus 20 and an address channel signal and selects one of a plurality of address generators in the address generator 630. When the request on the image bus 20 side wins, the memory address of the selected channel is output from the address generator 630 to the DRAM controller 650.

FIG. 6 is a schematic block diagram of the address generator 630.

The above address generator comprises four channel two-dimensional address generators (AGC1 (631), AGC2 (632), AGC3 (633), and AGC4 (634)), two channel FIFO address generators (FIFO1 (635) and FIFO2 (636)), and a selector 637 for selecting one of the memory addresses in accordance with a channel select signal from the transfer sequencer.

Figure 7:
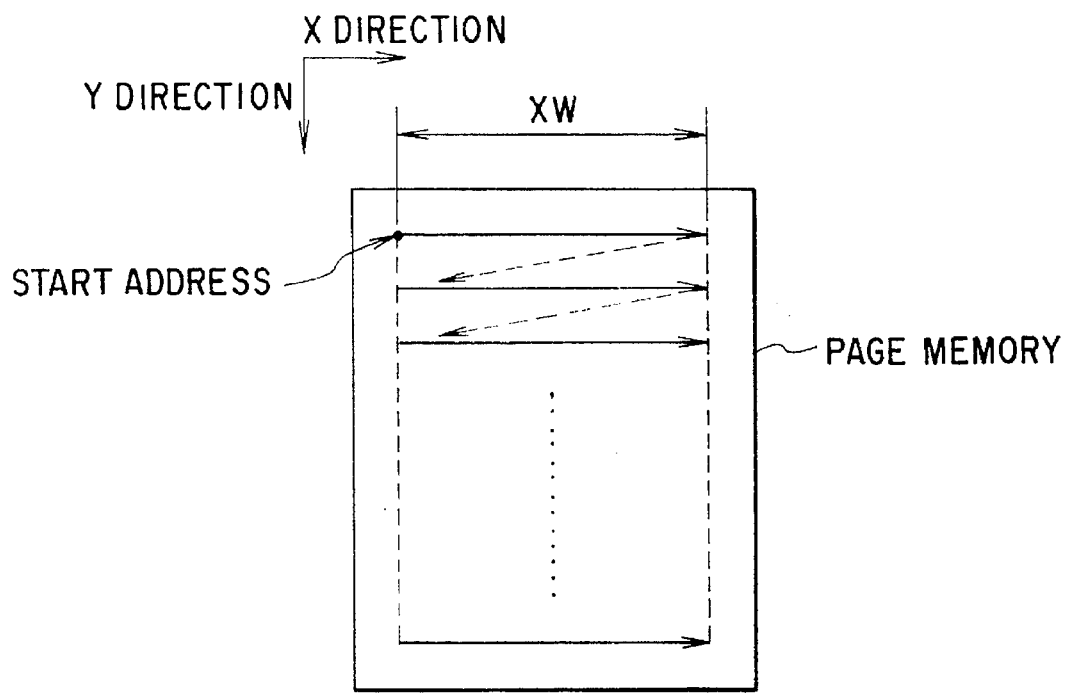
FIG. 7 is a view for explaining the contents of an address generated by a two-dimensional address generator.
Figure 8:
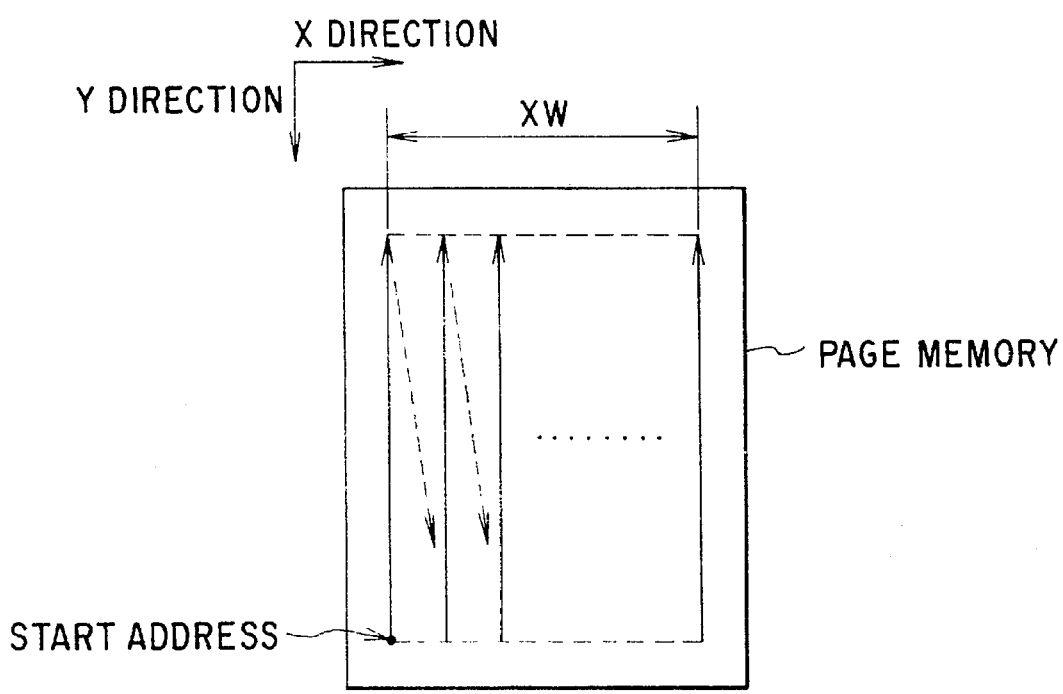
FIG. 8 is a view for explaining the contents of an address generated by the two-dimensional address generator.

The two-dimensional address generators AGC1 to AGC4 (631 to 634) can generate various addresses. For example, as shown in FIG. 7, X-direction addresses can be sequentially generated in synchronism with clock pulses from the transfer control sequencer. Y-direction addresses can be sequentially generated by changing a parameter, as shown in FIG. 8.

The start address and a one-line main scanning width (XW) can be arbitrarily set in accordance with the paper size of the original O.

When the address generators AGC capable of generating various addresses are used, transfer to an arbitrary rectangular area of the page memory 23, rotation read access, and repetitive read access can be performed. When two address generators AGC are used, image editing processes such as image movement, image rotation, portrait/landscape image conversion, image repetition, and mirror imaging between arbitrary areas of the page memory 23 can be performed.

The FIFO address generators FIFO1 and FIFO2 (635 and 636) generate FIFO addresses and FIFO control status signals which are required to operate the page memory 23 as a FIFO memory.

The status signals include a FIFO full signal (the FIFO area is full of unreadout data), a FIFO empty signal (no unreadout data is present in the FIFO area), and a FIFO half signal (the half or more of the FIFO area is full of unreadout data). The data volume and the free capacity of the FIFO can be detected by reading out data from a FIFO register under the control of the CPU.

FIFO control is performed using these status signals. In transfer of data from one device to another on the image bus or from the device on the image bus 20 to the basic unit system bus 10, differences in transfer speeds and transfer timings can be absorbed by the FIFO memory, thereby performing high-speed data transfer.

The FIFO address generators 635 and 636 are used as two channel one-dimensional address generators when FIFO control is not performed.

Figure 9:
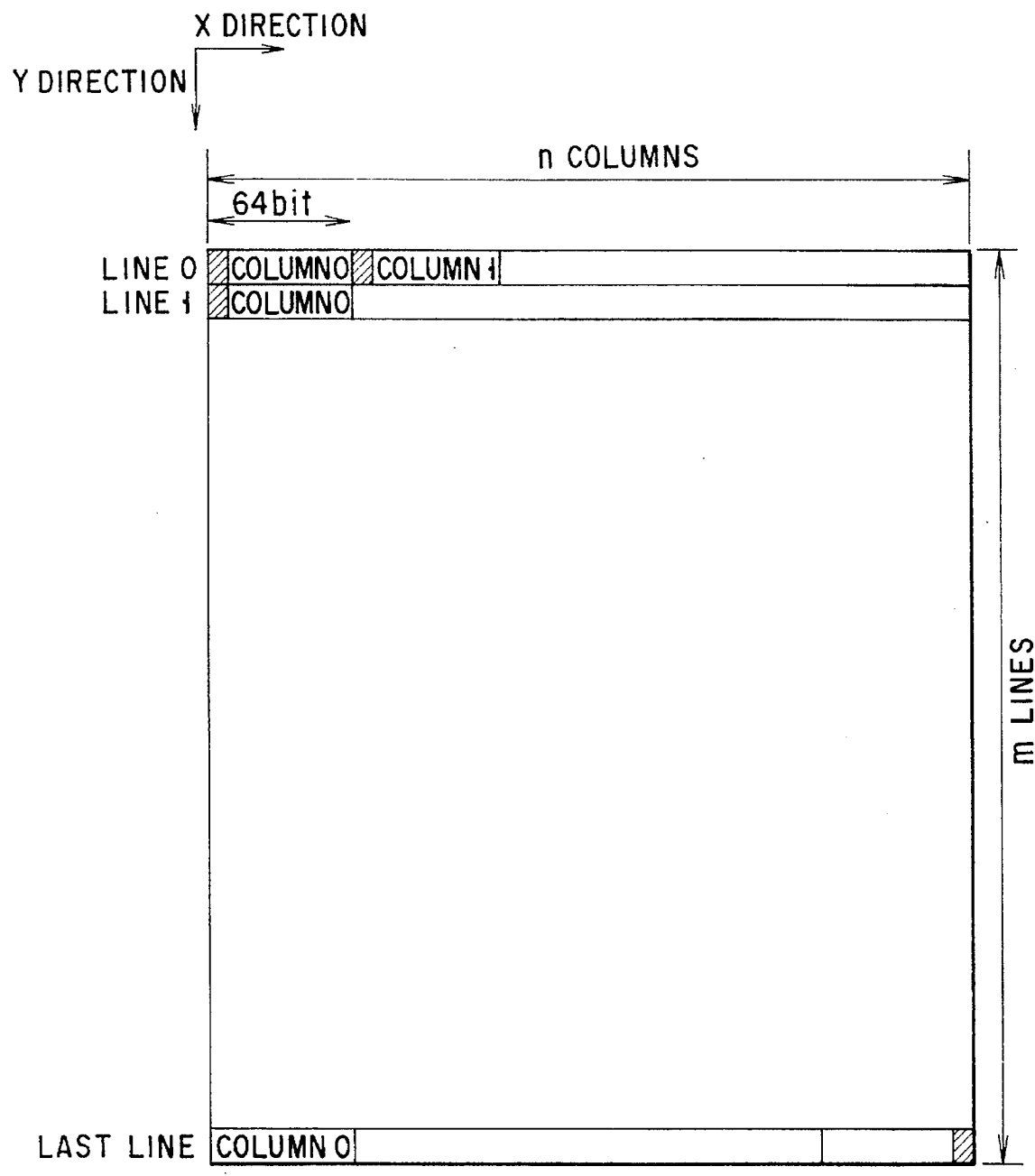
FIG. 9 is a view showing the principle for two-dimensionally accessing a page memory.

FIG. 9 is a view showing the principle of two-dimensionally accessing the page memory 23. If the access width (64 bits in this case) of each access cycle of the page memory 23 is defined as one column, one line is constituted by a positive integer multiple of one column. On the same line, continuous columns in the X direction correspond to consecutive linear addresses of the page memory, so that the linear address of the last column of a line is continuous with that of the start column of the next line.

FIG. 10 shows the two-dimensional memory of the page memory 23 in FIG. 9 in a linear address expression.

As shown in FIGS. 17A and 17B, the page memory 23 has a page data area and a compressed data area. As shown in FIG. 18, the compressed data area has a compressed data management area in which compressed data management data for each page is stored, and a compressed code data area in which compressed code data for each page is stored. A start page number, an end page number, a page size and posture for each page, a code start address for each page, and a code end address for each page are stored in the compressed data management area.

Figure 11:
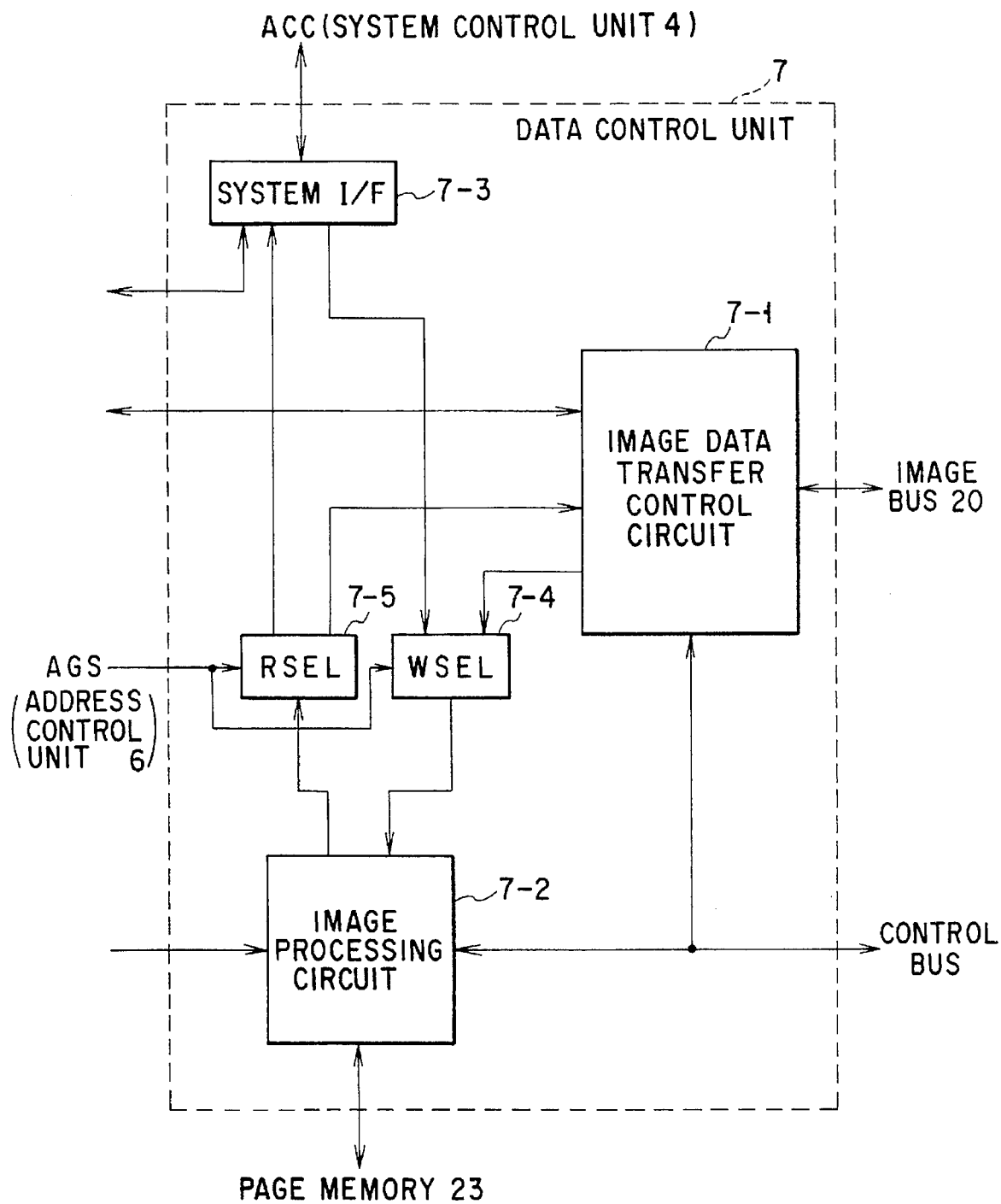
FIG. 11 is a schematic block diagram showing a data control means.

The data control means 7 will be described below. The internal arrangement of the data control means 7 is shown in FIG. 11. The data control means 7 comprises an image data transfer control means 7-1, an image processing means (bit block transfer means) 7-2, a system I/F 7-3, a selector 7-4, and a selector (RSEL) 7-5. The image data transfer control means 7-1 controls data transfer between the devices on the image bus 20 in the system basic unit 2 and data transfer between the device on the image device 20 and the page memory 23. The image processing means 7-2 transfers a bit block and performs various raster operations (logical operations). The system I/F 7-3 interfaces data when the control means 11 in the basic unit 1 or the control means 31 in the system expansion unit 3 accesses (reads/writes) the page memory 23 through the system control means 4. In the write access to the page memory 23, the selector 7-4 selects data from a device on the image bus 20 which is sent through the image data transfer control means 7-1 on the basis of the page memory access arbitration result of the address controller 6, or data from the control means (i.e., the control means 11 in the basic unit 1 or the control means 31 in the system expansion unit 3) sent through the system I/F 7-3. In the data read access to the page memory 23, the selector 7-5 selects to send data to the device on the image bus 20 through the image data transfer control means (WSEL) 7-1 on the basis of the page memory access arbitration result of the address controller 6 or data to the control means (i.e., the control means 11 in the basic unit 1 or the control means 31 in the system expansion unit 3) through the system I/F 7-3.

The image data I/F means (image data control means) 8 will be described below. The image data I/F means 8 causes a device on the image bus 20 to perform image data transfer between the scanner 13 or printer 15 and the page memory 23 through the image processing means 14. The image data I/F means 8 also performs image data transfer between the page memory 23 and the buffer memory 36 or printer controller 40 connected to the expansion unit image bus 45 in the system expansion unit 3.

Figure 12:
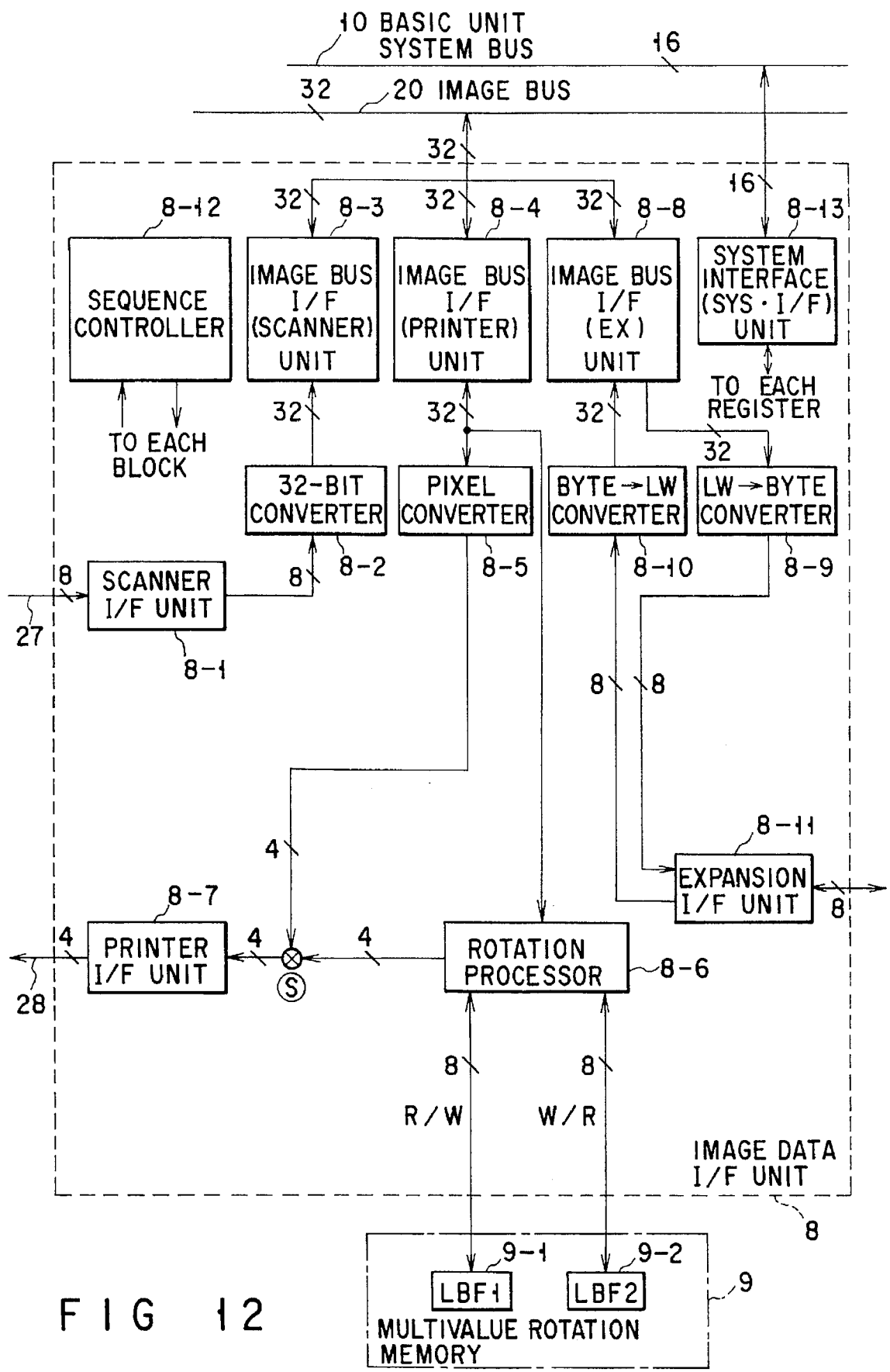
FIG. 12 is a schematic block diagram showing an image data I/F means.

The block diagram representing the internal arrangement of the image data I/F means 8 is shown in FIG. 12. The image data I/F means 8 includes a scanner I/F unit 8-1, a 32-bit converter 8-2, an image bus I/F (scanner) unit 8-3, an image bus I/F (printer) unit 8-4, a pixel converter 8-5, a rotation processor 8-6, a printer I/F unit 8-7, an image bus I/F unit 8—8, an LW→byte converter 8-9, a byte→LW converter 8-10, and an expansion I/F unit 8-11. The scanner I/F unit 8-1 receives scanner image data transferred from the image processing means 14. The 32-bit converter 8-2 converts input data into 32-bit data in accordance with a scanner image data definition bit count. The image bus I/F unit 8-3 transfers the 32-bit data output from the 32-bit converter 8-2 to the page memory 23 through the image bus 20. The image bus I/F unit 8-4 receives data from the image bus 20 when the image data is to be output from the page memory 23 to the printer 15. The pixel converter 8-5 converts the 32-bit image data input to the image bus I/F (printer) unit 8-4 into data in units of bits per pixel. The rotation processor 8-6 receives the data before pixel conversion, rotates the printer image data from the page memory 23 through 90x using the external rotation memory 9, and converts the input data into data in units of bits per pixel. The printer I/F unit 8-7 outputs the data from the pixel converter 8-5 or the rotation processor 8-6 to the printer 15 through the image processing means 14. The image bus I/F unit 8—8 transfers and inputs (or outputs) expansion I/F image data to (from) the page memory 23 in units of 32 bits. The LW→byte converter 8-9 changes the 32-bit data input to the image bus I/F unit 8—8 into 8-bit data. The byte→LW converter 8-10 converts 8-bit data from the expansion I/F unit 8-11 into 32-bit data. The expansion I/F unit 8-11 transmits or receives 8-bit image data to or from the system expansion unit 3.

The image data I/F means 8 includes a sequence controller 8-12 and a system interface unit 8-13.

Figure 13:
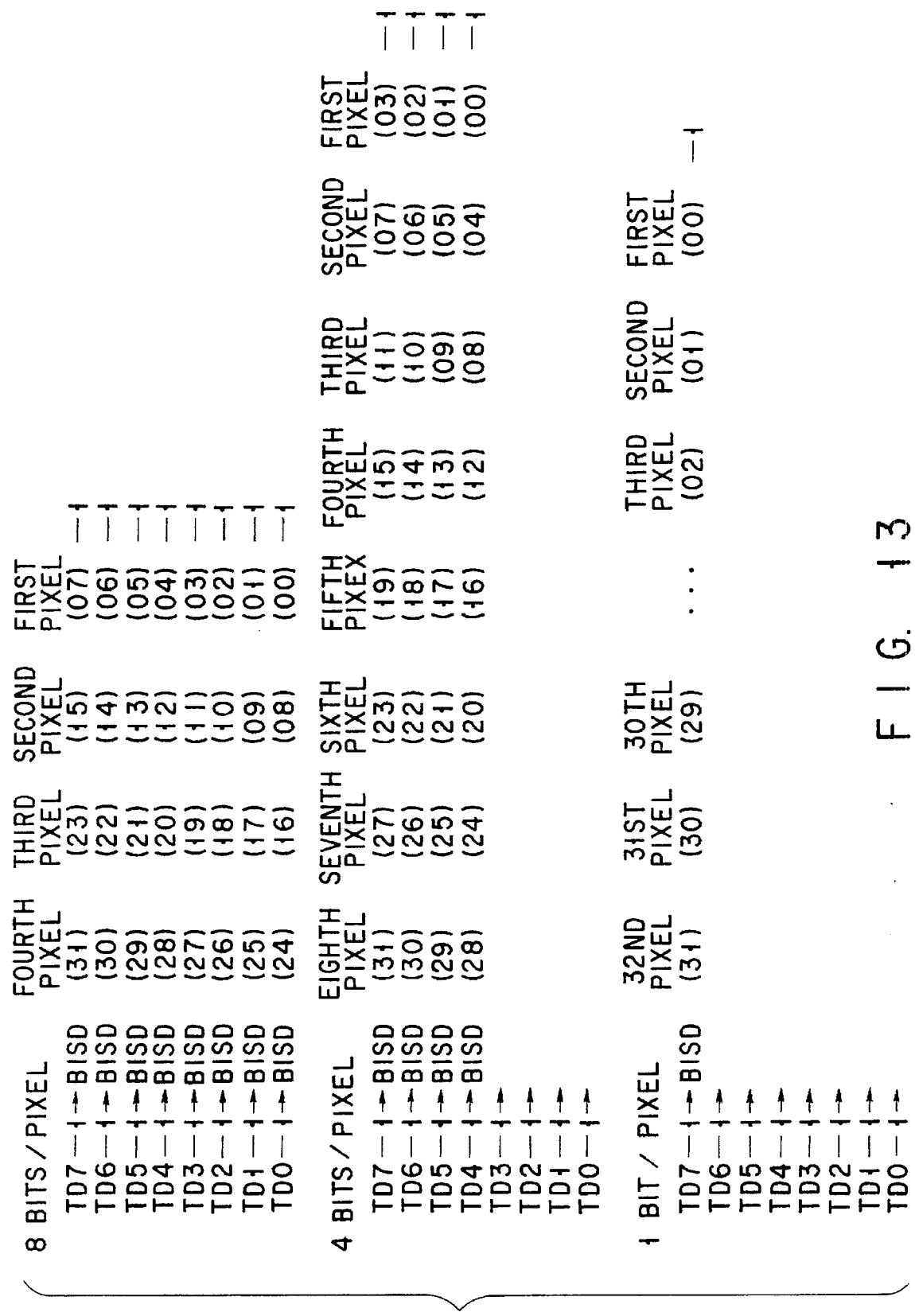
FIG. 13 is a view showing conversion in a 32-bit converter.

FIG. 13 shows conversion of the 32-bit converter 8-2 for each image data definition bit count. Data of 8 bits per pixel is converted into 32-bit data for four pixels; four bits per pixel, 32-bit data for eight pixels; and one bit per pixel, 32-bit data for 32 pixels. The 8-bit-per-pixel mode is a mode in which data is read by the scanner 13. This mode is not used in a general copy mode. The 4-bit-per-pixel mode is used in a multivalue memory copy mode. The one-bit-per-pixel mode is used in a compressed sorting or FAX transmission mode.

FIG. 14 shows conversion in the pixel converter 8-1. Data of 4 bits/pixel is converted into 32-bit data for eight pixels, and data of 1 bit/pixel is converted into 32 -bit data for 32 pixels.

FIGS. 15A to 15C show the operation of the rotation processor 8-6 for 4 bits/pixel. When the page memory 23 is accessed in an order shown in FIG. 8, the 0th LW (long word=4-byte length), the first LW, and second LW of the 0LWth line shown in FIG. 15A are sequentially sent to the image data I/F means 8. In the sent LW, the lower four bits of the 0th byte represents data (hatched portion) of the 01th (line) data. That is, the sent LW contains 8-line data. The LW data is temporarily stored in an external line buffer 9-1 in units of bytes, as shown in FIGS. 15B and 15C. When data of one long word is stored, data is read out pixel by pixel. That is, only the lower four bits are output in an order of addresses 0, 4, 8 . . .. In the next line, upper four bits are output in an order of addresses 0, 4, 8, . . .. In the next line, the lower four bits are output in an order of addresses 1, 5, 9 . . .. In the next line, the upper four bits are read out in an order of addresses 1, 5, 9 . . .. In this manner, when 8-line data is completely read out, control is shifted to the next line buffer 9-2, and the same operations as described above are repeated. The two external line buffers 9-1 and 9-2 are prepared to eliminate the interruption in line operation in such a manner that one line buffer is read-accessed while the other line buffer is write-accessed.

Figure 16A:
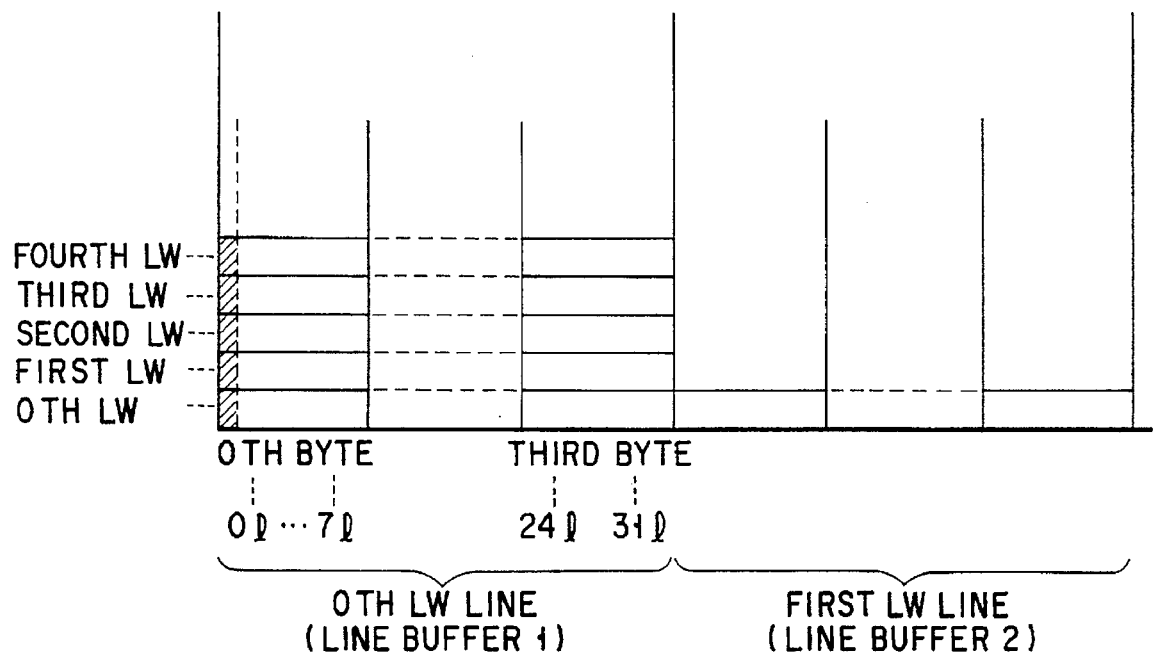
FIGS. 16A to 16C are views for explaining the operation of the rotation processor for 1 bit/pixel.
Figure 16B:
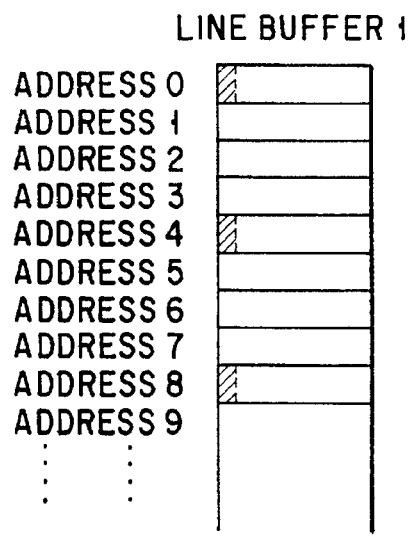
Figure 16C:
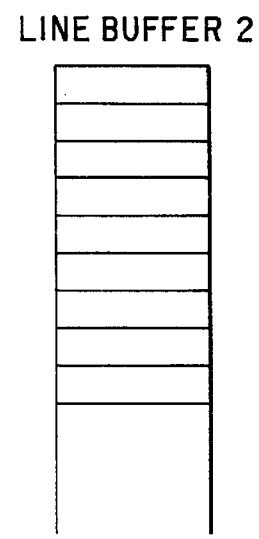

In the one-bit-per-pixel mode, 32-line data is present for 1 LW (long word) in the same mechanism as described above. A read repetition count and a data selection bit count are different from those described above, as shown in FIGS. 16A to 16C.

In the description shown in FIGS. 15A to 15C and 16A to 16C, the contents of the page memory 3 are rotated clockwise, and the rotated contents are read out. As a result, an operation for outputting data upon counterclockwise rotation seems to be described. However, in counterclockwise rotation, the data control means 7 performs bit inversion of the long word as a whole. For this reason, the image data I/F means 8 can perform a single operation to coping with such operations.

A description will be made on the basis of FIGS. 19 to 25.

When the originals O are set on an original feed tray 62 of an ADF (Automatic Document Feeder) 61, and a print button is depressed, the originals O placed on the original feed tray 62 are picked up one by one from the lowermost original O, and the original is set on the original table 63 at a predetermined position. When the image of the original O set on the original table 63 is read by a first carriage 64 of the scanner 13, the original O is conveyed, and a flapper 67 attached to a reverse roller 66 is driven downward, so that the original O is exhausted onto an exhaust tray 68. This operation is repeated until no original is present on the original feed tray 62, thereby reading the images of all the originals O.

When the originals as two-side originals O are set in advance, the originals are fed one by one, and the fed original O is supplied to the reverse roller 66 by a conveyor belt 65 to read the image on the lower surface first. At this time, a flapper 64 is not driven, and the original O is fed to a return path to the conveyor belt 65 side. Once the original O is clamped by the reverse roller 66, the conveyor belt 65 is driven in the reverse direction to feed the original O in this direction, so that the original O is reversed and set at a predetermined position so as to read the image on the lower surface. After the image on the lower surface of the original O is read by the scanner 13, the original O is turned over again to read an image on the upper surface. When the image on the upper surface of the original O is read, the flapper 64 attached to the reverse roller 66 is driven downward to exhaust the original O onto the exhaust tray 68.

when the original O is set on the original table 63 by the ADF 61 or manually, the first carriage 64 of the scanner 13 scans the original O. Light reflected by the original from the first carriage 64 is guided to a condenser lens 70 by a second carriage 69 moved at a speed ½ that of the first carriage 64 in synchronism with the first carriage 64. The light reflected by the original O is photoelectrically converted and read by a CCD sensor 71. The photoelectrically converted image signal is converted into 8-bit digital data by A/D conversion. The digital data is then subjected to shading correction. The resultant data is transferred to the image processing means 14.

In the printer 15, image data sent from the image processing block is converted into an optical signal by a laser diode 72. The optical signal is horizontally scanned by a polygon mirror 73 to form an image on a photosensitive drum 74. The image formed on the photo-sensitive drum 74 is visualized into a toner image in an electrophotographic process. An image carrier P such as a paper sheet corresponding to the size of the toner image is selected from a cassette 75, a large-capacity paper feed tray 76, a pedestal deck 77, or the like. The image carrier P is brought into contact with the photosensitive drum 74 to transfer the image to the carrier P by a transfer charger 78. The toner image on the image carrier P is fixed by a fixing unit 79. The recording paper sheet P having the fixed toner image is directly exhausted in a normal operation. A manual feed portion 75' is formed on the cassette 75.

In the reverse copy mode, an exhaust/ADD (reverse portion) selector gate 80 is driven to feed the paper sheet to a reverse portion (ADD) 81. When the trailing end of the paper sheet guided to the ADD 81 passes an inlet port sensor 82, the paper sheet is temporarily stopped, and the paper sheet is fed in the reverse direction, thereby reversely discharging the paper sheet.

In the two-side copy mode, the exhaust/ADD selector gate 80 is driven to feed the recording paper sheet P to the ADD 81 side. The recording paper sheet P is received by the ADD 81. To record an image on a nonrecorded surface of the recording paper sheet P, the recording paper sheet P is fed for the recording process again by an ADD pickup roller 83. The recording paper sheet having images on both the surfaces is normally exhausted while the exhaust/ADD selector gate 80 is set to an exhaust side. To obtain a large number of identical copies each having images on both the surfaces, a large number of paper sheets are simultaneously received inside the ADD 81. For this purpose, the ADD 81 has a capacity capable of receiving a large number of paper sheets.

Figure 23:
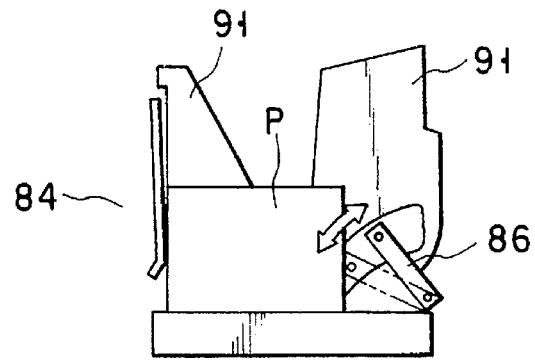
FIG. 23 is a view showing the arrangement of a finisher.
Figure 24:
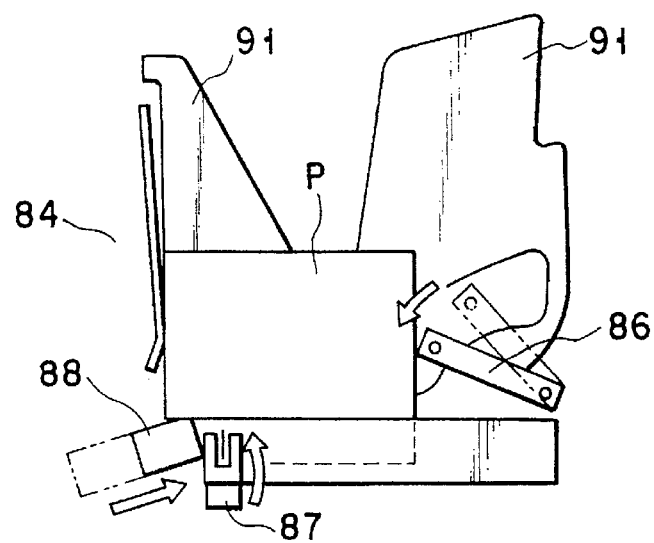
FIG. 24 is a view for explaining the structure of the finisher.
Figure 25:
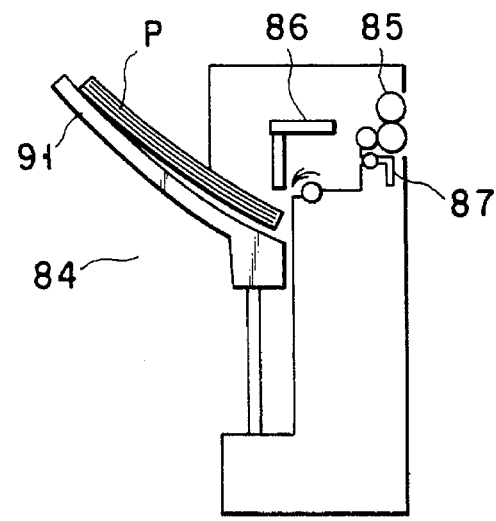
FIG. 25 is a view for explaining the arrangement of the finisher.

A finisher 84 staples each set of exhausted copy sheets. As shown in FIG. 23, the originals O are set so as to be stapled. Every time a set of recording paper sheets P are copied and exhausted through an exhaust port 85, the recording paper sheets P are aligned on the stapling side by a guide bar 86. When all the paper sheets constituting one set are completely exhausted, a paper press arm 87 holds the recording paper sheets P constituting one set, and the paper sheets are then stapled by a stapler unit 88. A finisher exhaust tray 91 is moved downward to a position indicated by a broken line in FIG. 24. The stapled recording paper sheets P are exhausted onto an exhaust tray 91 by a finisher exhaust roller 90 in units of sets, as shown in FIG. 25. The descending distance of the finisher exhaust tray 91 is determined by the number of recording paper sheets P to be exhausted. Every time each set is exhausted, the finisher exhaust tray 91 is descended stepwise. The guide bar 86 for aligning the exhausted recording paper sheets P is located at a level which does not interfere with the stapled recording paper sheets P placed on the finisher exhaust tray 91.

Figure 27:
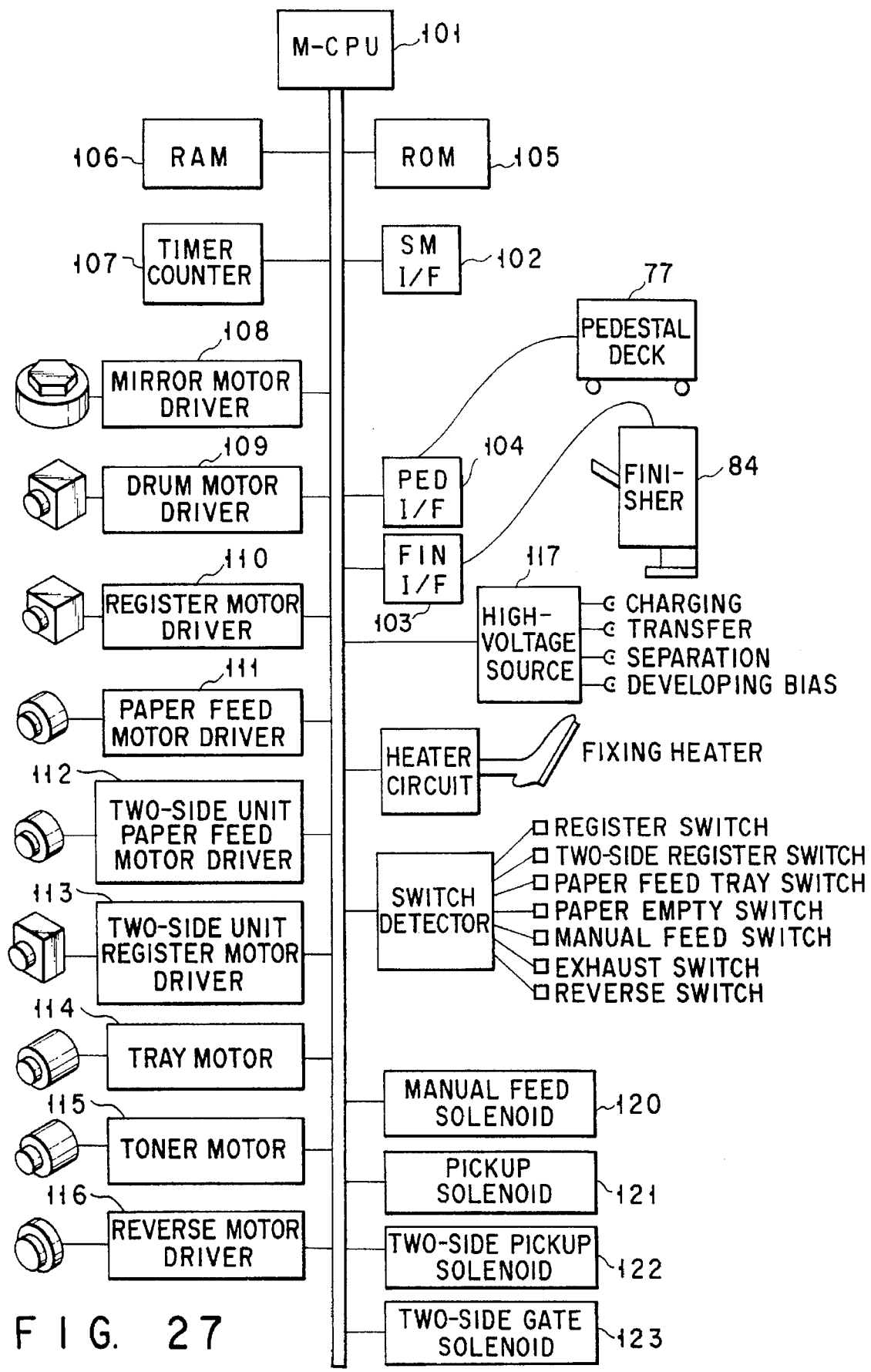
FIG. 27 is a block diagram showing the internal arrangement of a printer.

FIG. 27 is a wiring diagram of components associated with an M-CPU 101 for controlling the printer 15. The M-CPU 101 is connected to the control means (system control CPU) for controlling the basic unit and a system control I/F 102. The M-CPU 101 is operated in accordance with an instruction from the control means 11 and reports the operation state to the control means 11. The finisher 84 and the pedestal deck 77 are controlled under the control of the M-CPU 101 and connected thereto through an FIN-I/F 103 and a PED-I/F 104, respectively.

The M-CPU 101 is connected to a ROM 105 storing control programs, a RAM 106 for storing data, a timer clock 107 for counting the time, a mirror motor driver 108 for driving a mirror motor 108a for rotating the polygon mirror 73, a drum motor driver 109 for driving a drum motor 109a for rotating the photosensitive drum 74, a register motor driver 110 for driving a register motor 110a, a paper feed motor driver 111 for driving a paper feed motor 111a, a two-side unit paper feed motor driver 112 for driving a two-side unit paper feed motor, a two-side unit register motor driver 113 for driving a two-side unit register motor 112a, a tray motor driver 114 for driving a tray motor, a toner motor driver 115 for driving a toner motor 115a, a reverse motor driver 116 for driving a reverse motor, a high-voltage source 117 for applying high voltages for charging, transfer, separation, and developing bias, a heater controller 118 for controlling a heater in the fixing unit 79, a switch detector 119 for detecting signals from a register switch, a two-side register switch, a paper feed tray switch, a paper empty switch, a manual feed switch, an exhaust switch, and a reverse switch, a manual feed solenoid 120 for actuating a manual feed roller (not shown), a pickup solenoid 121 for actuating a pickup roller (not shown), a two-side pickup solenoid 122 for actuating a two-side pickup roller (not shown), and a two-side gate solenoid 123 for actuating a two-side gate (not shown).

Figure 26:
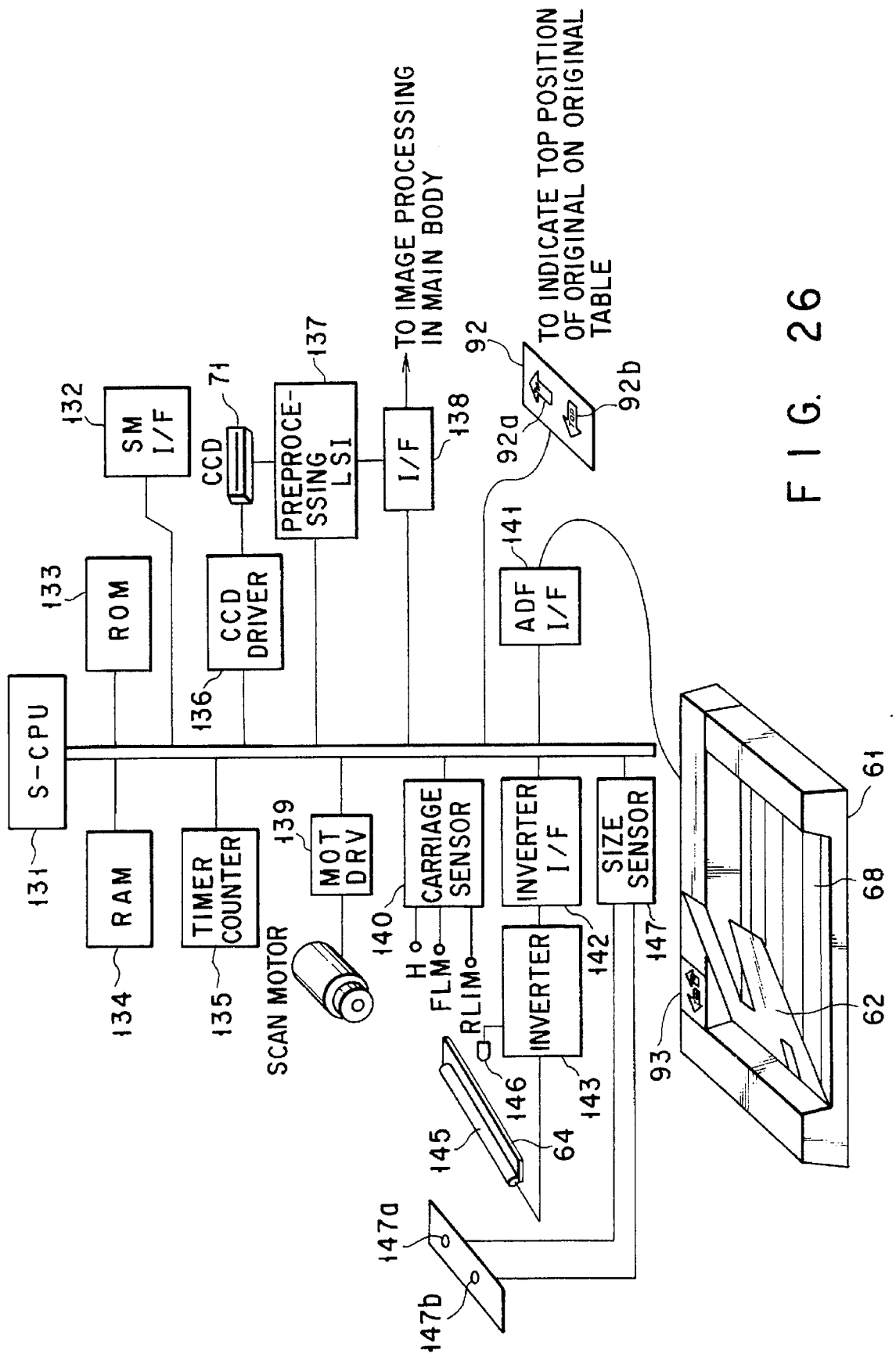
FIG. 26 is a block diagram showing the internal arrangement of a scanner.

FIG. 26 is a wiring diagram of parts associated with an S-CPU 131 for controlling the scanner 13. Similarly, the S-CPU 131 is connected to the control means 11 for controlling the basic unit 1 and a system control I/F 132. The S-CPU 131 is operated in accordance with an instruction from the control means 11 and reports an operation state to the control means 11 as in the M-CPU 101. The ADF 61 is operated under the control of the S-CPU 131 and is connected thereto through an ADF-I/F 141.

The S-CPU 131 is connected to a ROM 133 storing control programs, a RAM 134 for storing data, a timer counter 135 for counting the time, a CCD driver 136 for driving the CCD sensor 71, a preprocessing LSI 137 for preprocessing an output from the CCD sensor 71, an interface 138 for interfacing with the image processing means 14, a motor driver 139 for driving a scan motor 139a, a carriage sensor 140 for detecting the moving direction of the carriage, an inverter interface 142 for interfacing an inverter 143 for ON/OFF-controlling a fluorescent lamp 145, and a size sensor 147 constituted by reflection photointerruptors 147a and 147b. A monitor 146 is connected to the inverter 143.

Figure 19:
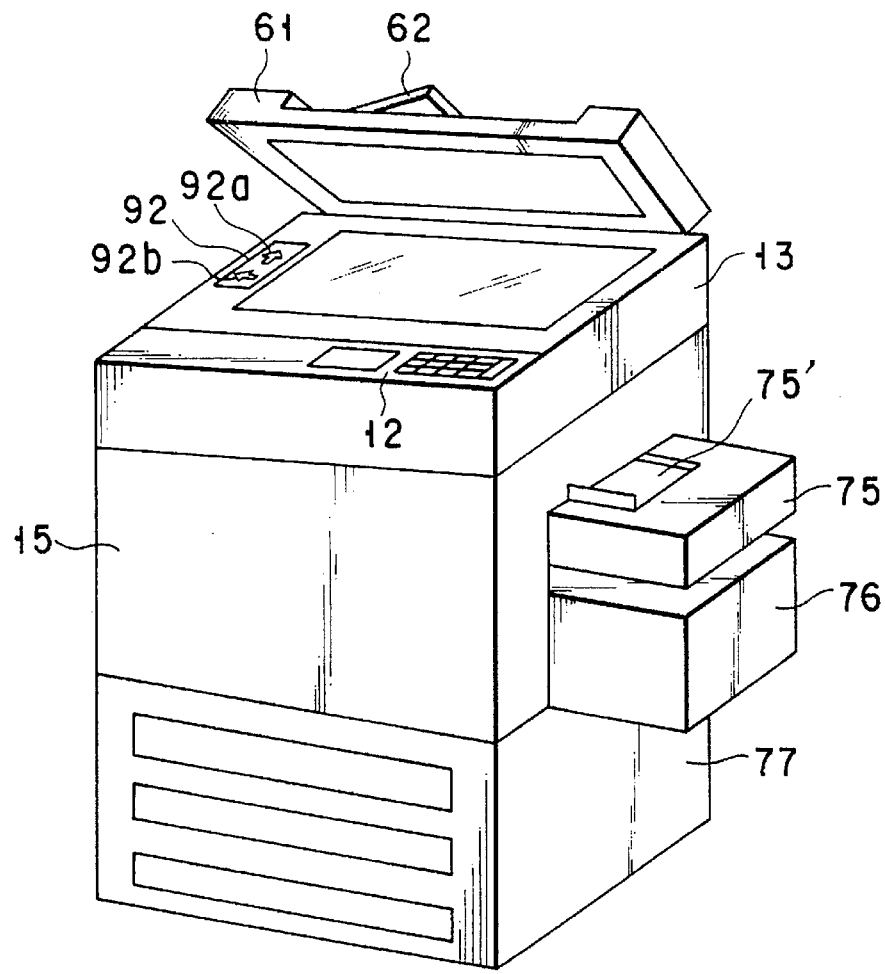
FIG. 19 is a perspective view showing the outer appearance of the image forming/storage apparatus.
Figure 21:
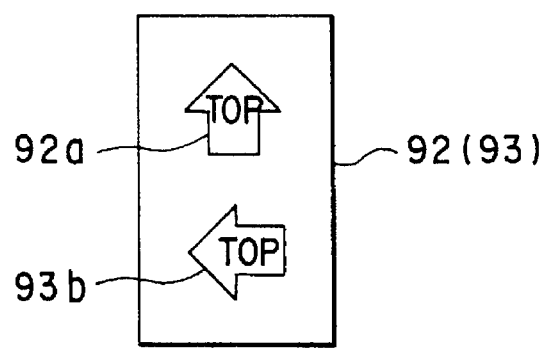
FIG. 21 is a view showing the vertical directions of originals.
Figure 20:
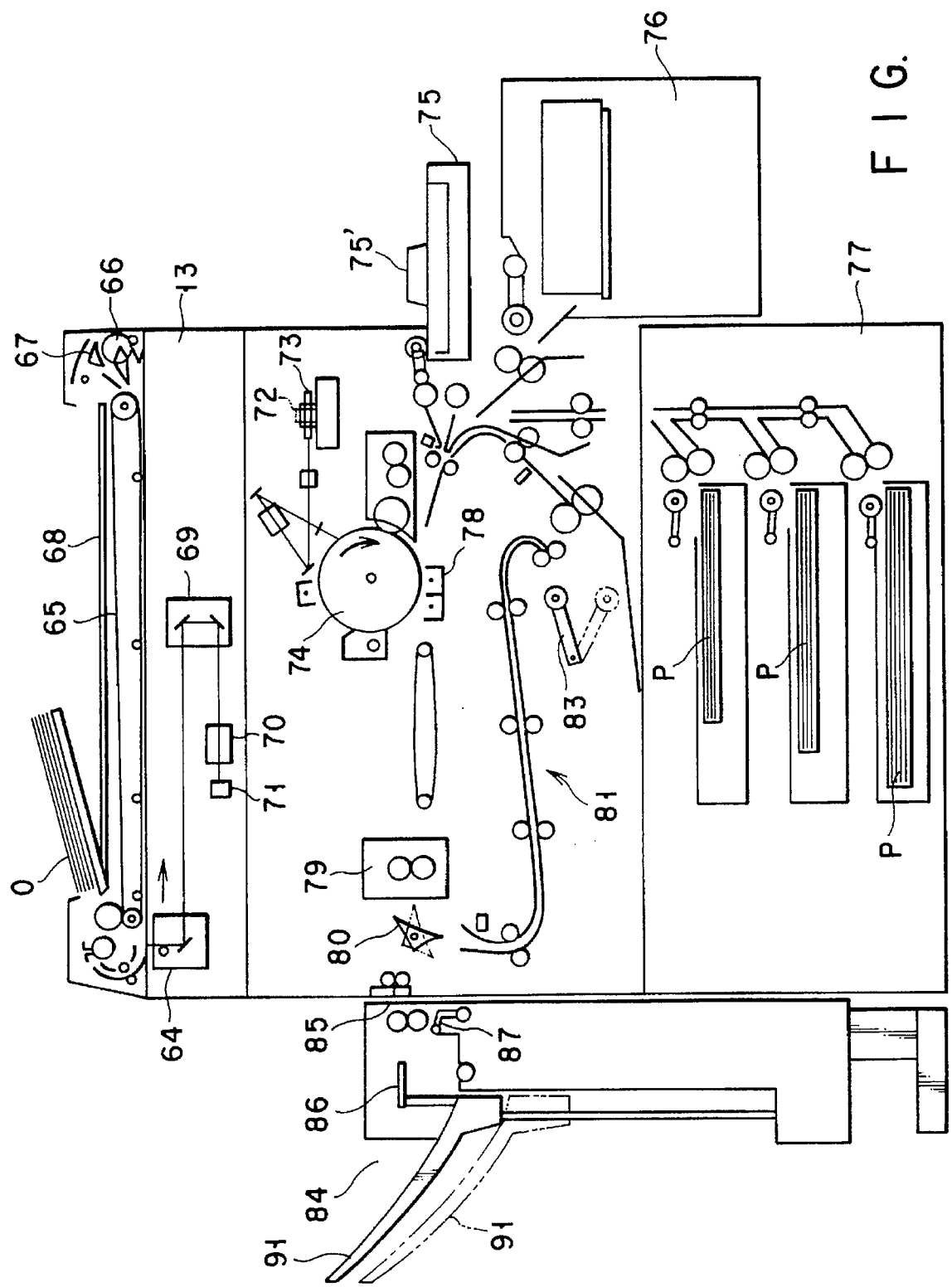
FIG. 20 is a sectional view showing the internal arrangement of the image forming/storage apparatus.
Figure 22:
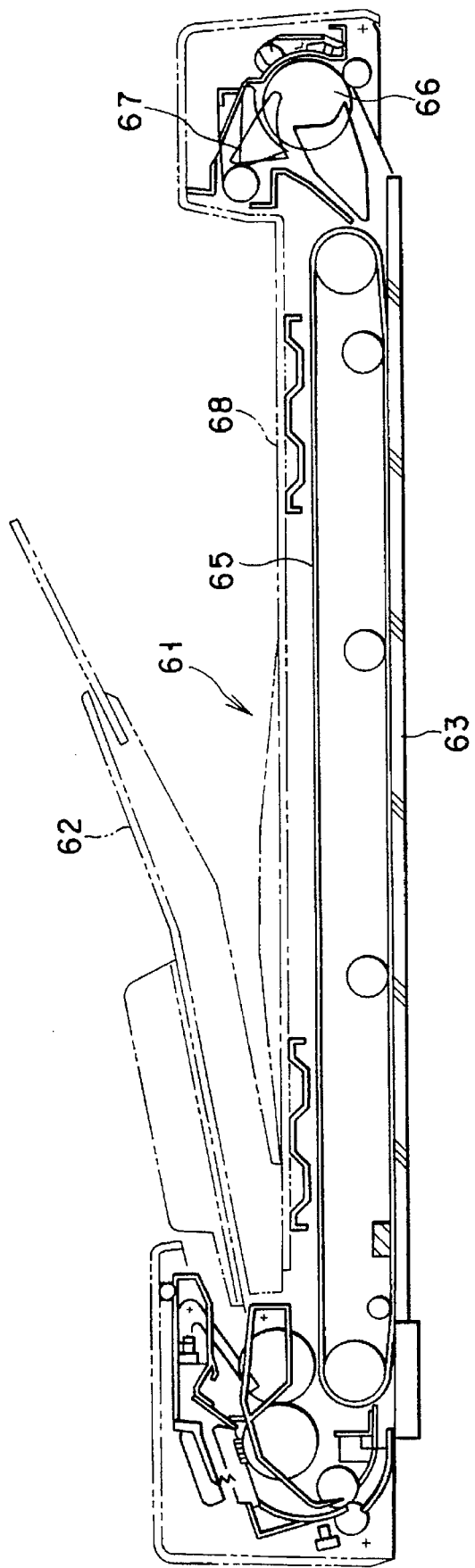
FIG. 22 is a sectional view showing the internal arrangement of an automatic original (document) feeder.

A display section 92 for the vertical direction of an original, which is located next to the original table 63 is connected to the S-CPU 131 to inform the operator of the vertical direction of the image, as shown in FIGS. 19 and 21. This display section 92 receives a command from the control means 11 in accordance with the contents set by the user on the control panel 12 connected to the control means 11 and performs settings in accordance with this command. The display section 92 comprises an upper display element 92a and a lower display element 92b. The display element 92a represents the vertical direction as the main scanning direction, while the display element 92b represents the vertical direction as the subscanning direction. The display element 92a or 92b selected by specifying the vertical direction of the original O is turned on to inform the operator of the vertical direction of the original.

As shown in FIGS. 21 and 26, a display section 93 for the vertical direction of an original is also arranged in the ADF 61. When the ADF 61 is used, the vertical direction as the main scanning or subscanning direction is indicated.

FIG. 19 shows the location of the display section 92. The display section 92 is located at a noticeable position next to the glass of the original table 63. The display section 93 is also located at a noticeable position on the ADF 61 in FIG. 26 representing the insertion direction of the original O.

Figure 28A:
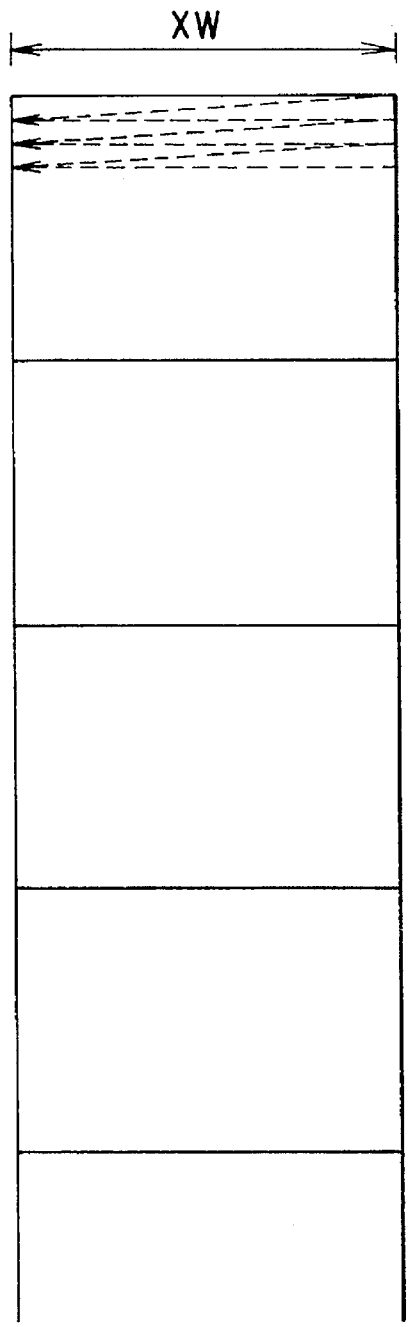
FIGS. 28A and 28B are views for explaining a method of inputting image data in the page memory.
Figure 28B:
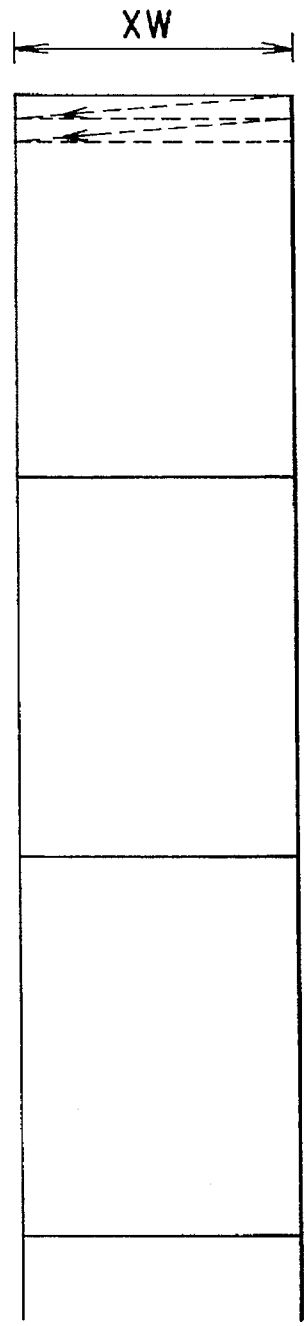

The state of the page memory 23 upon reception of image data is shown in FIGS. 28A and 28B. A main scanning width XW of the page memory 23 is changed by a main scanning width of the original O to save the capacity of the page memory 23, as shown in FIGS. 28A and 28B.

Figure 29:
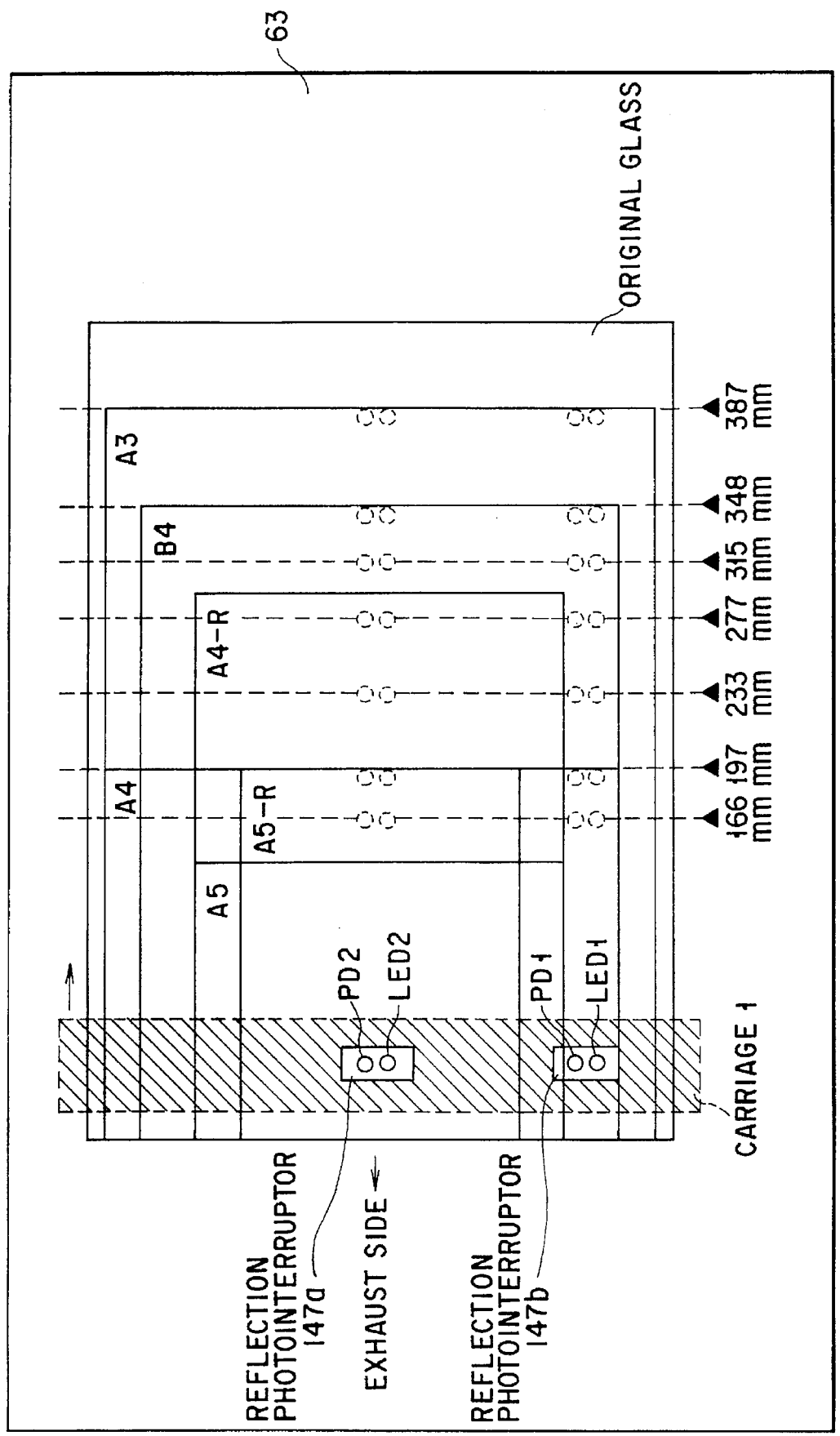
FIG. 29 is a view for explaining an original size detection mechanism.

For example, to manually set the original O on the original table 63, the operator sets the original O and depresses a copy button. The first carriage 64 of the scanner 13 preliminarily scans the original O without turning on the fluorescent lamp 145, so that the reflection photointerruptors 147a and 147b can detect the size and posture of the original O. In addition, the width and length of the original O in feeding it to the original table 63 using the ADF 61 can also be detected. This mechanism is shown in FIG. 29. FIG. 29 exemplifies detection using the first carriage 64 of the scanner 13. In the ADF 61, similar detection can be performed using a size register sensor located at a position corresponding to that of the reflection photointerruptor 147b.

Figure 2A:
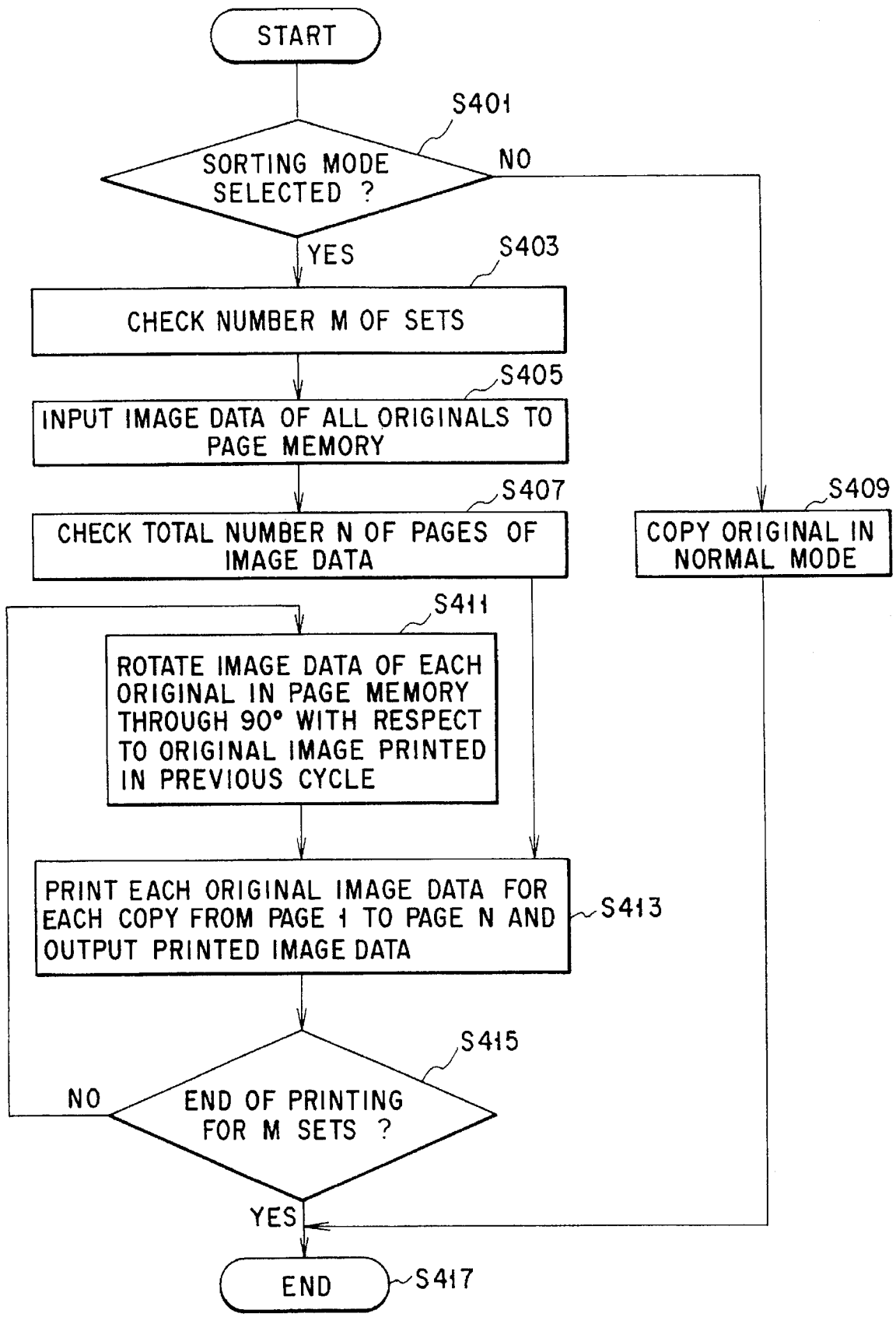
FIG. 2A is a flow chart for explaining the characteristic features of the present invention.
Figure 2B:
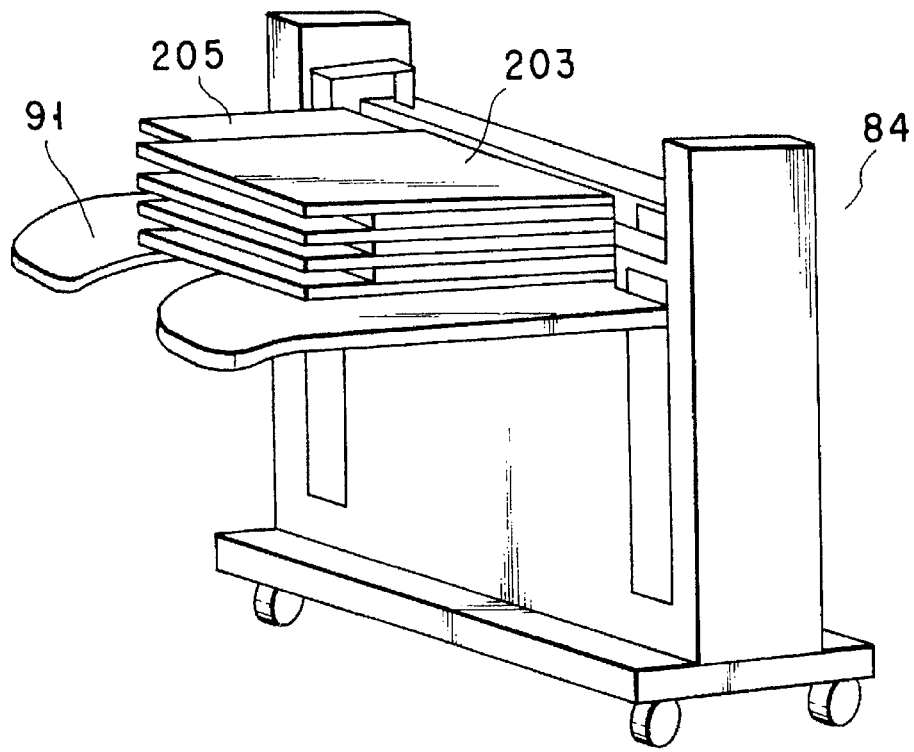
FIGS. 2B and 2C are views showing an output form of copy sheets, which form is the characteristics feature of the present invention.
Figure 2C:
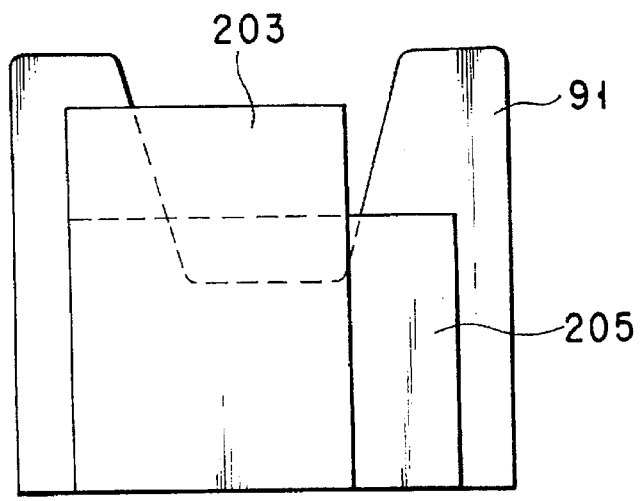

FIG. 2A is a flow chart for explaining the characteristic feature of the present invention, and FIGS. 2B and 2C are views showing the output form of copy sheets as the characteristic feature of the present invention.

Using FIGS. 2A to 2C, an electronic sorting function and a sorting function in consideration of a stapler position, both of which are the characteristic features of the present invention, will be described below.

FIG. 2B shows an output form using an electronic sorter of the image forming apparatus using the present invention. FIG. 2C is a view of the exhaust tray 91 when viewed from the top. More specifically, FIG. 2C shows the finisher 84 for binding portrait copy sheets 203 and the landscape copy sheets 205, and the exhaust tray 91 for holding the copy sheets 203 and 205. Referring to FIGS. 2B and 2C, according to the present invention, a structurally simple method using a sorting mechanism for continuous original copying for a plurality of sets can be performed without using a mechanical sorter mechanism.

In the flow chart in FIG. 2A, it is determined whether a sorting mode is selected (S401). If NO in step in S401, an original is copied in a normal mode (S409). If YES in step S401, the number M of sets for sorting/copying is set (S403). All the original image information is input to the page memory 23 through the scanner 13 (S405). The operation of storing all the original images in the page memory is a characteristic feature of the present invention. In a conventional copying machine, one original is repeatedly scanned and copied by a required number of copies. However, according to the apparatus of the present invention, the total number N of pages of the image data is recognized (S407). For example, if seven sets each for 10 original pages are required, then M=7 and N=10. The original images stored in the page memory 23 are read out one by one, and each image is printed. When printing is completed from page 1 to page 10, and one set of pages (printed image data) is output (S413). It is then determined whether the required number M of sets (seven sets in this case) are obtained (S415). If NO in step S415, the original images in the page memory are read out from page 1. In this case, the images are rotated through 90° with respect to the original images of the previous cycle (rotation can be clockwise or counterclockwise). The 90°-rotated original image data are printed one by one from page 1 to page 10 (S413). This operation is continued until the required number of sets are obtained. The set of portrait copy sheets 203 and the set of landscape copy sheets 205 are alternately output. Therefore, the operator can discriminate sets from each other in units of cycles, and the copy sheets can be discriminated by the operator without using a conventional mechanical sorter.

Automatic binding of the copy sheets of a plurality of sets exhausted by the sorting function, using the stapler unit 88 arranged in the finisher 84 will be described below. Referring to FIGS. 2B and 2C, automatic stapling using the stapler unit 88 must have a stapler position 204 for both the landscape and portrait copy sheets 205 and 203 because the stapler unit 88 attached to the finisher 84 is located on the front side. That is, the upper left corner of each original must correspond to the position of the stapler unit of this finisher. In the image forming apparatus according to the present invention, the memory images of the original images are appropriately rotated and copied such that the stapler positions of the landscape and portrait copy sheets 205 and 203 are set appropriate with respect to the orientations and order of the original images.

For example, when stapling is performed by the stapler unit (88 in FIG. 2B) on the front side, the landscape copy sheets 205 must be printed and exhausted in an order of page N to page 1 in such a manner that their upper surfaces face the ceiling and their upper ends are on the front side. The portrait copy sheets 203 must be printed and exhausted in an order of page 1 to page N in such a manner that their upper surfaces face the ground and their left sides are on the front side. In the image forming apparatus of the present invention, the original images are appropriately rotated and copied in consideration of the conditions of each copy mode, and the copies are exhausted with the appropriate orientation and order, thereby realizing automatic stapling.

In an actual copy operation of the image forming apparatus, a large number of copy modes are present. One of the copy modes is selected, and the sorting mode is then executed.

More specifically, the following 24 copy modes are present depending on the cases wherein an original is fed and scanned in the image forming apparatus in the vertical direction, an original is fed and scanned in the image forming apparatus in a lateral direction, copy operations of two-side original→two-side sheet, one-side original→two-side sheet, two-side original→one-side sheet, and one-side original→one-side sheet are performed, an original is fed using an automatic document feeder, and an original is manually fed by the operator.

1. vertical Alignment in Subscanning Direction 1.1 Reading by ADF 61

1.1.1-a) Two-Side Portrait Original O→Two-Side Portrait Sheet Reproduction 1.1.1-b) One-Side Portrait Original O→Two-Side Portrait Sheet Reproduction 1.1.1-c) Two-Side Portrait Original O→One-Side Portrait Sheet Reproduction 1.1.1-d) One-Side Portrait Original O→One-Side Portrait Sheet Reproduction 1.1.2-a) Two-Side Portrait Original O→Two-Side Landscape Sheet Reproduction with Rotation 1.1.2-b) One-Side Portrait Original O→Two-Side Landscape Sheet Reproduction with Rotation 1.1.2-c) Two-Side Portrait Original O→One-Side Landscape Sheet Reproduction with Rotation 1.1.2-d) One-Side Portrait Original O→One-Side Landscape Sheet Reproduction with Rotation 1.2 Manual Setting 1.2.1-a) Portrait Original O→Two-Side Portrait Sheet Reproduction 1.2.1-b) Portrait Original O→One-Side Portrait Sheet Reproduction 1.2.2-a) Portrait Original O→Two-Side Landscape Sheet Reproduction 1.2.2-b) Portrait Original O→One-Side Landscape Sheet Reproduction 2. Vertical Alignment in Main Scanning Direction 2.1 Reading by ADF 2.1.1-a) Two-Side Portrait Original O→Two-Side Landscape Sheet Reproduction 2.1.1-b) One-Side Portrait Original O→Two-Side Landscape Sheet Reproduction 2.1.1-c) Two-Side Portrait Original O→One-Side Landscape Sheet Reproduction 2.1.1-d) One-Side Portrait Original O→One-Side Landscape Sheet Reproduction 2.1.2-a) Two-Side Portrait Original O→Two-Side Portrait Sheet Reproduction with Rotation 2.1.2-b) One-Side Portrait Original O→Two-Side Portrait Sheet Reproduction with Rotation 2.1.2-c) Two-Side Portrait Original O→One-Side Portrait Sheet Reproduction with Rotation 2.1.2-d) One-Side Portrait Original O→One-Side Portrait Sheet Reproduction with Rotation 2.2 Manual Setting 2.2.1-a) Portrait Original O→Two-Side Landscape Sheet Reproduction 2.2.1-b) Portrait Original O→One-Side Landscape Sheet Reproduction 2.2.2-a) Portrait Original O→Two-Side Portrait Sheet Reproduction 2.2.2-b) Portrait Original O→One-Side Portrait Sheet Reproduction Operations for printing images of a large number of originals O input in the above orders in the respective modes will be described below.

First of all, an operation for aligning the vertical direction of the original O with the subscanning direction and outputting an input image will be described. This operation corresponds to FIGS. 30A to 35C.

Figure 30A:
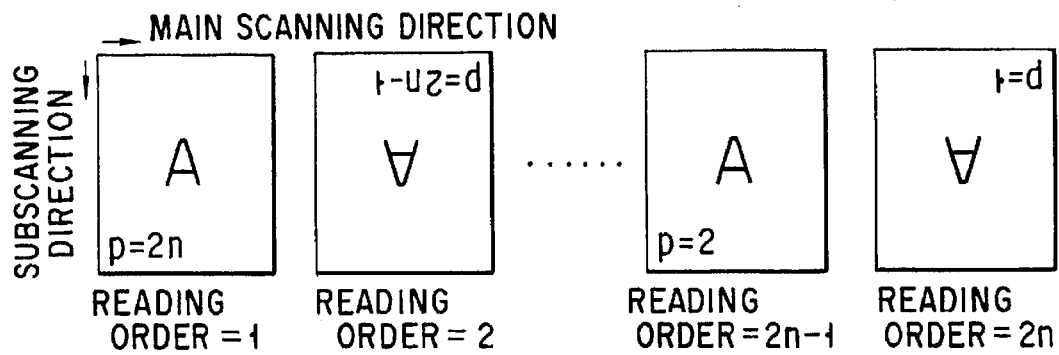
FIGS. 30A to 30D are views for explaining a storage direction or a read start position or read direction of each image in the page memory.
Figure 31A:
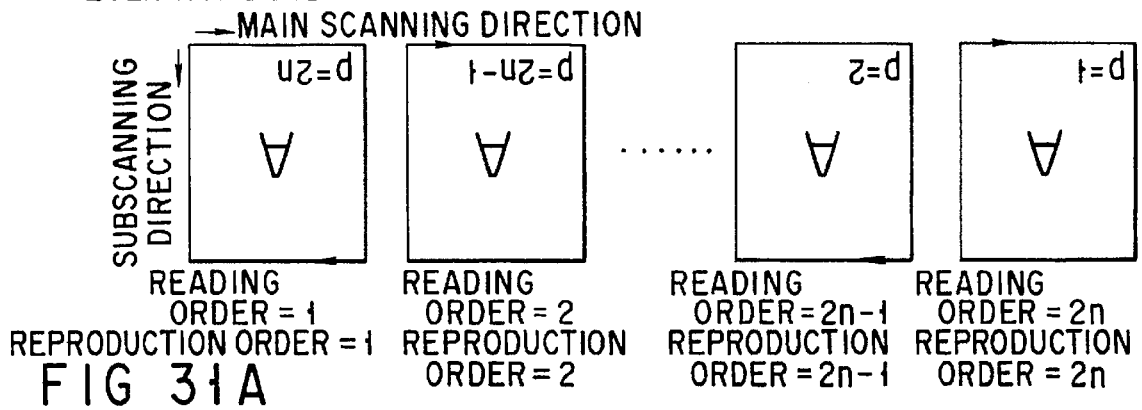
FIGS. 31A to 31D are views for explaining another storage direction or another read start position or read direction of each image in the page memory.

FIG. 30A explains the posture of images in the page memory when the two-side portrait originals O are input using the ADF 61. As shown in FIG. 31A, the pages are alternately reversed upside down. That is, even-numbered pages represent erect images, while odd-numbered pages represent inverted images.

Note that the two-side originals are bound at the right or left side, and that top or bottom binding will be described later.

Figure 30B:
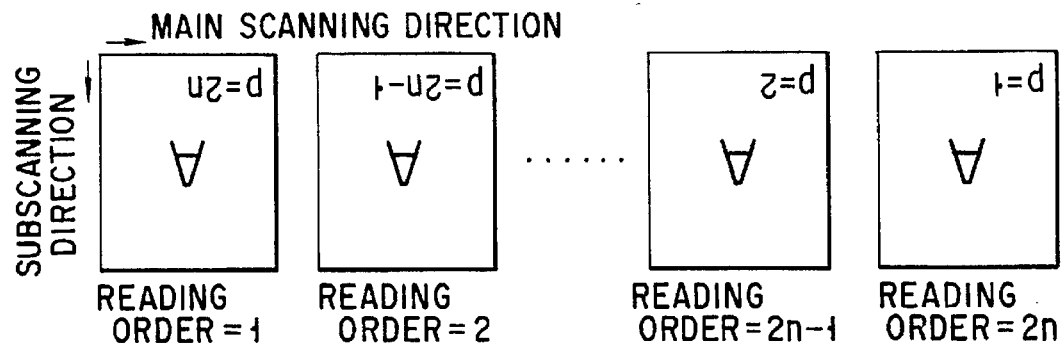
Figure 30C:
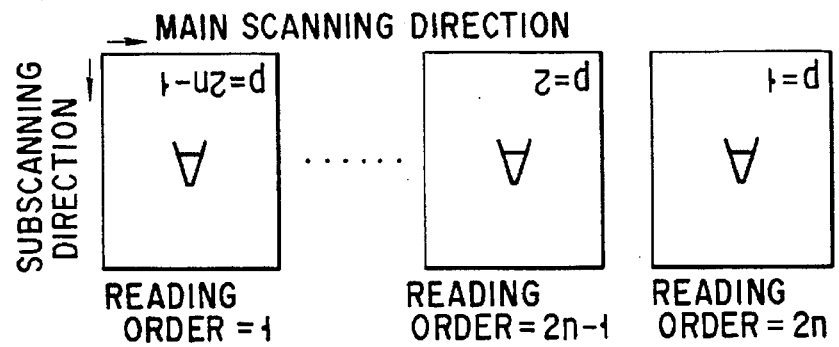

FIGS. 30B and 30C explain the posture of images in the page memory when the one-side portrait originals O are input using the ADF 61. In this case, all the images on the pages are inverted images. FIG. 30B show even-numbered sheets, while FIG. 30C show odd-numbered sheets.

Figure 30D:
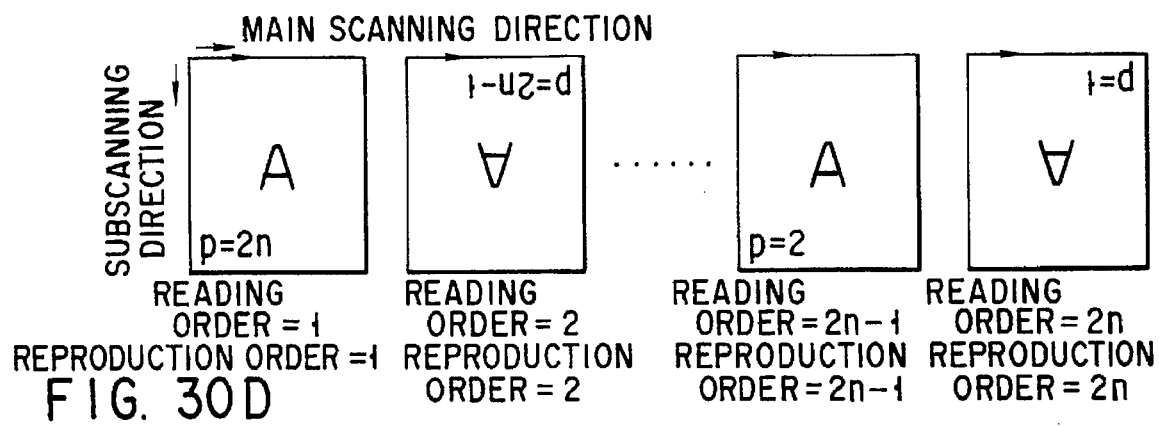

FIG. 30D is a view corresponding to copy mode 1.1.1-a) to explain that image data of the two-side portrait original O input in FIG. 30A is reproduced on a two-side portrait sheet. In this case, input data are identical to output data, and the readout order is the same as the input order.

Figure 31B:
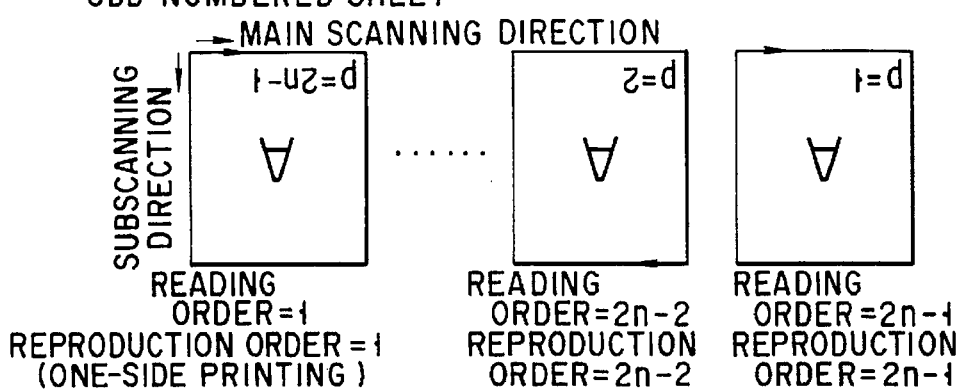

FIG. 31A corresponds to mode 1.1.1-b) to explain a readout operation performed when data input in FIG. 30B is reproduced on a two-side sheet, and FIG. 31B corresponds to mode 1.1.1-b) to explain a readout operation for reproducing the image data input in FIG. 30C. When a one-side original O is to be reproduced on a two-side sheet, every other original images must be read out with a 180° rotation to perform vertical alignment in the subscanning direction so as to align the upper ends of the originals to be copied on the upper and lower surfaces of the two-side sheet. In addition, the originals O consist of odd-numbered sheets, the first odd-numbered copy sheet must be a one-side sheet.

Figure 31C:
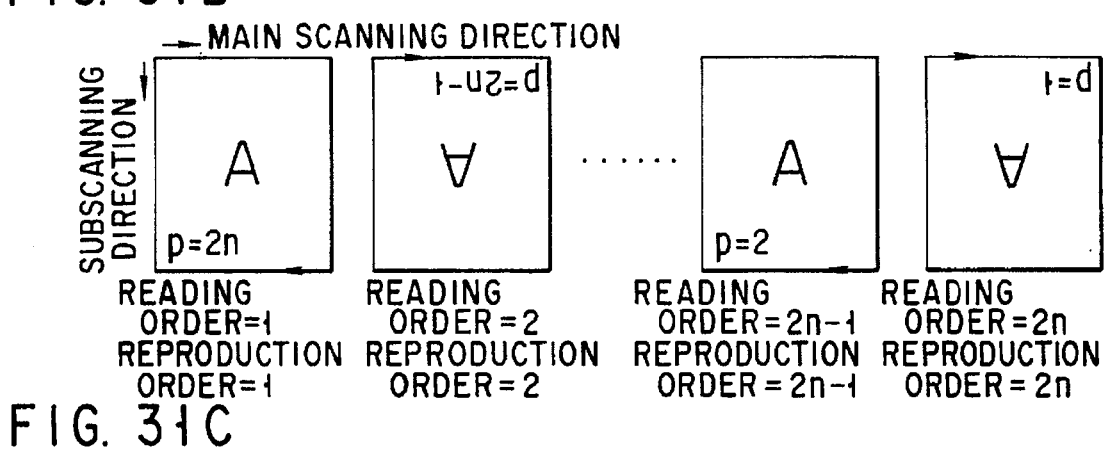

FIG. 31C corresponds to mode 1.1.1-c) to explain an operation for reproducing the image data input in FIG. 30A on a one-side portrait sheet. In this case, every other input images are inverted images, so that every other images must be rotated through 180° in reproduction.

The operations will be briefly described below.

Figure 31D:
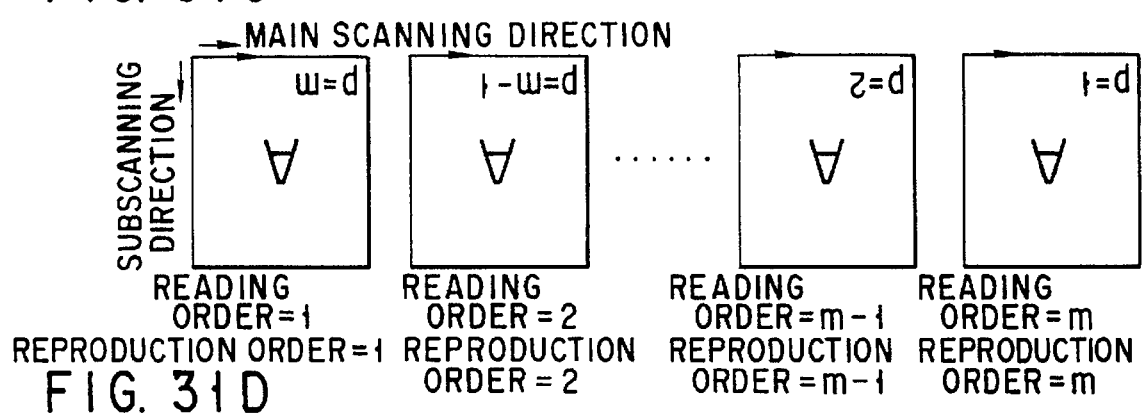

FIG. 31D is a view corresponding to mode 1.1.1-d) to explain a readout operation performed when a one-side portrait original O is reproduced on a one-side portrait sheet.

FIG. 32A is a view corresponding to mode 1.1.2-a) to explain a readout operation performed when a two-side portrait original O is reproduced on a two-side landscape sheet with rotation.

FIG. 32B is a view corresponding to mode 1.1.2-b) to explain a readout operation performed when one-side portrait originals O are reproduced on a two-side landscape sheet with rotation.

Figure 32C:
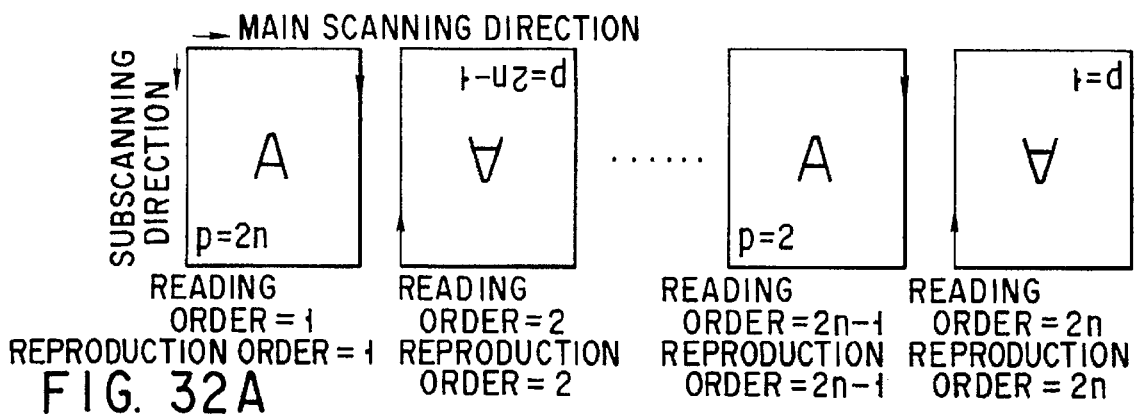
Figure 32C:
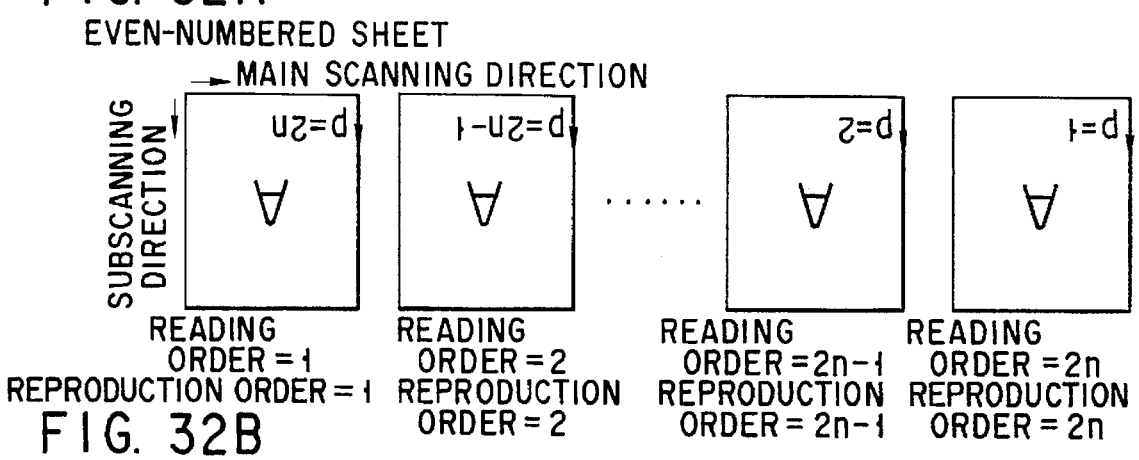
Figure 32C:
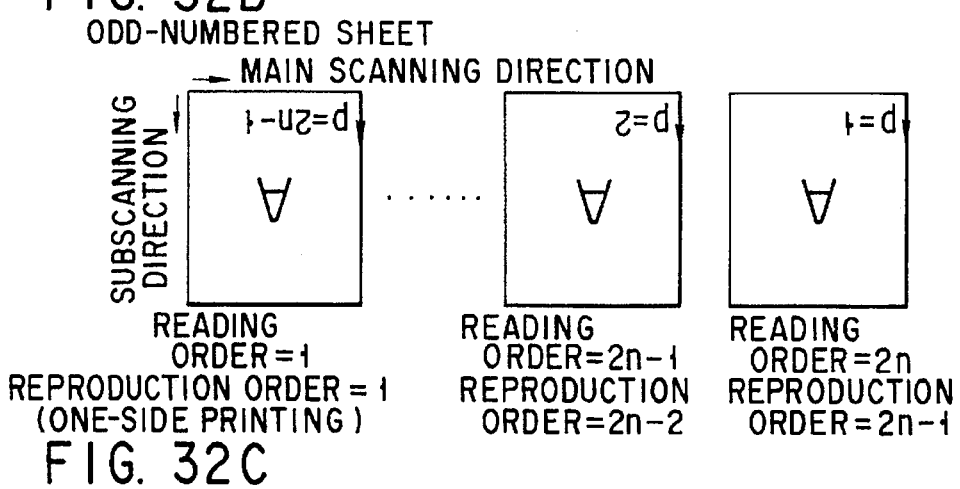

FIG. 32C is a view for explaining an operation performed when the number of originals is an odd number in the operation in FIG. 32B.

Figure 32D:
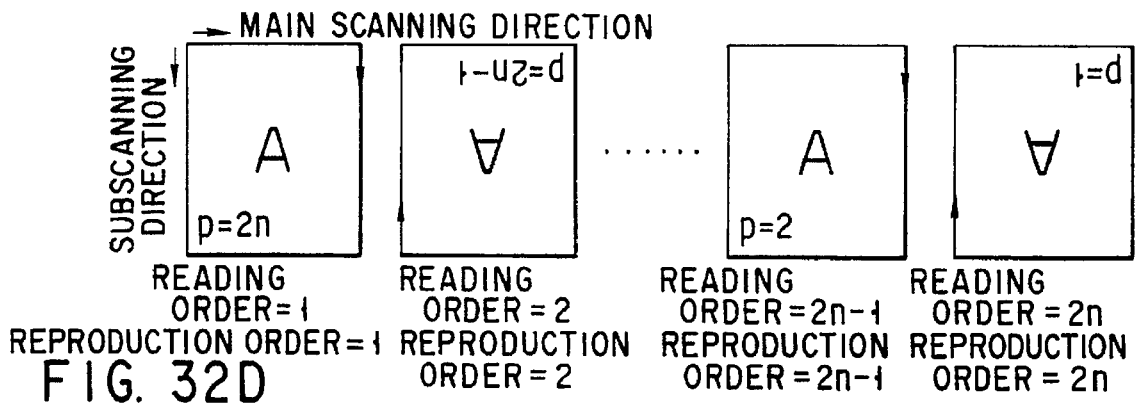

FIG. 32D is a view corresponding to mode 1.1.2-c) to explain a readout operation performed when a two-side portrait original O is reproduced on one-side landscape sheets with rotation.

Figure 33A:
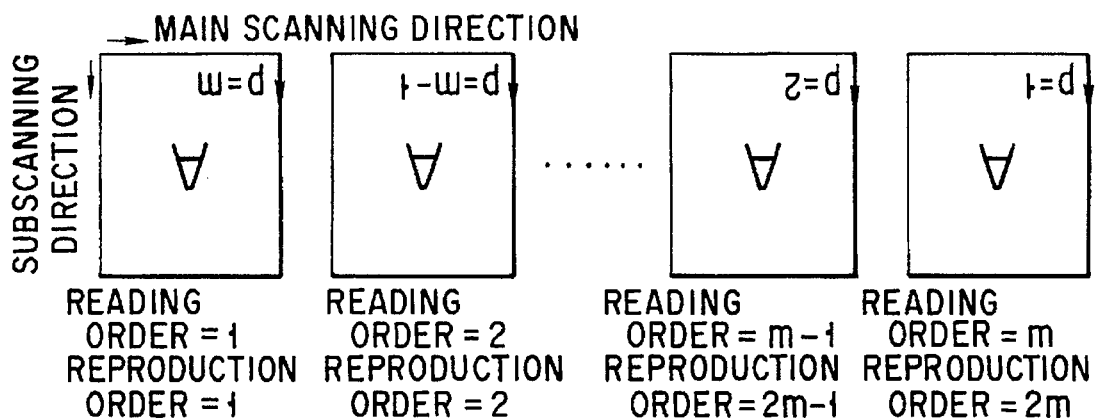
FIGS. 33A to 33C are views for explaining still another storage direction or still another read start position or read direction of each image in the page memory.

FIG. 33A is a view corresponding to mode 1.1.2-d) to explain a readout operation performed when a one-side portrait original O is reproduced on a two-side landscape sheet with rotation. The operation for an even-numbered page is identical to that for an odd-numbered page.

Figure 33B:
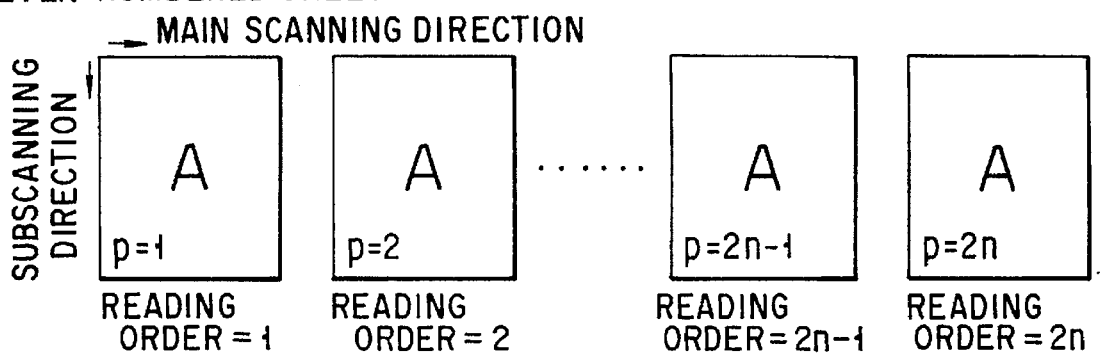

FIG. 33B is a view for explaining data in the page memory 23 when a portrait original O is manually set on the original table 63.

In manual setting, the originals O are oriented in the same direction regardless of the one- and two-side originals O. In addition, the input order is an order from the first page.

Figure 33C:
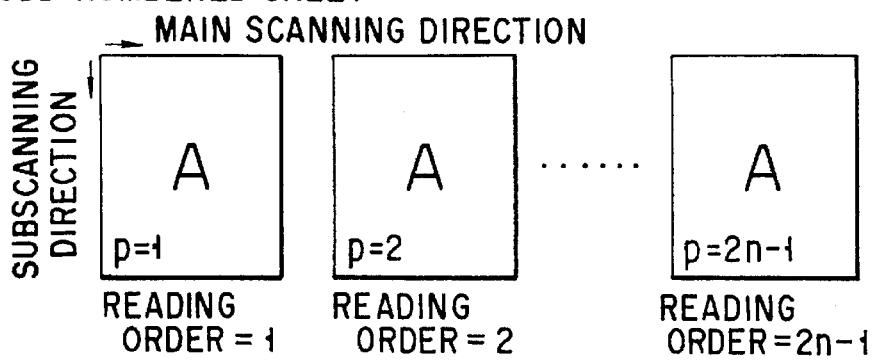

FIG. 33C is a view for explaining an operation identical to that in FIG. 33B except that the number of originals is an odd number.

Figure 34A:
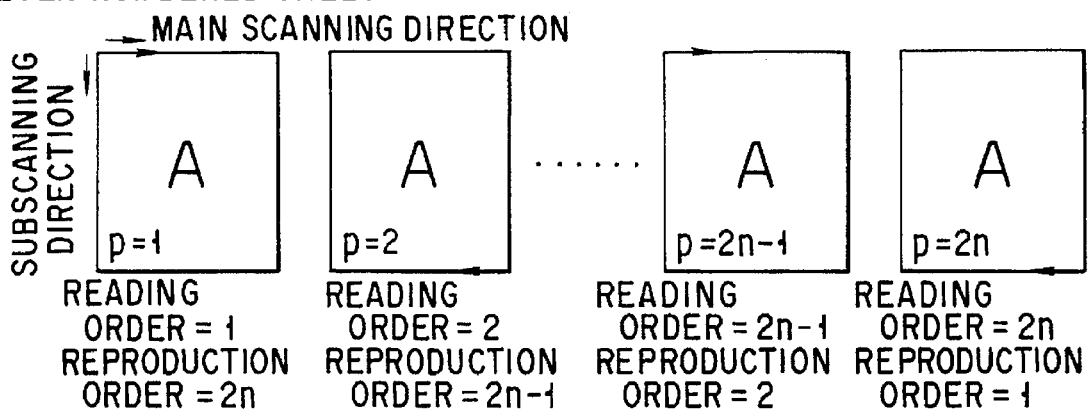
FIGS. 34A to 34C are views for explaining still another storage direction or still another read start position or read direction of each image in the page memory.

FIG. 34A is a view corresponding to mode 1.2.1-a) to explain a readout operation for reproducing a manually set portrait original O on a two-side portrait sheet.

Figure 34B:
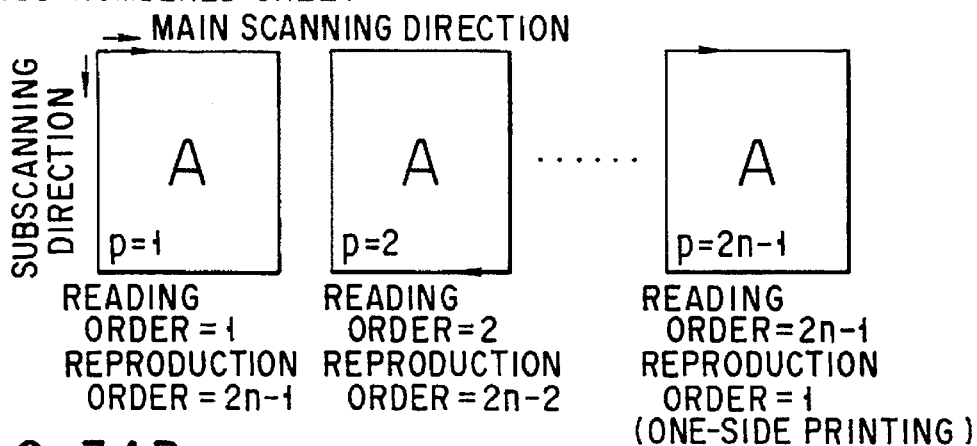

FIG. 34B is a view for explaining an operation identical to that of FIG. 34A except that the number of originals is an odd number.

Figure 34C:
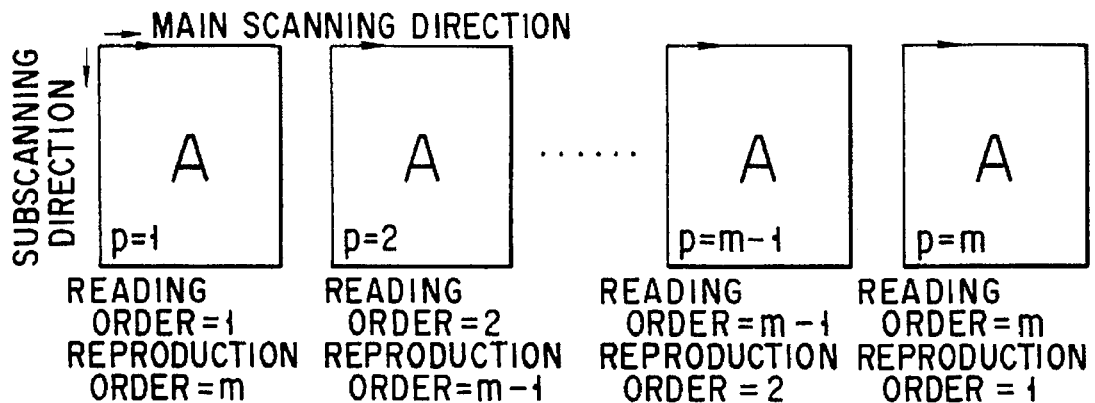

FIG. 34C is a view corresponding to mode 1.2.1-b) to explain a readout operation for reproducing a manually set portrait original O on a one-side portrait sheet.

Figure 35A:
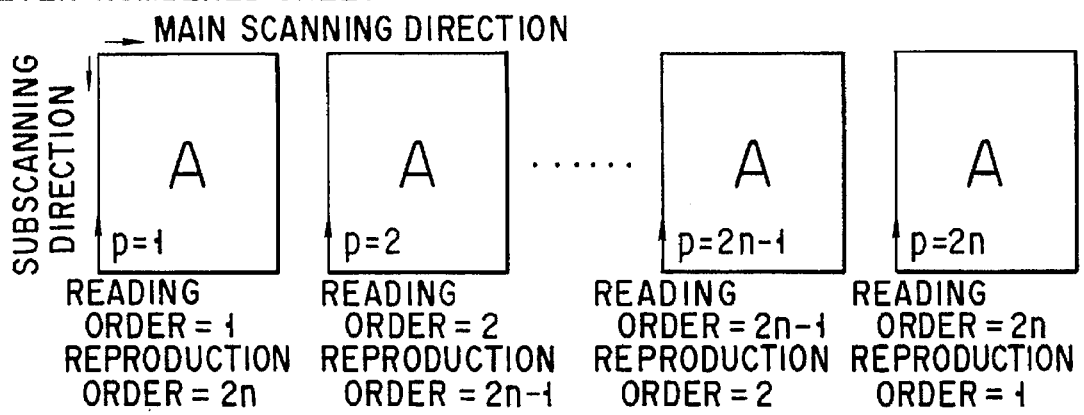
FIGS. 35A to 35C are views for explaining still another storage direction or still another read start position or read direction of each Image in the page memory.

FIG. 35A is a view corresponding to mode 1.2.2-a) to explain a readout operation for reproducing a manually set portrait original O on a two-side landscape sheet with rotation.

Figure 35B:
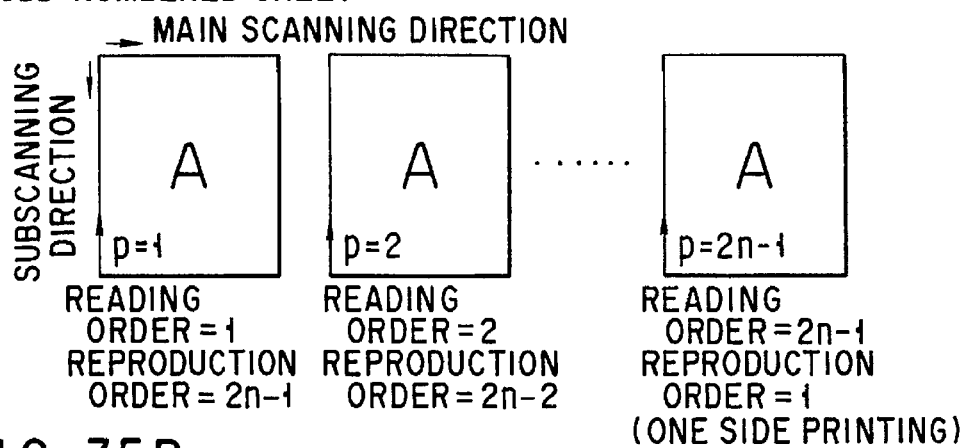

FIG. 35B is a view for explaining an operation identical to that of FIG. 35A except that the number of originals is an odd number.

Figure 35C:
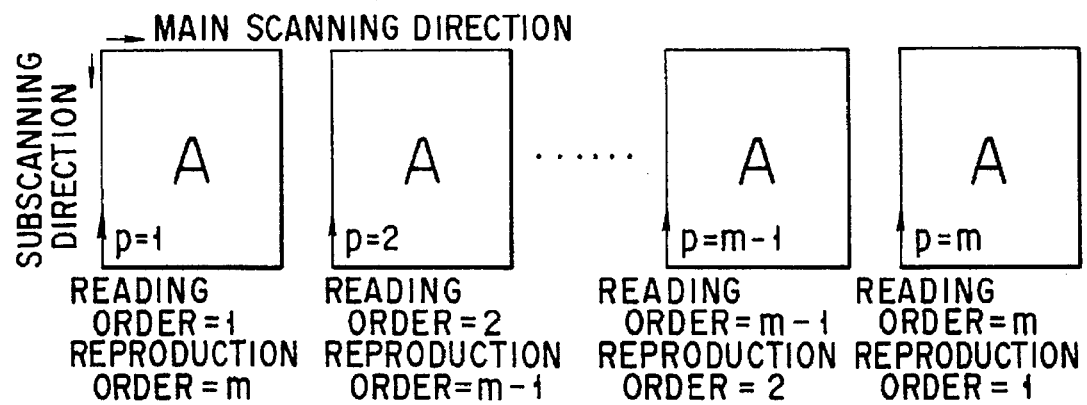

FIG. 35C is a view corresponding to mode 1.2.2-b) to explain a readout operation for reproducing a manually set portrait original O on a one-side landscape sheet with rotation.

Operations for aligning the vertical direction of originals O with the main scanning direction and outputting the input images will be described below.

These operations correspond to FIGS. 36A to 40C.

Figure 36A:
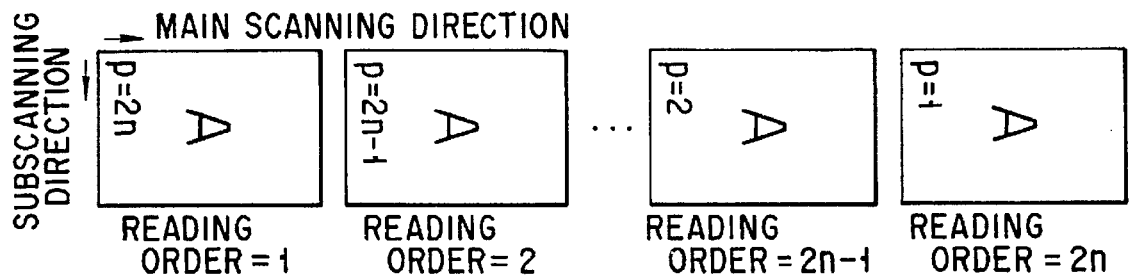
FIGS. 36A to 36C are views for explaining still another storage direction or still another read start position or read direction of each image in the page memory.

FIG. 36A explains the posture of the images in the page memory when two-side portrait originals O are input by the ADF 61. The originals are not reversed upside down unlike in vertical alignment of the subscanning direction.

Figure 36B:
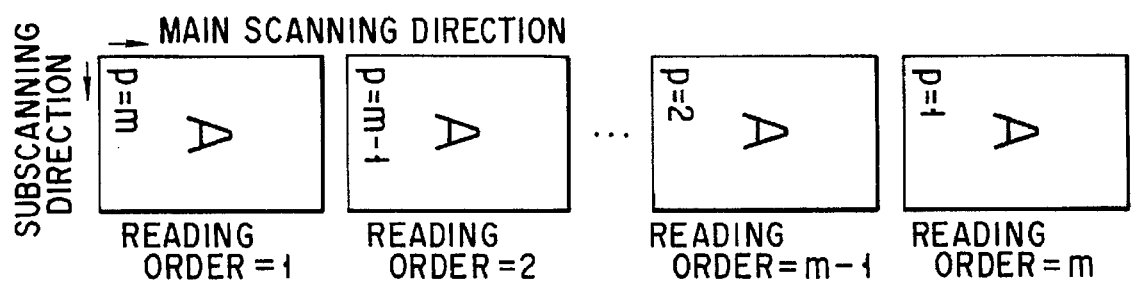

FIG. 36B explains the posture of the images in the page memory 23 when one-side portrait originals O are input by the ADF 61. The image of each even-numbered sheet is identical to that of each odd-numbered sheet.

Figure 36C:
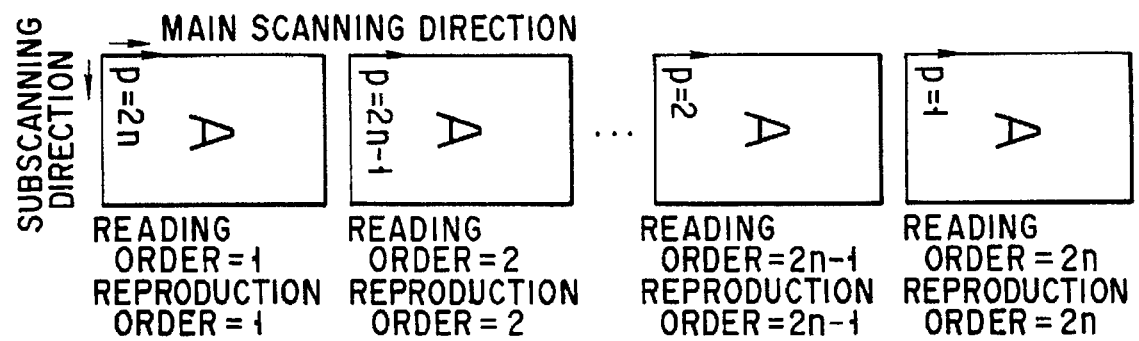

FIG. 36C is a view corresponding to mode 2.1.1-a) to explain an operation for reproducing the image data input in FIG. 36A on a two-side portrait sheet. In this case, the readout order is the same as the input order.

Figure 37A:
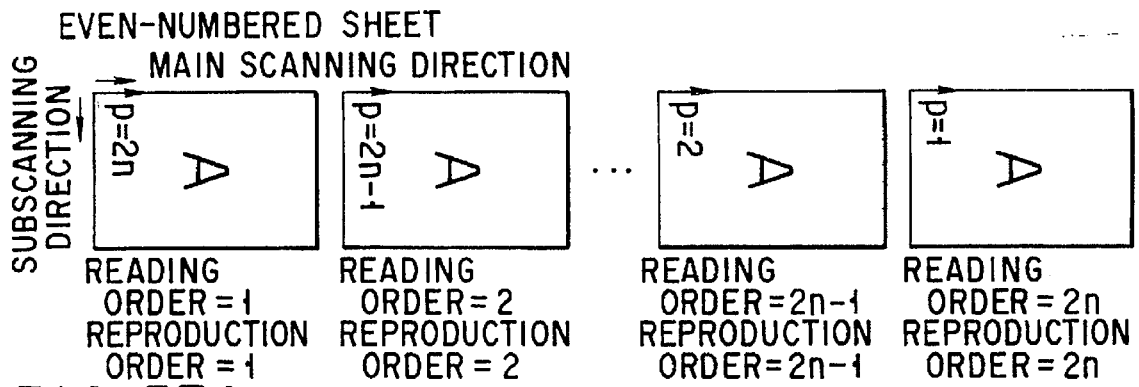
FIGS. 37A to 37D are views for explaining still another storage direction or still another read start position or read direction of each image in the page memory.
Figure 37B:
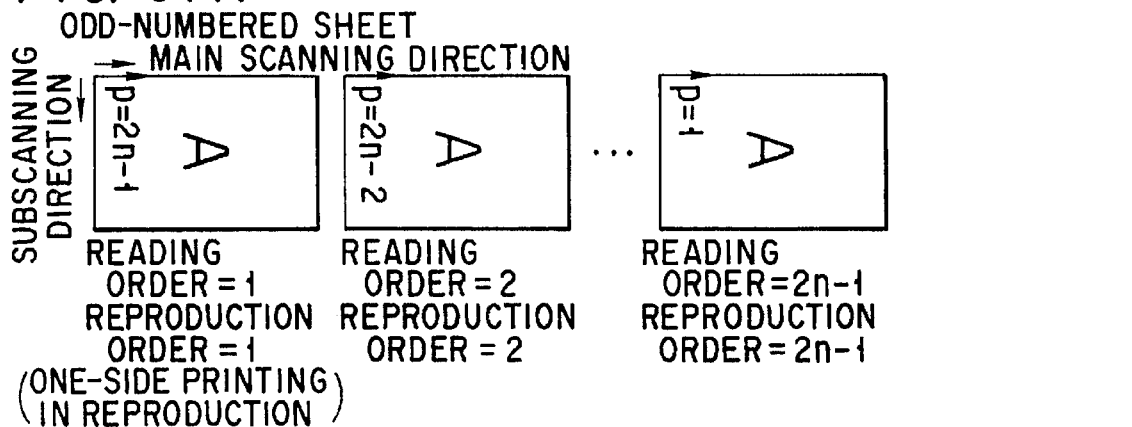

FIGS. 37A and 37B are views for explaining a readout operation for reproducing images input in FIG. 36B are reproduced on two-side sheets. FIG. 37A shows reproduction on even-numbered sheets, while FIG. 37B shows reproduction on odd-numbered sheets. In this case, the readout order is the same as the input order unlike in alignment of the subscanning direction. The first image must be reproduced on a one-side sheet.

Figure 37C:
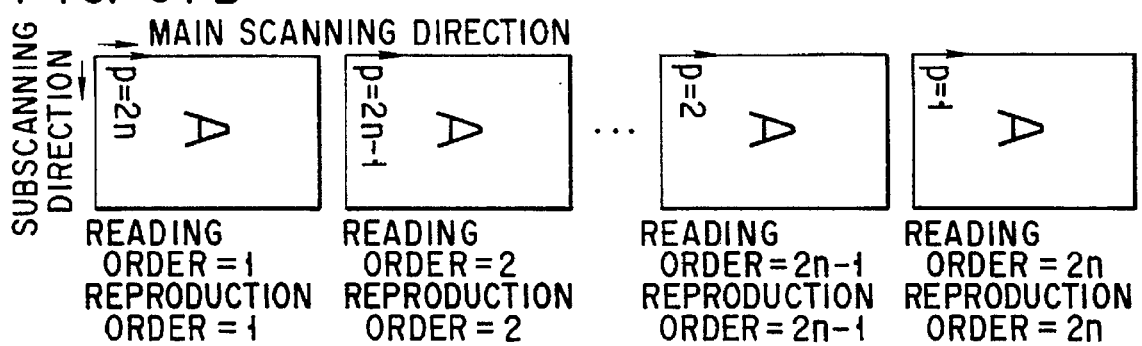

FIG. 37C is a view corresponding to 2.1.1-c) to explain a readout operation for reproducing a two-side portrait original on one-side landscape sheets.

Figure 37D:
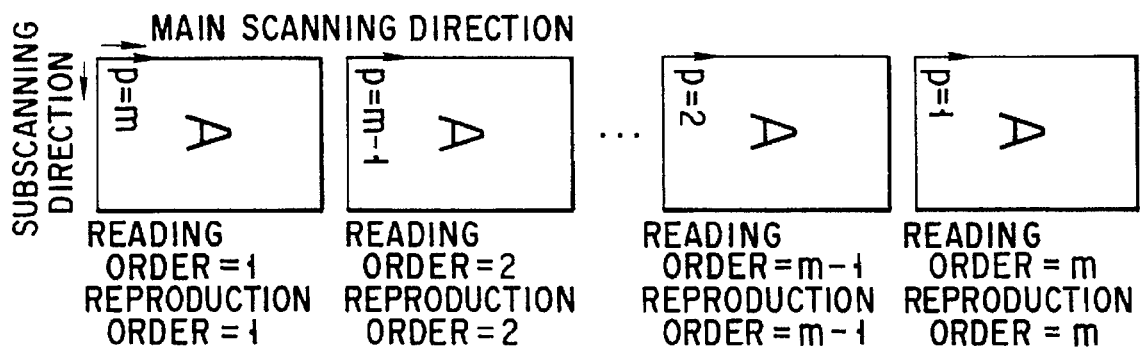

FIG. 37D is a view corresponding to 2.1.1-d) to explain a readout operation for reproducing a one-side portrait original on a one-side landscape sheet.

Figure 38A:
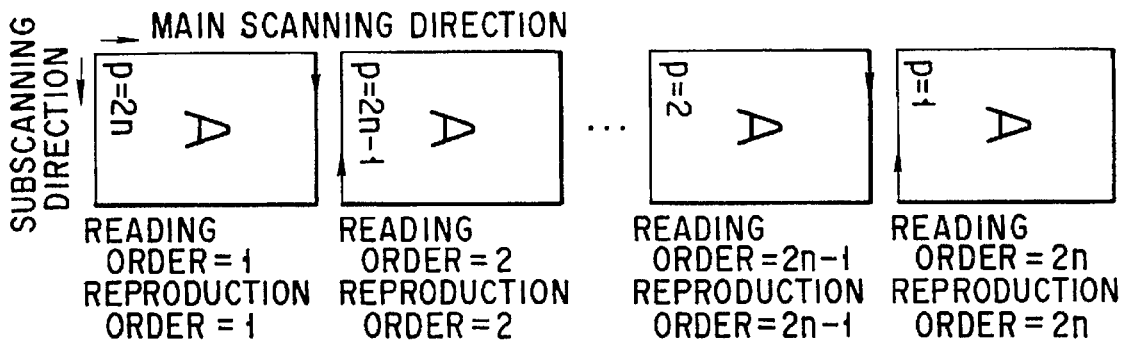
FIGS. 38A to 38D are views for explaining still another storage direction or still another read start position or read direction of each image in the page memory.

FIG. 38A is a view corresponding to 2.1.2-a) to explain a readout operation for reproducing a two-side portrait original on a two-side portrait sheet with rotation.

Figure 38B:
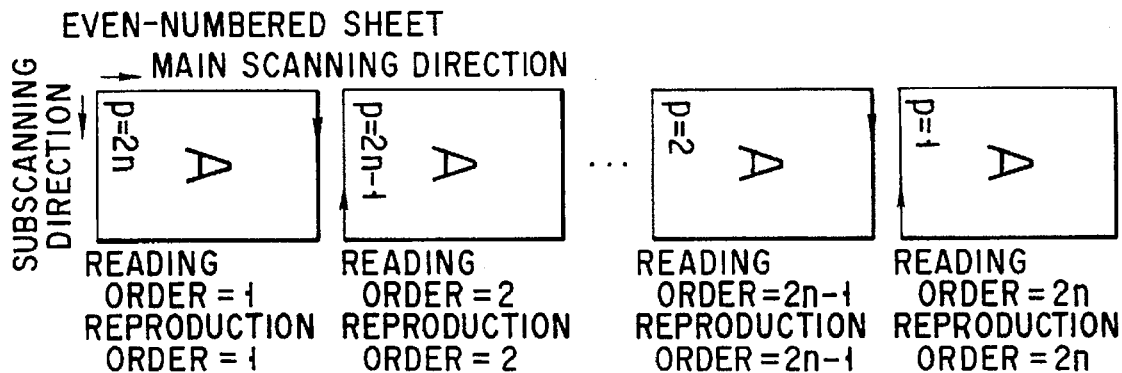

FIG. 38B is a view corresponding to 2.1.2-b) to explain a readout operation for reproducing a one-side portrait original on a two-side portrait sheet with rotation.

Figure 38C:
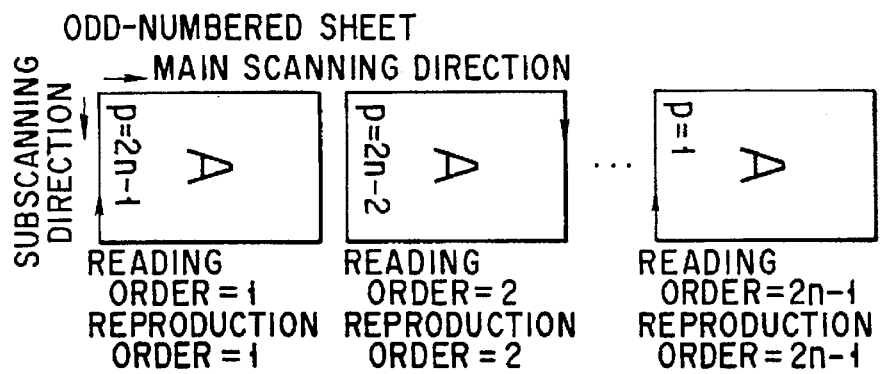

FIG. 38C is a view for explaining an operation identical to that of FIG. 38B except that the number of originals is an odd number.

Figure 38D:
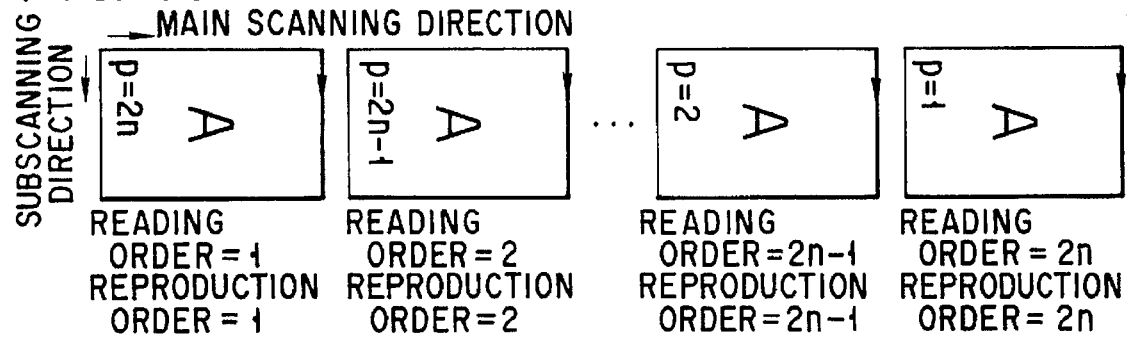

FIG. 38D is a view corresponding to mode 2.1.2-c) to explain a readout operation for reproducing a two-side portrait original on one-side portrait sheets with rotation.

Figure 39A:
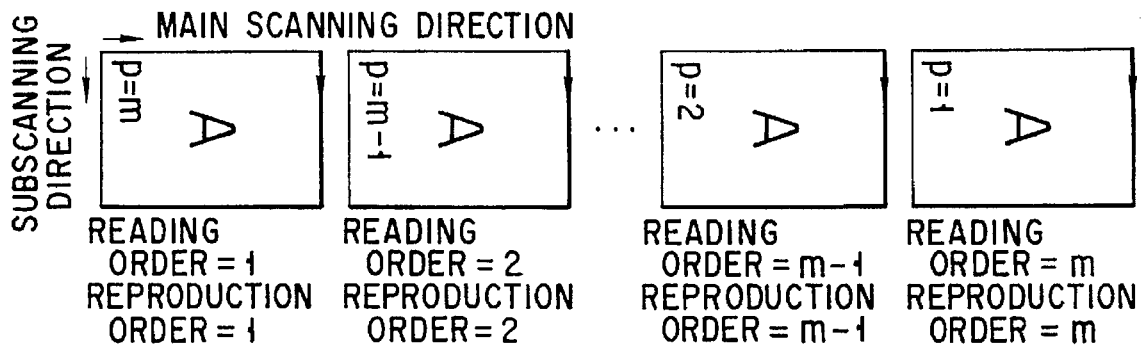
FIGS. 39A to 39D are views for explaining still another storage direction or still another read start position or read direction of each image in the page memory.

FIG. 39A is a view corresponding to 2.1.2-d) to explain a readout operation for reproducing a one-side portrait original on a two-side portrait sheet with rotation. The image of each even-numbered sheet is identical to that of each odd-numbered sheet.

Figure 39B:
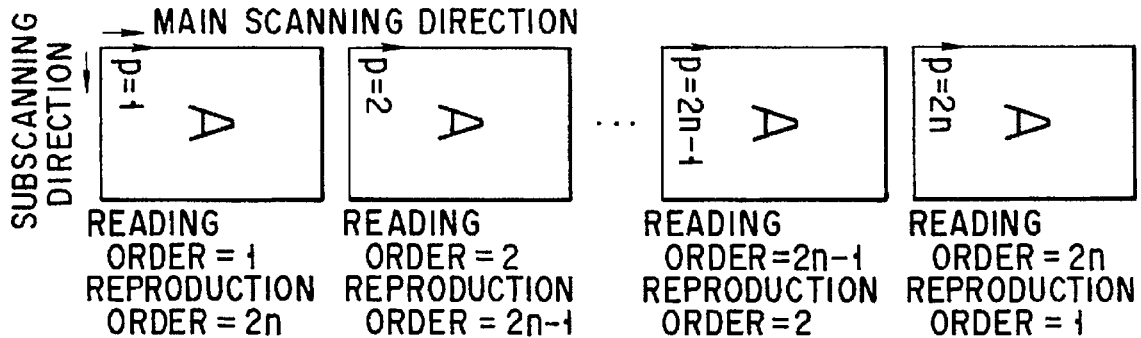

FIG. 39B is a view corresponding to mode 2.2.1-a) to explain a readout operation for reproducing a manually set portrait original O on a two-side landscape sheet.

Figure 39C:
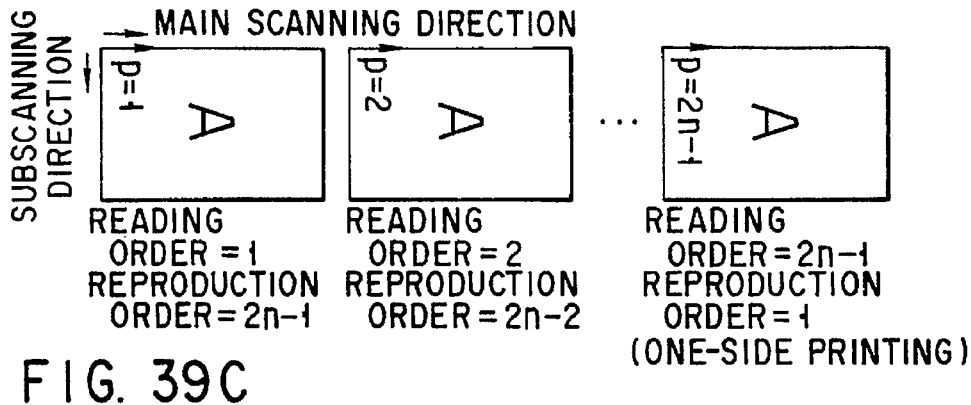

FIG. 39C is a view for explaining an operation 10 identical to that of FIG. 39B except that the number of originals is an odd number.

Figure 39D:
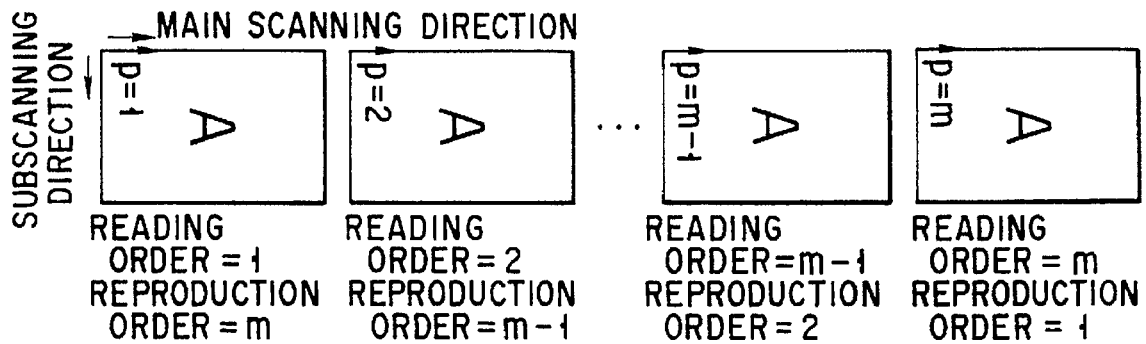

FIG. 39D is a view corresponding to mode 2.2.1-b) to explain a readout operation for reproducing a manually set portrait original O on a one-side landscape sheet.

Figure 40A:
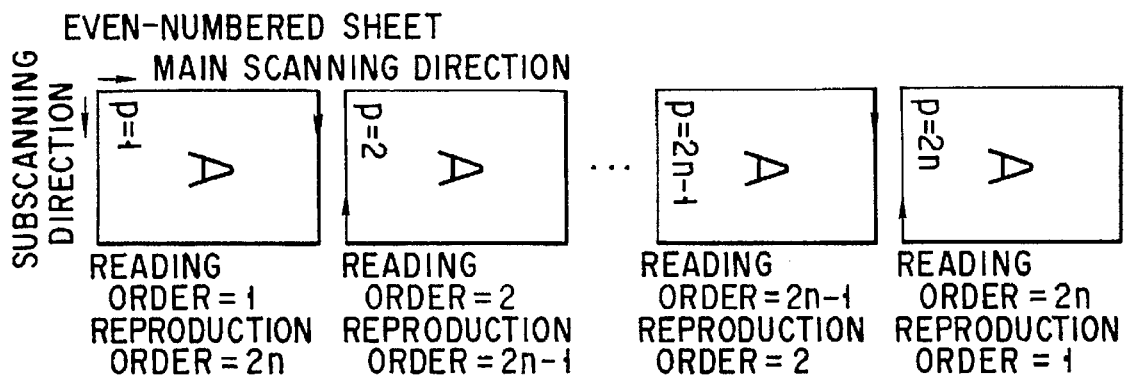
FIGS. 40A to 40D are views for explaining still another storage direction or still another read start position or read direction of each image in the page memory.

FIG. 40A is a view corresponding to mode 2.2.2-a) to explain a readout operation for reproducing a manually set portrait original O on a two-side portrait sheet with rotation.

Figure 40B:
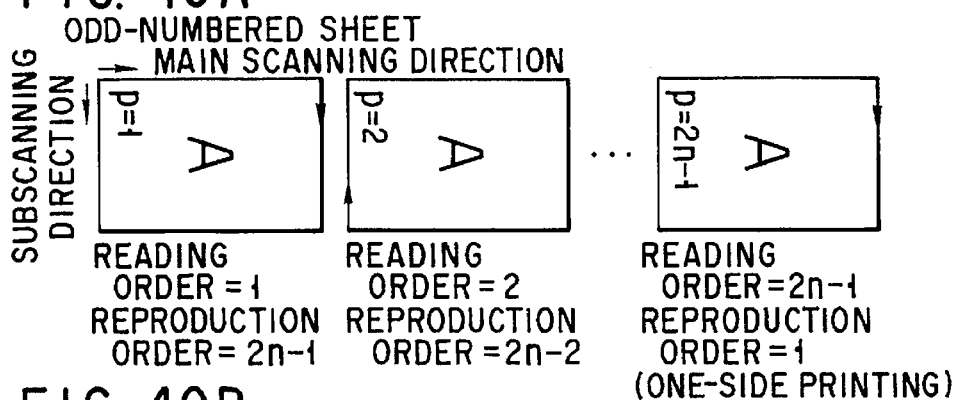

FIG. 40B is a view for explaining an operation identical to that of FIG. 40A except that the number of originals is an odd number.

Figure 40C:
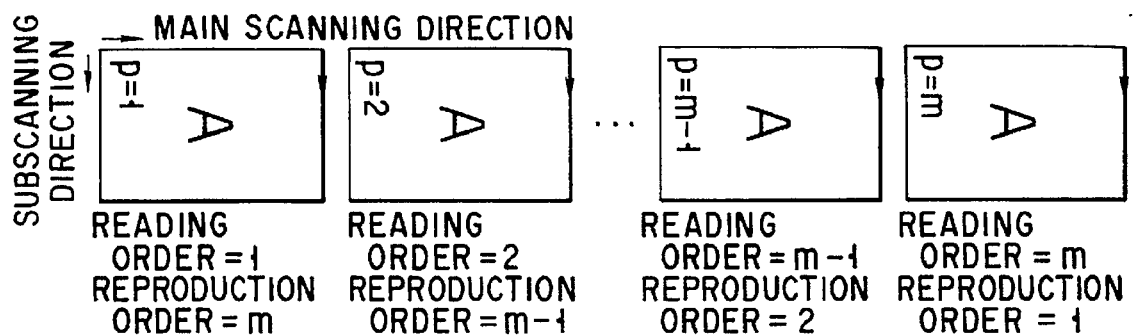
Figure 40D:
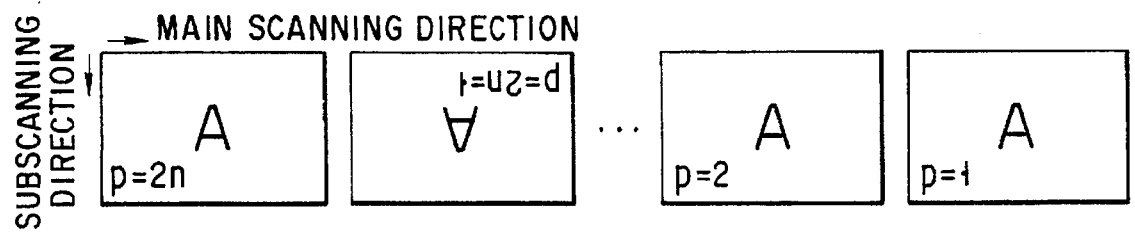

FIG. 40C is a view corresponding to mode 2.2.2-b) to explain a readout operation for reproducing a manually set portrait original O on a one-side portrait sheet with rotation.

Vertical alignment of the landscape original O in the subscanning direction and vertical alignment of the landscape original O in the main scanning direction must also be taken into consideration. The same results as in the portrait originals O can be obtained. This will be described with reference to FIG. 40D. This view is obtained when a landscape original O is read by the ADF 61 with vertical alignment being in the subscanning direction. The result is the same as in FIG. 30A. The readout operation is the same as that in vertical alignment of the subscanning direction, and a detailed description thereof will be omitted.

The following description is concerned with reproduction in each of the above drawings and will be summarized as follows.

In the read operation, the following operations are required.

A two-side original O vertically aligned in the subscanning direction is read by the ADF 61 such that the images are inverted every other page. The first page represents an erect image (or may be an inverted image only this time).

One-side originals O are read by the ADF 61 such that the images are inverted images (or may be an erect image only this time).

Originals vertically aligned in the main scanning direction are read by the ADF 61 such that the images are not inverted.

Originals are read by the ADF 61 from the last page.

Originals are manually read from the first page. The tops or bottoms of the originals are always aligned in the same direction.

The following operations must be performed in reproduction.

Two-Side Reproduction:

Originals O vertically aligned in the subscanning directions are reproduced such that the images are inverted every other page;

Originals O vertically aligned in the main scanning directions are reproduced such that the images are not inverted;

The first reproduced sheet becomes the lowermost sheet (the order is not changed when the copy sheets are turned over); and When the number of originals O is an odd number, the last page must be reproduced on a one-side sheet.

One-Side Reproduction:

The first reproduced sheet becomes the lowermost sheet. In this case, even if the copy sheets are turned over, the order is kept changed. That is, reproduction must be performed from the last page. If the ADD 81 is used, the order may be changed even with reproduction from the first page.

Reproduction with Rotation:

When an original O vertically aligned in the subscanning direction is rotated through 90° and read out, the resultant original is vertically aligned in the main scanning direction; and When an original O vertically aligned in the main scanning direction is rotated through 90° and read out, the resultant original is vertically aligned in the subscanning direction.

The above countermeasures will be summarized as follows.

To read a two-side original O vertically aligned in the subscanning direction by the ADF 61 and reproduce it on a two-side sheet, no special operations are required.

To read a two-side original O vertically aligned in the subscanning direction by the ADF 61 and reproduce it on one-side sheets, the images must be rotated through 180° every other page and reproduced.

To read one-side originals O vertically aligned in the subscanning direction by the ADF 61 and reproduce them on a two-side sheet, the images must be rotated through 180° every other page and reproduced.

To read a one-side original O vertically aligned in the subscanning direction by the ADF 61 and reproduce it on a one-side sheet, no special operations are required.

To read a two-side original O vertically aligned in the subscanning direction by the ADF 61 and reproduce it on a two-side sheet with rotation of 90°, the images must be rotated through 180° every other page and reproduced.

To read a two-side original O vertically aligned in the subscanning direction by the ADF 61 and reproduce it on one-side sheets with rotation of 90°, the images must be rotated through 180° every other page and reproduced.

To read a one-side original O vertically aligned in the subscanning direction by the ADF 61 and reproduce it on a two-side sheet with rotation of 90°, no special operations are required.

To read a one-side original O vertically aligned in the subscanning direction by the ADF 61 and reproduce it on a one-side sheet with rotation of 90°, no special operations are required.

To read a two-side original O vertically aligned in the main scanning direction by the ADF 61 and reproduce it on a two-side sheet, no special operations are required.

To read a two-side original O vertically aligned in the main scanning direction by the ADF 61 and reproduce it on one-side sheets, no special operations are required.

To read one-side originals O vertically aligned in the main scanning direction by the ADF 61 and reproduce them on a two-side sheet, no special operations are required, and the last odd-numbered page is reproduced on a one-side sheet.

To read a one-side original O vertically aligned in the main scanning direction by the ADF 61 and reproduce it on a one-side sheet, no special operations are required.

To read a two-side original O vertically aligned in the main scanning direction by the ADF 61 and reproduce it on a two-side sheet with rotation of 90°, the images must be rotated through 180° every other page and reproduced.

To read a two-side original O vertically aligned in the main scanning direction by the ADF 61 and reproduce it on one-side sheets with rotation of 90°, the images must always be rotated through 90° and reproduced.

To read one-side originals O vertically aligned in the main scanning direction by the ADF 61 and reproduce them on a two-side sheet with rotation of 90°, the images are rotated through 180° every other page and reproduced.

To read a one-side original O vertically aligned in the main scanning direction by the ADF 61 and reproduce it on a one-side sheet with rotation of 90°, the images must always be rotated through 90° and reproduced.

To manually read originals O vertically aligned in the subscanning direction and reproduce them on a two-side sheet, the images must be rotated through 180° every other page and reproduced. The images are reproduced from the last page. The last odd-numbered page must be reproduced on a one-side sheet.

To read a manually set original O vertically aligned in the subscanning direction and reproduce it on a one-side sheet, no special operations are required.

To read manually set originals O vertically aligned in the subscanning direction and reproduce them on a two-side sheet with rotation of 90°, the images must always be rotated through 90° and reproduced. Reproduction is performed from the last page. The last odd-numbered page must be reproduced on a one-side sheet.

To read a manually set original O vertically aligned in the subscanning direction and reproduce it on a one-side sheet with rotation of 90°, the image is always rotated through 90° and reproduced.

To read manually set originals O vertically aligned in the main scanning direction and reproduce them on a two-side sheet, no special operations are required. Reproduction is performed from the last page. The last odd-numbered page is reproduced on a one-side sheet.

To read a manually set original O vertically aligned in the main scanning direction and reproduce it on a one-side sheet, no special operations are required.

To read manually set originals O aligned in the main scanning direction and reproduce them on a two-side sheet with rotation of 90°, the images are rotated through 180° every other page and reproduced. Reproduction is performed from the last page. The last odd-numbered page is reproduced on a one-side sheet.

To read a manually set original O vertically aligned in the main scanning direction and reproduce it on a two-side sheet with rotation of 90°, the images are always rotated through 90° and reproduced.

A method of realizing the sorting function by applying the above embodiments will be described below. More specifically, to allow the operator to easily discriminate one set from another set in reproduction of a plurality of sets, different output directions are set for the copy sheets for two adjacent sets.

A detailed embodiment will be described below.

Modes 1.1.1-*a*) and 1.1.2-*a*) are alternately changed for reproduction in units of sets.

Modes 1.1.1-*b*) and 1.1.2-*b*) are alternately changed for reproduction in units of sets.

Modes 1.1.1-*c*) and 1.1.2-*c*) are alternately changed for reproduction in units of sets.

Modes 1.1.1-*d*) and 1.1.2-*d*) are alternately changed for reproduction in units of sets.

Modes 1.2.1-*a*) and 1.2.2-*a*) are alternately changed for reproduction in units of sets.

Modes 1.2.1-*b*) and 1.2.2-*b*) are alternately changed for reproduction in units of sets.

Modes 2.1.1-*a*) and 2.1.2-*a*) are alternately changed for reproduction in units of sets.

Modes 2.1.1-*b*) and 2.1.2-*b*) are alternately changed for reproduction in units of sets.

Modes 2.1.1-*c*) and 2.1.2-*c*) are alternately changed for reproduction in units of sets.

Modes 2.1.1-*d*) and 2.1.2-*d*) are alternately changed for reproduction in units of sets.

Modes 2.2.1-*a*) and 2.2.2-*a*) are alternately changed for reproduction in units of sets.

Modes 2.2.1-*b*) and 2.2.2-*b*) are alternately changed for reproduction in units of sets.

This reproduction is based on an assumption that the pages are bound on the right or left side. In binding the pages on the top or bottom ends, the reproduction procedures for vertical alignment in the main scanning direction are performed for vertical alignment in the subscanning direction, and vice versa.

The reproduction orders with respect to the original reading orders and the readout directions of the odd- and even-numbered pages in the 24 copy modes will be described below.

1. Vertical Alignment in Subscanning Direction 1.1 Reading by ADF 61

1.1.1-*a*) Two-Side Portrait Original O→Two-Side Portrait Sheet Reproduction

Reproduction Order: The same as the reading order

Readout Direction of Pages:

Odd-Numbered Page: Readout is started from the upper right corner in the right main scanning direction and the lower subscanning direction (0°).

Even-Numbered Page: Readout is started from the upper left corner in the right main scanning direction and the lower subscanning direction (0°).

1.1.1-*b*) One-Side Portrait Original O→Two-Side Portrait Sheet Reproduction

Reproduction Order: The same as the reading order

Readout Direction of Pages:

Odd-Numbered Page: Readout is started from the upper left corner in the right main scanning direction and the lower subscanning direction (0°), and the reproduction start page is reproduced on a one-side sheet.

Even-Numbered Page: Readout is started from the lower right corner in the left main scanning direction and the upper subscanning direction 180°).

1.1.1-c) Two-Side Portrait Original O→One-Side Portrait Sheet Reproduction

Reproduction Order: The same as the reading order

Readout Direction of Pages:

Odd-Numbered Page: Readout is started from the upper left corner in the right main scanning direction and the lower subscanning direction 0°).

Even-Numbered Page: Readout is started from the lower right corner in the left main scanning direction and the upper subscanning direction 180°).

1.1.1-d) One-Side Portrait Original O→One-Side Portrait Sheet Reproduction

Reproduction Order: The same as the reading order

Readout Direction of Pages:

Odd-Numbered Page: Readout is started from the upper left corner in the right main scanning direction and the lower subscanning direction (0°).

Even-Numbered Page: Readout is started from the upper corner in the right main scanning direction and the lower subscanning direction (0°).

1.1.2-a) Two-Side Portrait Original O→Two-Side Landscape Sheet Reproduction with Rotation Reproduction Order: The same as the reading order Readout Direction of Pages:

Odd-Numbered Page: Readout is started from the lower left corner in the upper main scanning direction and the right subscanning direction (90° clockwise).

Even-Numbered Page: Readout is started from the upper right corner in the lower main scanning direction and the left subscanning direction (90° counterclockwise).

1.1.2-b) One-Side Portrait Original O→Two-Side Landscape Sheet Reproduction with Rotation Reproduction Order: The same as the reading order Readout Direction of Pages:

Odd-Numbered Page: Readout is started from the upper right corner in the lower main scanning direction and the left subscanning direction (90° clockwise), and the reproduction start page is reproduced on a one-side sheet.

Even-Numbered Page: Readout is started from the upper right corner in the lower main scanning direction and the left subscanning direction (90° clockwise).

1.1.2-c) Two-Side Portrait Original O→One-Side Landscape Sheet Reproduction with Rotation Reproduction Order: The same as the reading order Readout Direction of Pages:

Odd-Numbered Page: Readout is started from the lower left corner in the upper main scanning direction and the right subscanning direction (90° clockwise).

Even-Numbered Page: Readout is started from the upper right corner in the lower main scanning direction and the left subscanning direction (90° counterclockwise).

1.1.2-d) One-Side Portrait Original O→One-Side Landscape Sheet Reproduction with Rotation Reproduction Order: The same as the reading order Readout Direction of Pages:

Odd-Numbered Page: Readout is started from the upper right corner in the lower main scanning direction and the left subscanning direction (90° counterclockwise).

Even-Numbered Page: Readout is started from the upper right corner in the lower main scanning direction and the left subscanning direction (90° counterclockwise).

1.2 Manual Setting 1.2.1-a) Portrait Original O→Two-Side Portrait Sheet Reproduction Reproduction Order: Opposite to the reading order Readout Direction of Pages:

Odd-Numbered Page: Readout is started from the upper left corner in the right main scanning direction and the lower subscanning direction (0°), the reproduction start page is printed on a one-side page, and the page is reversed by the ADD 81.

Even-Numbered Page: Readout is started from the lower right corner in the left main scanning direction and the upper subscanning direction (180°).

1.2.1-b) Portrait Original O→One-Side Portrait Sheet Reproduction

Reproduction Order: Opposite to the reading order

Readout Direction of Pages:

Odd-Numbered Page: Readout is started from the upper left corner in the right main scanning direction and the lower subscanning direction (0°).

Even-Numbered Page: Readout is started from the upper left corner in the right main scanning direction and the lower subscanning direction (0°).

1.2.2-a) Portrait Original O→Two-Side Portrait Sheet Reproduction

Reproduction Order: Opposite to the reading order

Readout Direction of Pages:

Odd-Numbered Page: Readout is started from the lower left corner in the upper main scanning direction and the right subscanning direction (90° clockwise), and the reproduction start page is printed on a one-side sheet.

Even-Numbered Page: Readout is started from the lower left corner in the upper main scanning direction and the right subscanning direction (90° clockwise).

1.2.2-b) Portrait Original O→One-Side Landscape Sheet Reproduction

Reproduction Order: Opposite to the reading order

Readout Direction of Pages:

Odd-Numbered Page: Readout is started from the lower left corner in the upper main scanning direction and the right subscanning direction (90° clockwise).

Even-Numbered Page: Readout is started from the lower left corner in the upper main scanning direction and the right subscanning direction (90° clockwise).

2. Vertical Alignment in Main Scanning Direction 2.1 Reading by ADF 61

2.1.1-a) Two-Side Portrait Original O→Two-Side Landscape Sheet Reproduction

Reproduction Order: The same as the reading order

Readout Direction of Pages:

Odd-Numbered Page: Readout is started from the upper left corner in the right main scanning direction and the lower subscanning direction (0°).

Even-Numbered Page: Readout is started from the upper left corner in the right main scanning direction and the lower subscanning direction (0°).

2.1.1-b) One-Side Portrait Original O→Two-Side Landscape Sheet Reproduction

Reproduction Order: The same as the reading order

Readout Direction of Pages:

Odd-Numbered Page: Readout is started from the upper left corner in the right main scanning direction and the lower subscanning direction (0°), and the reproduction start page is reproduced on a one-side sheet.

Even-Numbered Page: Readout is started from the upper right corner in the right main scanning direction and the lower subscanning direction (0°).

2.1.1-c) Two-Side Portrait Original O→One-Side Landscape Sheet Reproduction

Reproduction Order: The same as the reading order

Readout Direction of Pages:

Odd-Numbered Page: Readout is started from the upper left corner in the right main scanning direction and the lower subscanning direction (0°).

Even-Numbered Page: Readout is started from the upper left corner in the right main scanning direction and the lower subscanning direction (0°).

2.1.1-*d*) One-Side Portrait Original O→One-Side Landscape Sheet Reproduction

Reproduction Order: The same as the reading order
Readout Direction of Pages:

Odd-Numbered Page: Readout is started from the upper left corner in the right main scanning direction and the lower subscanning direction (0°).

Even-Numbered Page: Readout is started from the upper left corner in the right main scanning direction and the lower subscanning direction (0°).

2.1.2-*a*) Two-Side Portrait Original O→Two-Side Portrait Sheet Reproduction with Rotation Reproduction Order: The same as the reading order
Readout Direction of Pages:

Odd-Numbered Page: Readout is started from the lower left corner in the upper main scanning direction and the right subscanning direction (90° clockwise).

Even-Numbered Page: Readout is started from the upper right corner in the lower main scanning direction and the left subscanning direction (90° counterclockwise).

2.1.2-*b*) One-Side Portrait Original O→Two-Side Portrait Sheet Reproduction with Rotation Reproduction Order: The same as the reading order
Readout Direction of Pages:

Odd-Numbered Page: Readout is started from the lower left corner in the upper main scanning direction and the right subscanning direction (90° clockwise), and the reproduction start page is printed on a one-side sheet.

Even-Numbered Page: Readout is started from the upper right corner in the lower main scanning direction and the left subscanning direction (90° counterclockwise).

2.1.2-*c*) One-Side Portrait Original O→One-Side Portrait Sheet Reproduction with Rotation Reproduction Order: The same as the reading order
Readout Direction of Pages:

Odd-Numbered Page: Readout is started from the upper right corner in the lower main scanning direction and the left subscanning direction (90° counterclockwise).

Even-Numbered Page: Readout is started from the upper right corner in the lower main scanning direction and the left subscanning direction (90° counterclockwise).

2.1.2-*d*) One-Side Portrait Original O→One-Side Portrait Sheet Reproduction with Rotation Reproduction Order: The same as the reading order
Readout Direction of Pages:

Odd-Numbered Page: Readout is started from the upper right corner in the lower main scanning direction and the left subscanning direction (90° counterclockwise).

Even-Numbered Page: Readout is started from the upper right corner in the lower main scanning direction and the left subscanning direction (90° counterclockwise).

2.2 Manual Setting 2.2.1-*a*) Portrait Original O→Two-Side Landscape Sheet Reproduction Reproduction Order: Opposite to the reading order
Readout Direction of Pages:

Odd-Numbered Page: Readout is started from the upper left corner in the right main scanning direction and the lower subscanning direction (0°), and the reproduction start page is printed on a one-side page.

Even-Numbered Page: Readout is started from the upper left corner in the right main scanning direction and the lower subscanning direction (0°).

2.2.1-*b*) Portrait Original O→One-Side Portrait Sheet Reproduction

Reproduction Order: Opposite to the reading order
Readout Direction of Pages:

Odd-Numbered Page: Readout is started from the upper left corner in the right main scanning direction and the lower subscanning direction (0°).

Even-Numbered Page: Readout is started from the upper left corner in the right main scanning direction and the lower subscanning direction (0°).

2.2.2-*a*) Portrait Original O→Two-Side Portrait Sheet Reproduction

Reproduction Order: Opposite to the reading order
Readout Direction of Pages:

Odd-Numbered Page: Readout is started from the upper right corner in the lower main scanning direction and the left subscanning direction (90° counterclockwise), and the reproduction start page is printed on a one-side sheet.

Even-Numbered Page: Readout is started from the lower left corner in the upper main scanning direction and the right subscanning direction (90° clockwise).

2.2.2-*b*) Portrait Original O→One-Side Portrait Sheet Reproduction

Reproduction Order: Opposite to the reading order
Readout Direction of Pages:

Odd-Numbered Page: Readout is started from the lower left corner in the upper main scanning direction and the right subscanning direction (90° clockwise).

Even-Numbered Page: Readout is started from the lower left corner in the upper main scanning direction and the right subscanning direction (90° clockwise).

Operations for printing a large number of originals O obtained in these reproduction orders and readout directions will be described below.

A method of outputting copy sheets output angularly shifted by 90° and stapled at the same position on one side (upper left corner of the copy sheets) in units of sets will be described below.

First of all, operations for aligning the vertical direction of originals O with the subscanning direction and outputting input images on the copy sheets will be described below. These operations correspond to FIGS. 41A to 46C.

Figure 41A:
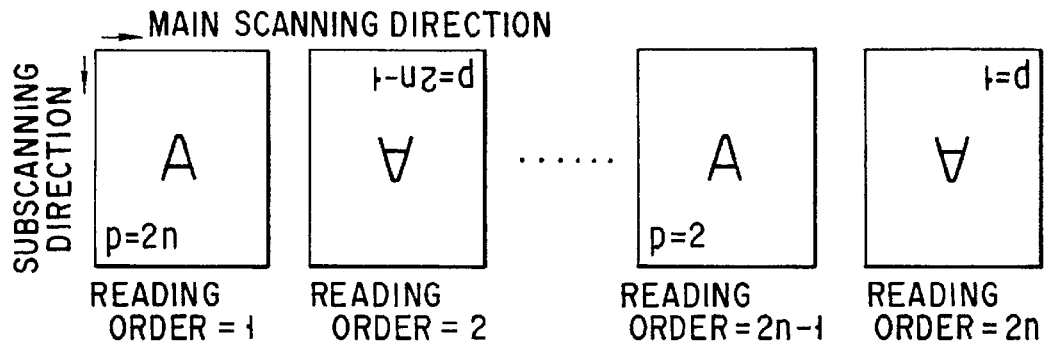
FIGS. 41A to 41D are views for explaining still another storage direction or still another read start position or read direction of each image in the page memory.

FIG. 41A explains the posture of an image obtained when a two-side portrait original O is input.

Figure 41B:
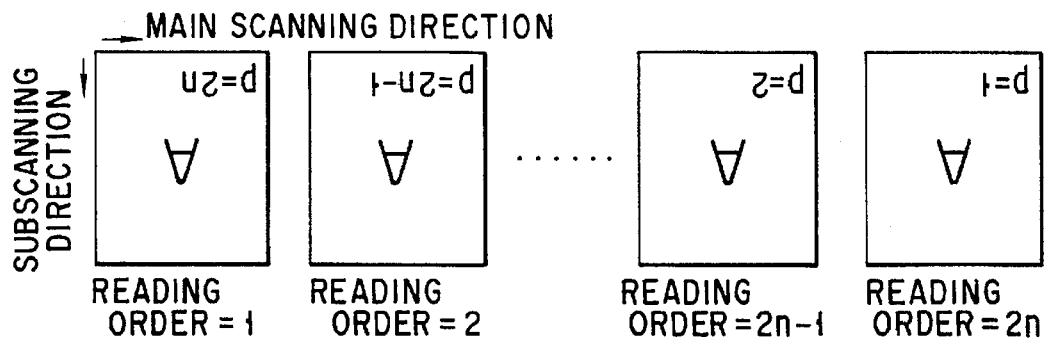
Figure 41C:
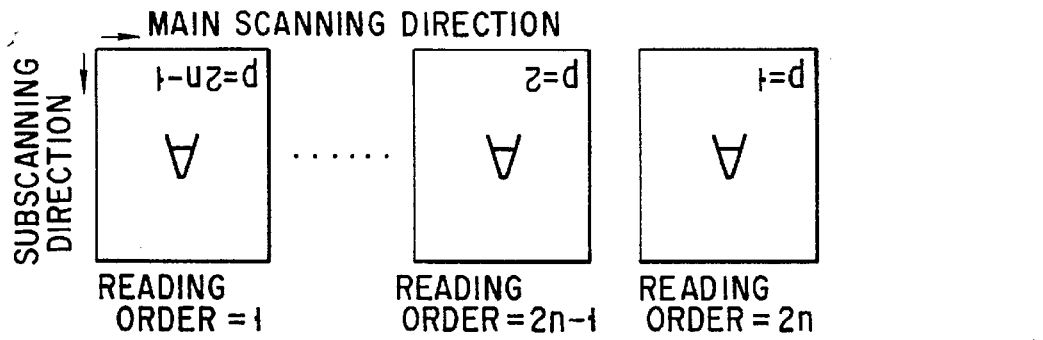

FIGS. 41B and 41C are views upon input of a one-side portrait original O by means of the ADF 61 and correspond to the case in FIG. 41A.

Figure 41D:
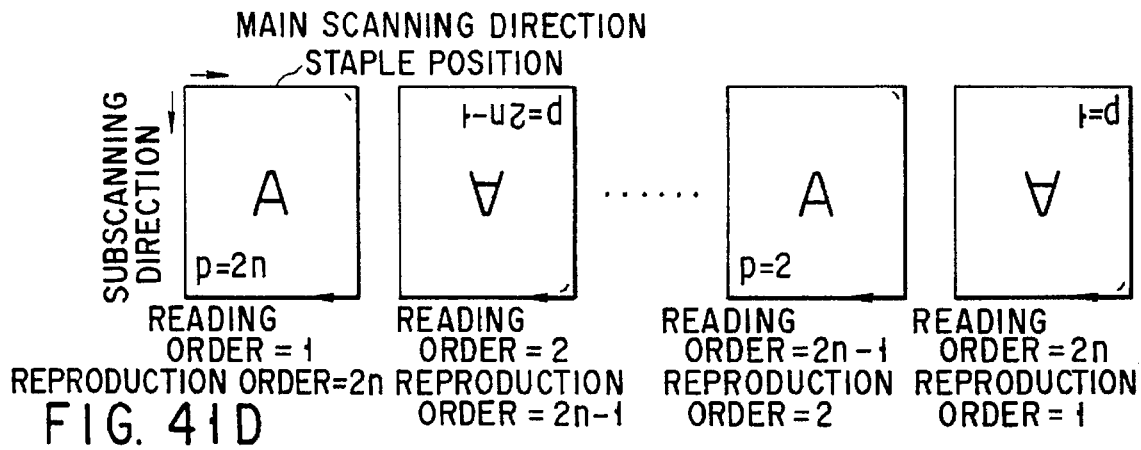

FIG. 41D is a view corresponding to mode 1.1.1-*a*) to explain an operation for reproducing the image data input in FIG. 41A on a two-side portrait sheet in consideration of a staple position.

In this case, the staple position must be considered to be a start side with respect to the main scanning direction and an end side with respect to the subscanning direction. That is, the reproduction order must be reversed, and the output order is reverse to the input order. As a result, copies bound at their left side are obtained.

Figure 42A:
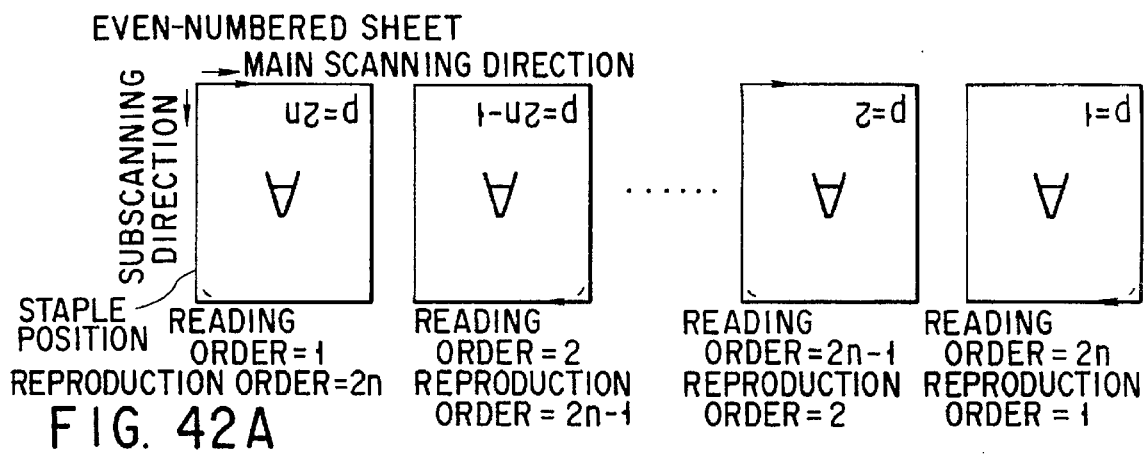
FIGS. 42A to 42D are views for explaining still another storage direction or still another read start position or read direction of each image in the page memory.
Figure 42B:
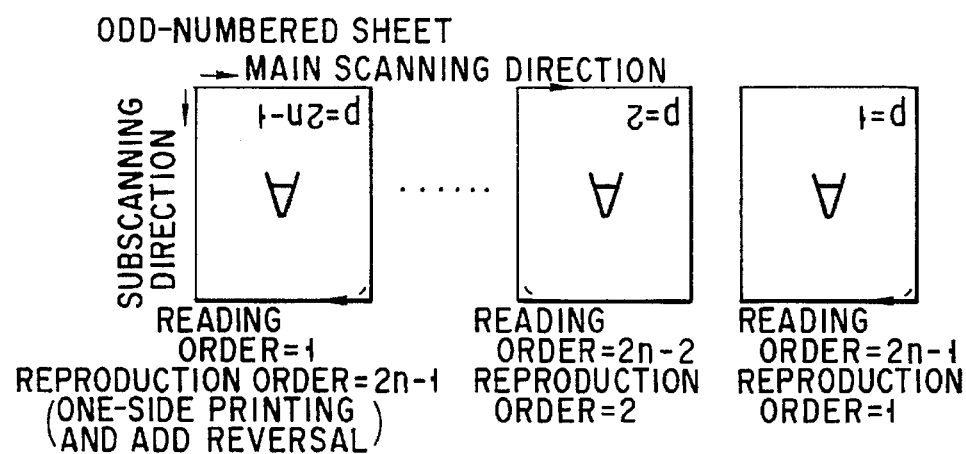

FIG. 42A corresponds to mode 1.1.1-*b*) to explain a readout operation for reproducing the image data input in FIG. 41B on a two-side sheet, and FIG. 42B corresponds to 1.1.1-*b*) to explain a readout operation for reproducing the image data input in FIG. 41C. In this case, the entire reproduction order is reversed in consideration of the staple position. In addition, the odd-numbered pages must be rotated through 180° and read out. If the last original is an odd-numbered page, the last odd-numbered page is printed on a one-side sheet and must be reversed by the ADD 81 so as to be aligned with the remaining reproduced products.

Figure 42C:
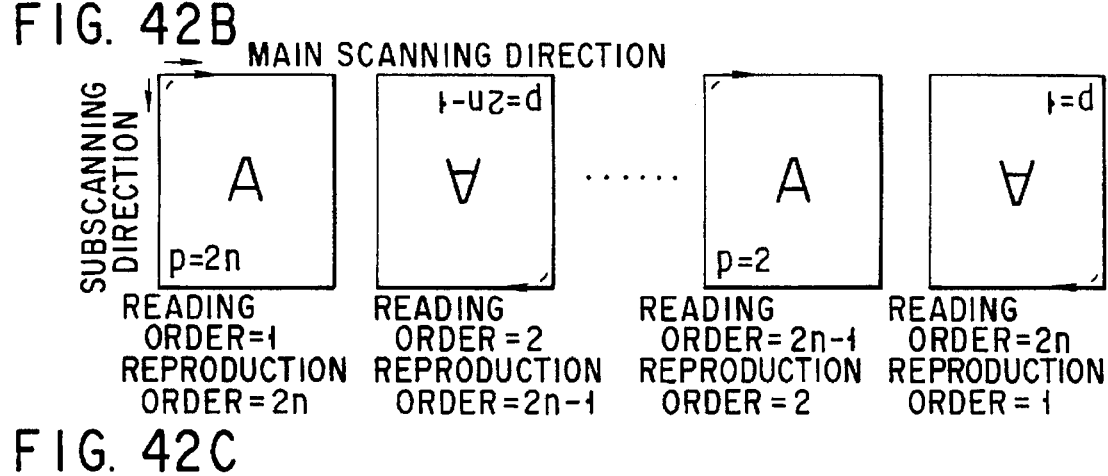

FIG. 42C is a view corresponding to an operation for reproducing a two-side portrait original O on one-side portrait sheets. In this case, the reproduction order must be reversed, and at the same time, the odd-numbered pages must be read out with rotation of 180°. In addition, the total reproduction output must be reversed by the ADD 81.

The operations will be briefly described below.

Figure 42D:
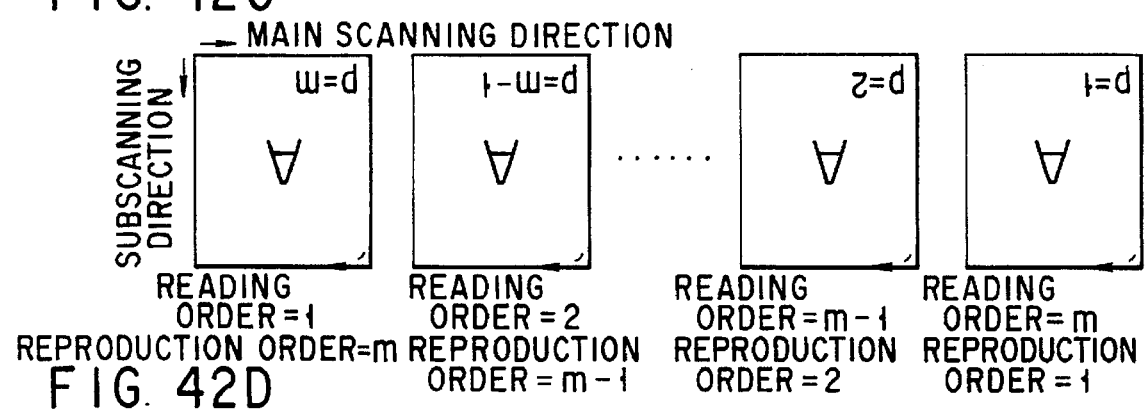

FIG. 42D is a view corresponding to 1.1.1-d) to explain a readout operation performed when a one-side portrait original O is reproduced on a one-side portrait sheet.

Figure 43A:
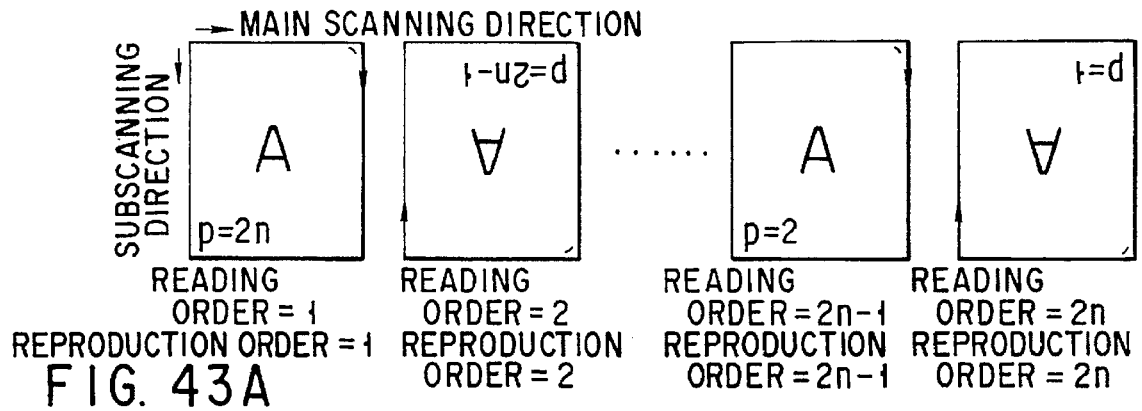
FIGS. 43A to 43D are views for explaining still another storage direction or still another read start position or read direction of each image in the page memory.

FIG. 43A is a view corresponding to 1.1.2-a) to explain a readout operation performed when a two-side portrait original O is reproduced on a two-side landscape sheet with rotation.

Figure 43B:
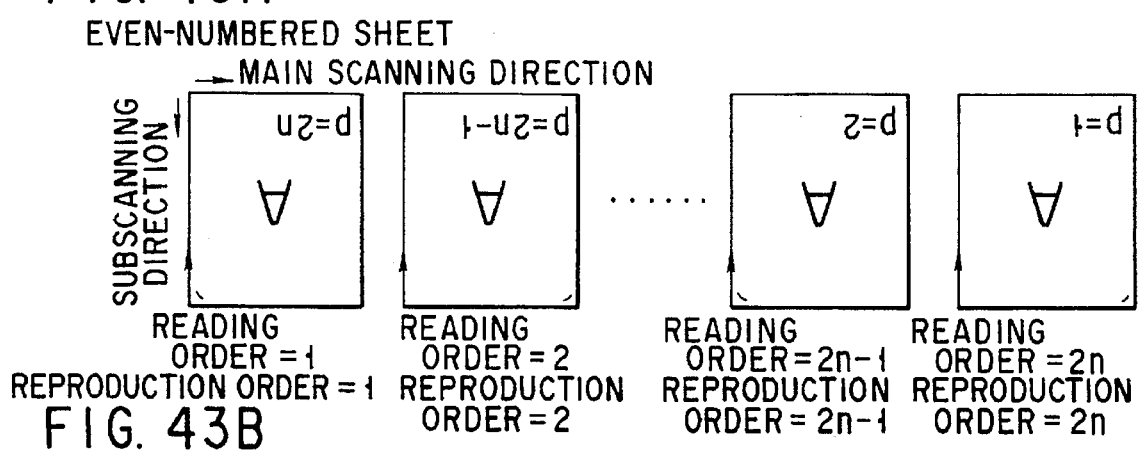

FIG. 43B is a view corresponding to 1.1.2-b) to explain a readout operation performed when a one-side portrait original O is reproduced on a two-side landscape sheet with rotation.

Figure 43C:
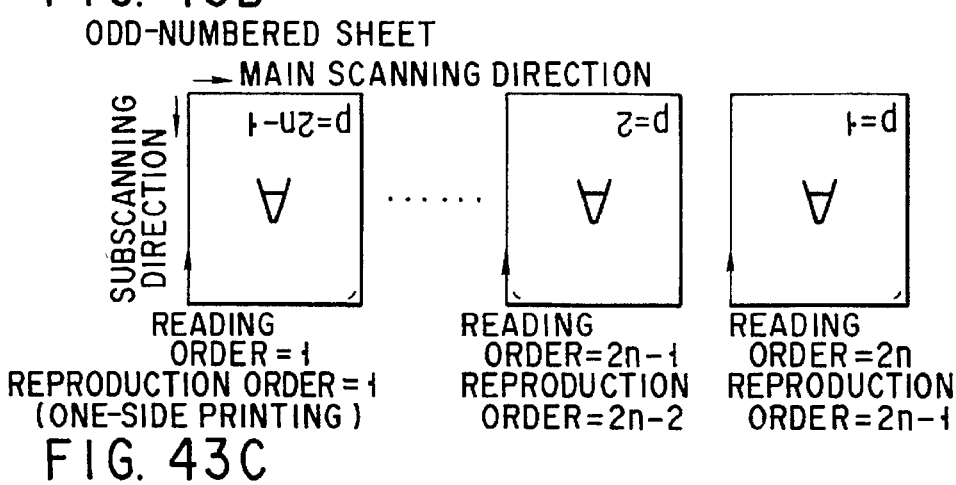

FIG. 43C is a view for explaining an operation performed when the number of originals is an odd number in the operation in FIG. 43B.

Figure 43D:
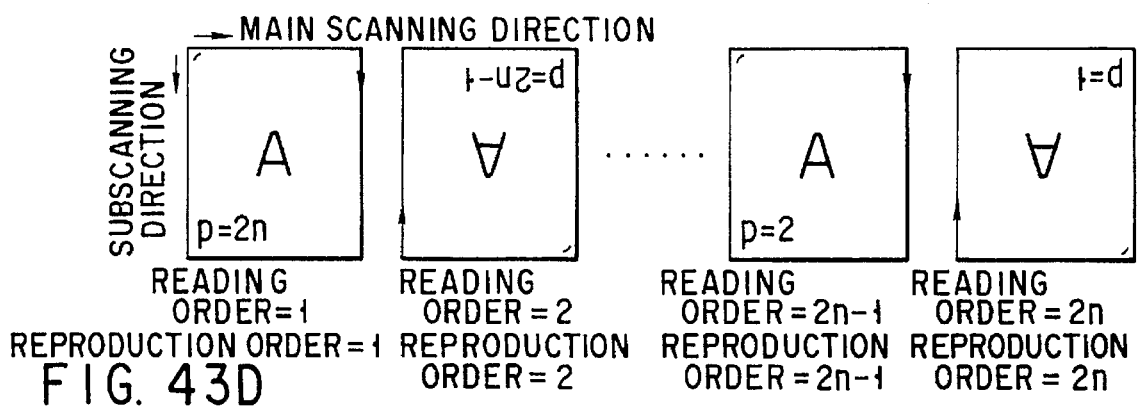

FIG. 43D is a view corresponding to 1.1.2-c) to explain a readout operation performed when a two-side portrait original 0 is reproduced on one-side landscape sheets with rotation.

Figure 44A:
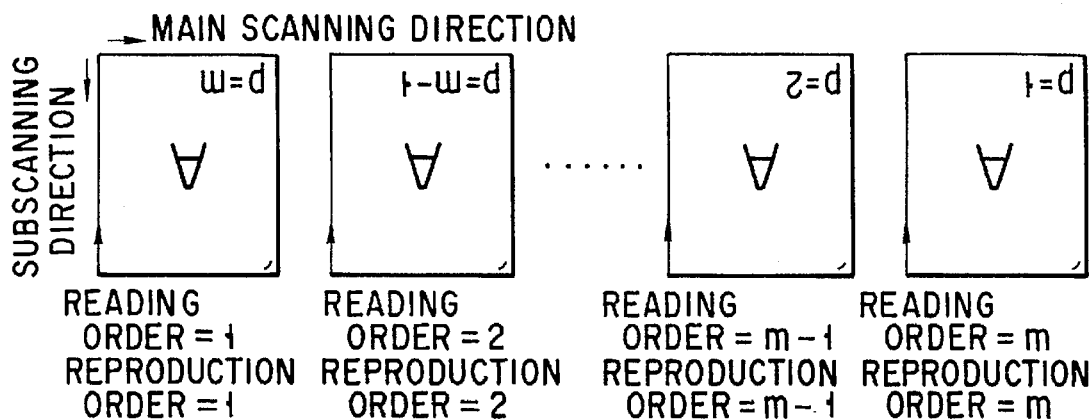
FIGS. 44A to 44C are views for explaining still another storage direction or still another read start position or read direction of each image in the page memory.

FIG. 44A is a view corresponding to 1.1.2-d) to explain a readout operation performed when a one-side portrait original O is reproduced on a two-side landscape sheet with rotation. The operation for an even-numbered page is identical to that for an odd-numbered page.

Figure 44B:
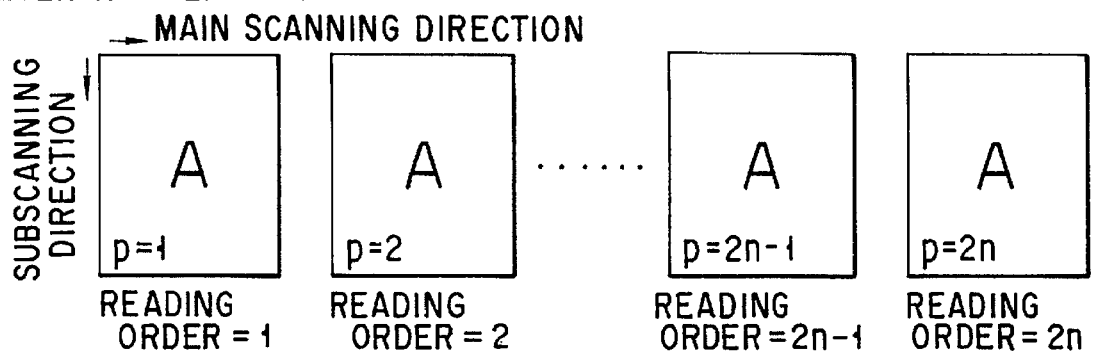

FIG. 44B is a view for explaining data in the page memory 23 when a portrait original O is manually set on the original table 63.

Figure 44C:
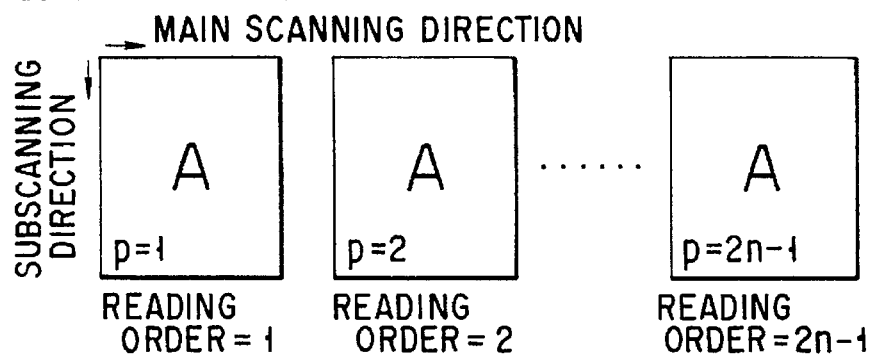

FIG. 44C is a view for explaining an operation identical to that in FIG. 44B except that the number of originals is an odd number. This operation is identical to that in FIGS. 33A and 33B.

Figure 45A:
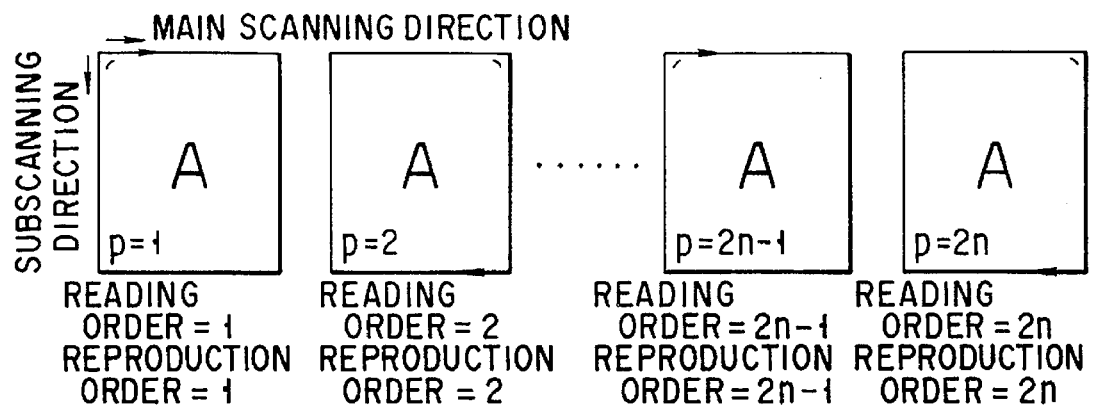
FIGS. 45A to 45C are views for explaining still another storage direction or still another read start position or read direction of each image in the page memory.

FIG. 45A is a view corresponding to mode 1.2.1-a) to explain a readout operation for reproducing a manually set portrait original O on a two-side portrait sheet.

Figure 45B:
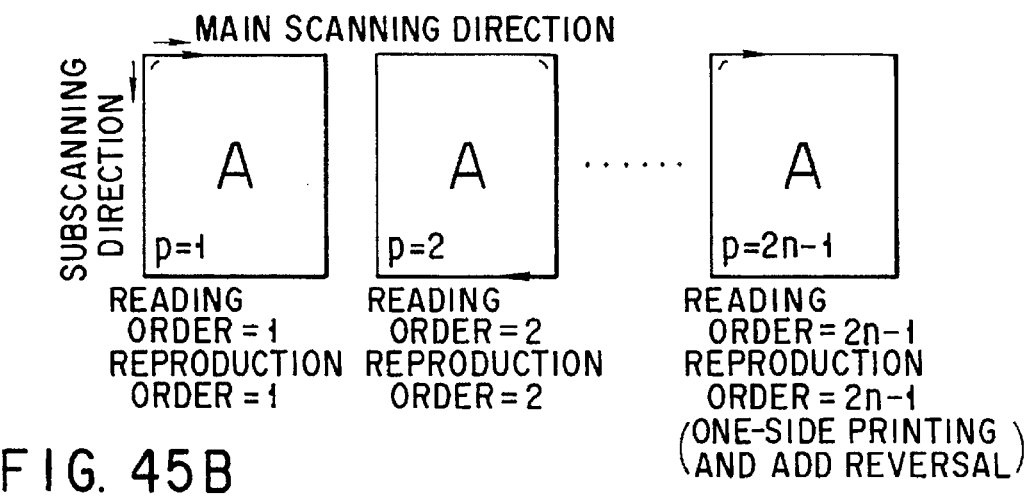

FIG. 45B is a view for explaining an operation identical to that of FIG. 44A except that the number of originals is an odd number.

Figure 45C:
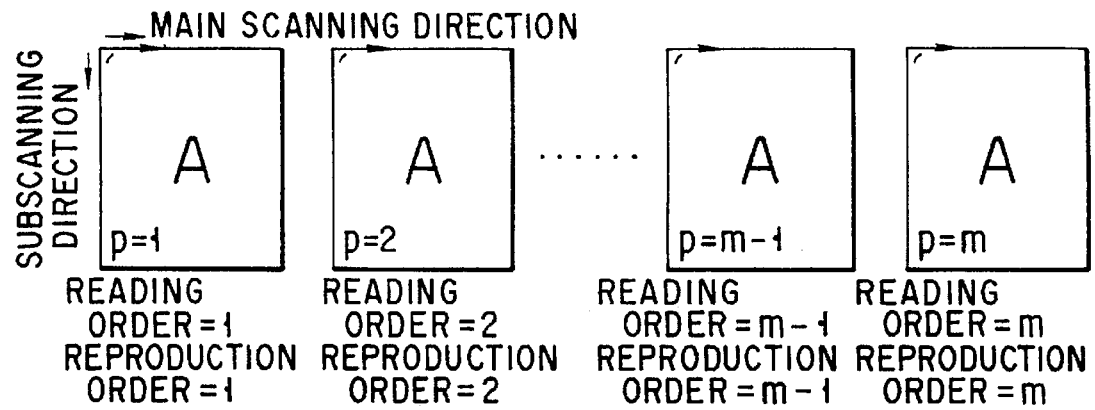

FIG. 45C is a view corresponding to mode 1.2.1-b) to explain a readout operation for reproducing a manually set portrait original O on a one-side portrait sheet.

Figure 46A:
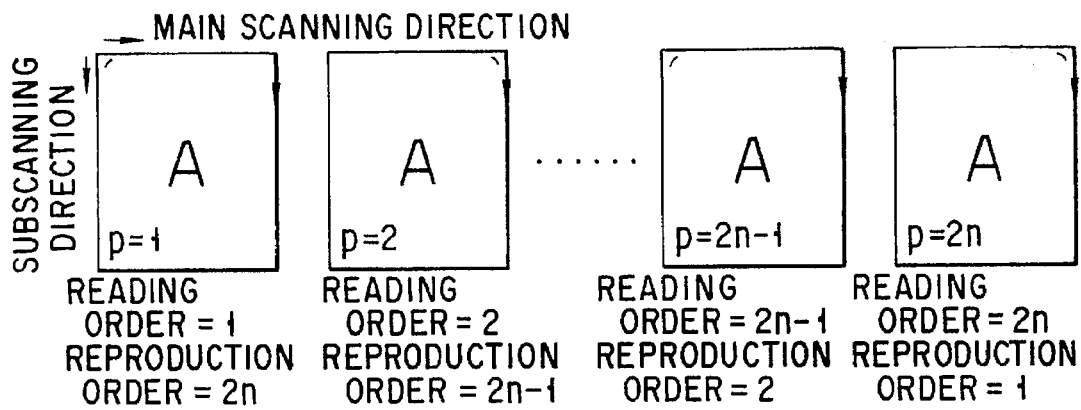
FIGS. 46A to 46C are views for explaining still another storage direction or still another read start position or read direction of each image in the page memory.

FIG. 46A is a view corresponding to mode 1.2.2-a) to explain a readout operation for reproducing a manually set portrait original O on a two-side landscape sheet with rotation.

Figure 46B:
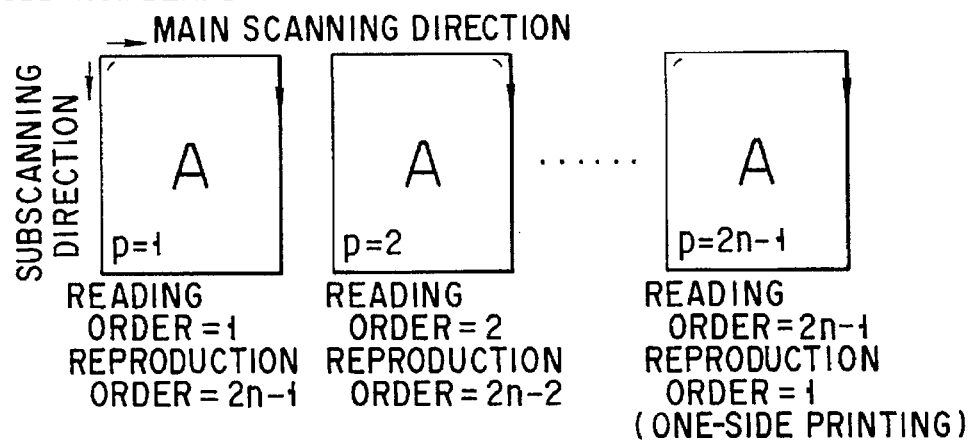

FIG. 46B is a view for explaining an operation identical to that of FIG. 45A except that the number of originals is an odd number.

Figure 46C:
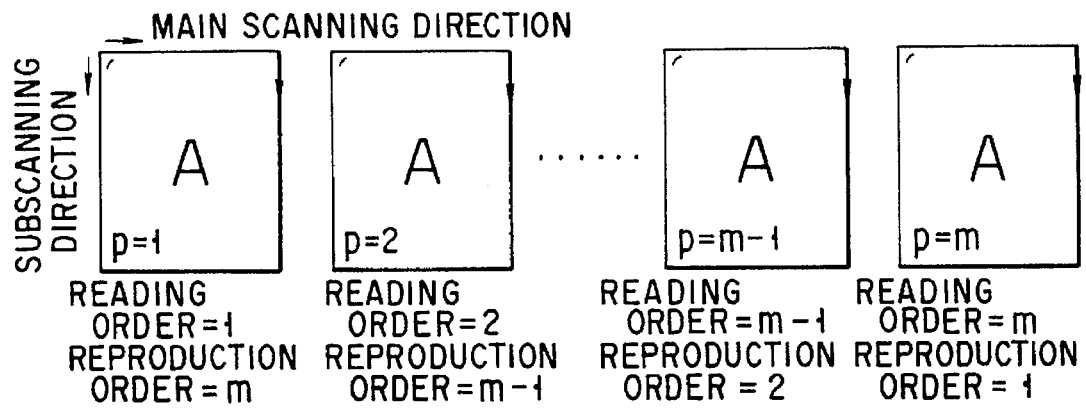

FIG. 46C is a view corresponding to mode 1.2.2-b) to explain a readout operation for reproducing a manually set portrait original O on a one-side landscape sheet with rotation.

Operations for aligning the vertical direction of originals O with the main scanning direction and outputting the input images will be described below.

These operations correspond to FIGS. 47A to 51C.

Figure 47A:
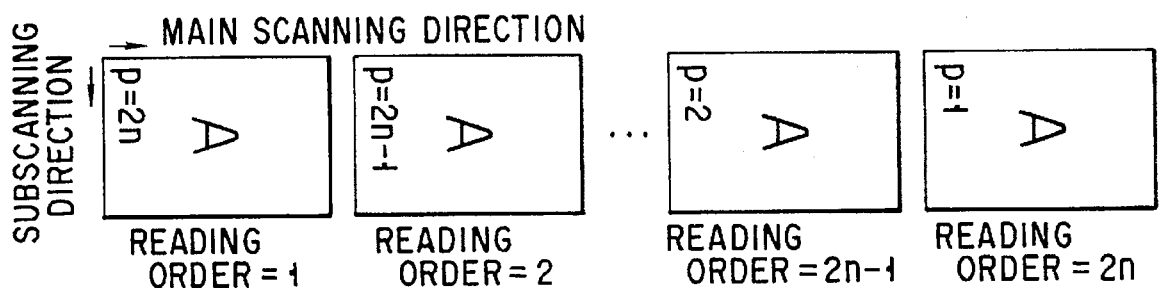
FIGS. 47A to 47C are views for explaining still another storage direction or still another read start position or read direction of each image in the page memory.

FIG. 47A explains the posture of the images in the page memory when two-side portrait originals O are input by the ADF 61.

Figure 47B:
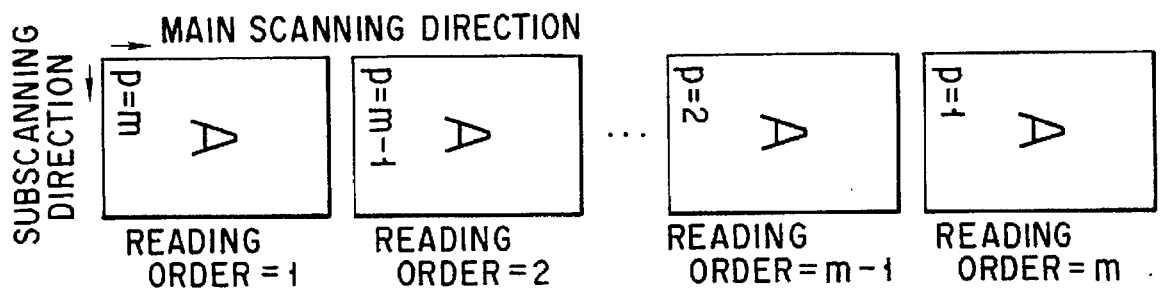

FIG. 47B explains the posture of the images in the page memory 23 when one-side portrait originals O are input by the ADF 61. The image of each even-numbered sheet is identical to that of each odd-numbered sheet.

FIGS. 47A and 47B are identical to FIGS. 36A and 36B.

Figure 47C:
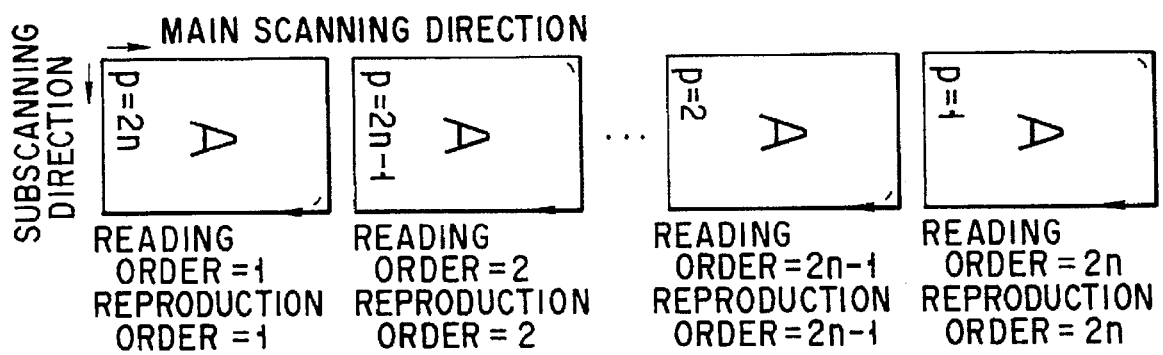

FIG. 47C is a view corresponding to mode 2.1.1-a) to explain an operation for reproducing the image data input in FIG. 47A on a two-side portrait sheet. In this case, the readout order is the same as the input order, and each page is read out with rotation of 180° with respect to the input operation.

Figure 48A:
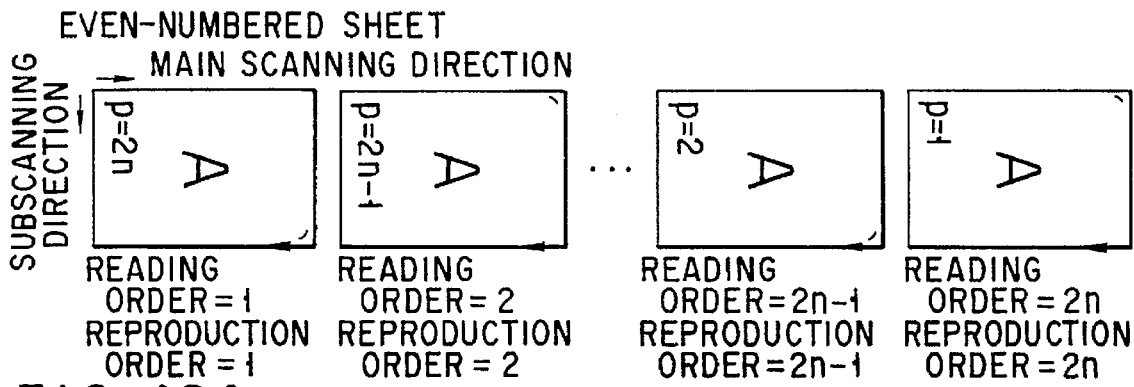
FIGS. 48A to 48D are views for explaining still another storage direction or still another read start position or read direction of each image in the page memory.
Figure 48B:
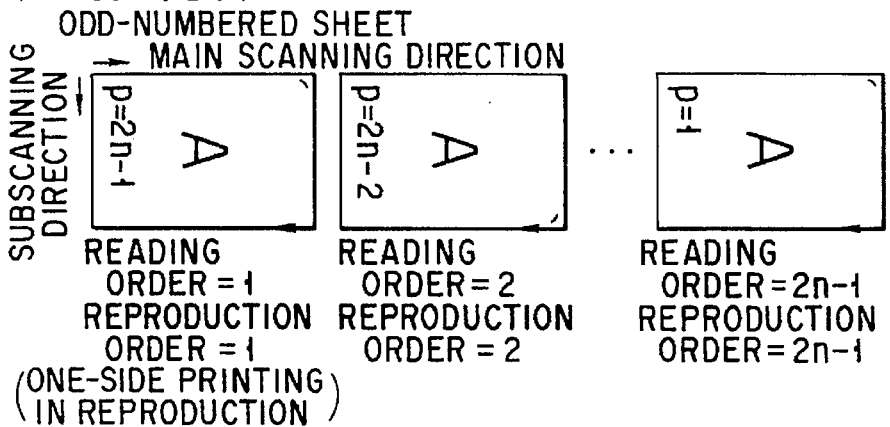

FIGS. 48A and 48B are views corresponding to mode 2.1.2-b) to explain a readout operation for reproducing images input in FIG. 47C are reproduced on two-side sheets. The readout operation is performed with rotation of 180° with respect to the input operation. When the number of originals is an odd number, the first reproduced page must be printed on a one-side sheet.

Figure 48C:
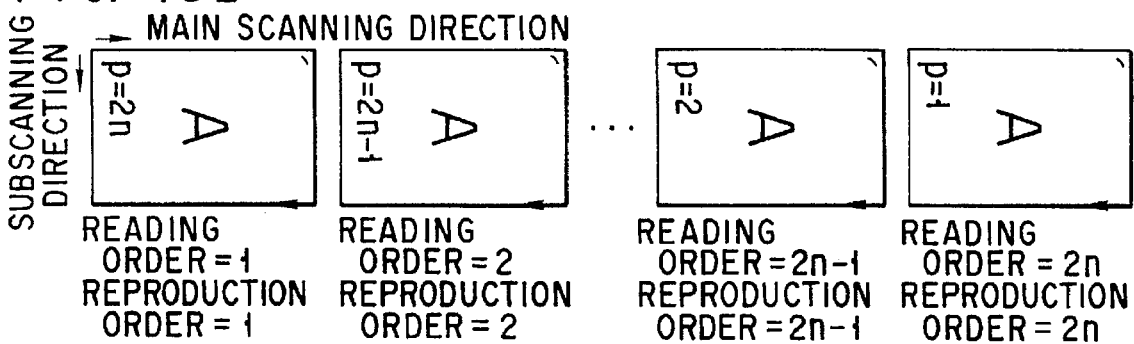

FIG. 48C is a view corresponding to 2.1.1-c) to explain a readout operation for reproducing a two-side portrait original O on one-side landscape sheets.

Figure 48D:
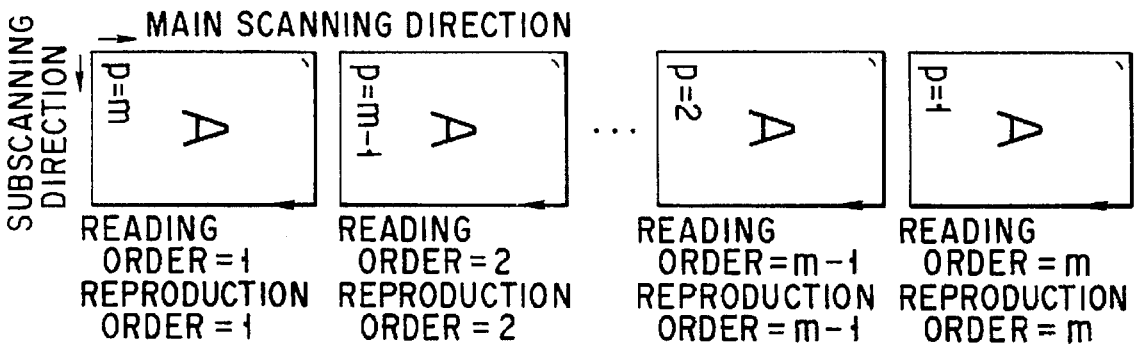

FIG. 48D is a view corresponding to 2.1.1-d) to explain a readout operation for reproducing a one-side portrait original O on a one-side landscape sheet.

Figure 49A:
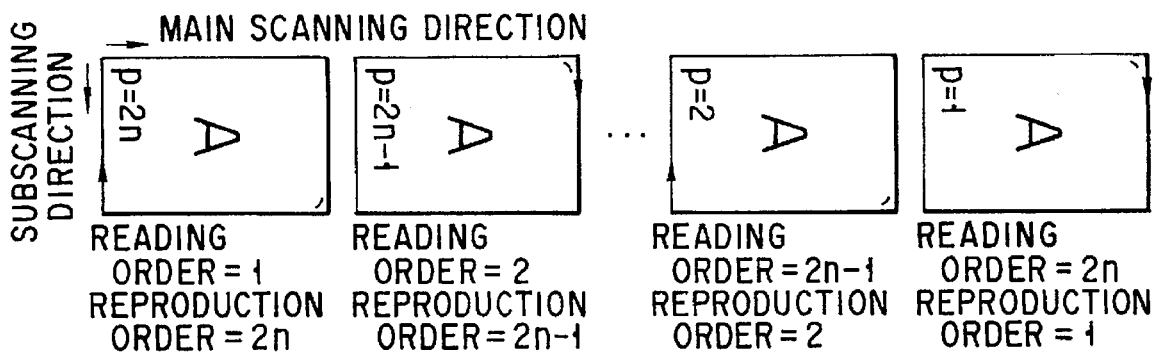
FIGS. 49A to 49D are views for explaining still another storage direction or still another read start position or read direction of each image in the page memory.

FIG. 49A is a view corresponding to 2.1.2-a) to explain a readout operation for reproducing a two-side portrait original O on a two-side portrait sheet with rotation.

Figure 49B:
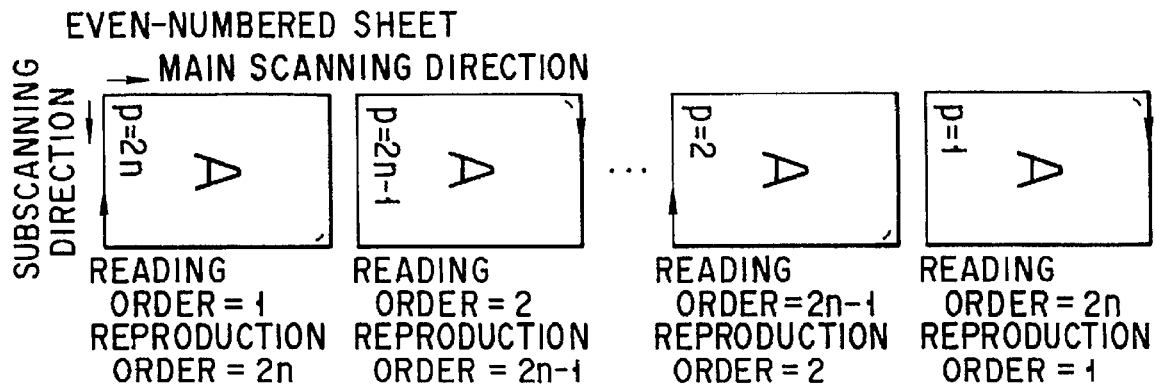

FIG. 49B is a view corresponding to 2.1.2-b) to explain a readout operation for reproducing a one-side portrait original O on a two-side portrait sheet with rotation.

Figure 49C:
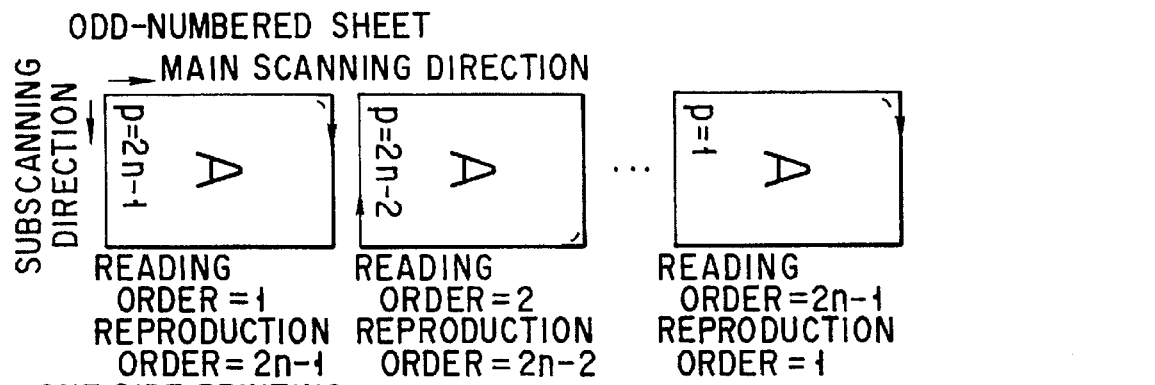

FIG. 49C is a view for explaining an operation identical to that of FIG. 49B except that the number of originals is an odd number.

Figure 49D:
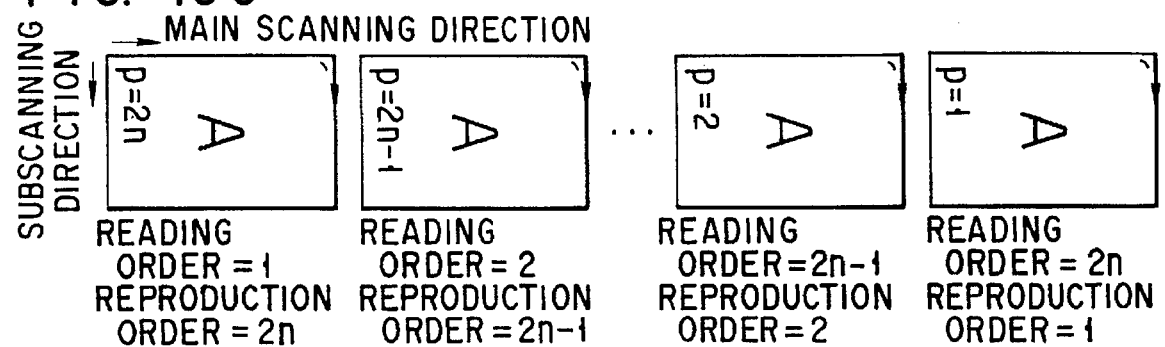

FIG. 49D is a view corresponding to mode 2.1.2-c) to explain a readout operation for reproducing a two-side portrait original O on one-side portrait sheets with rotation.

Figure 50A:
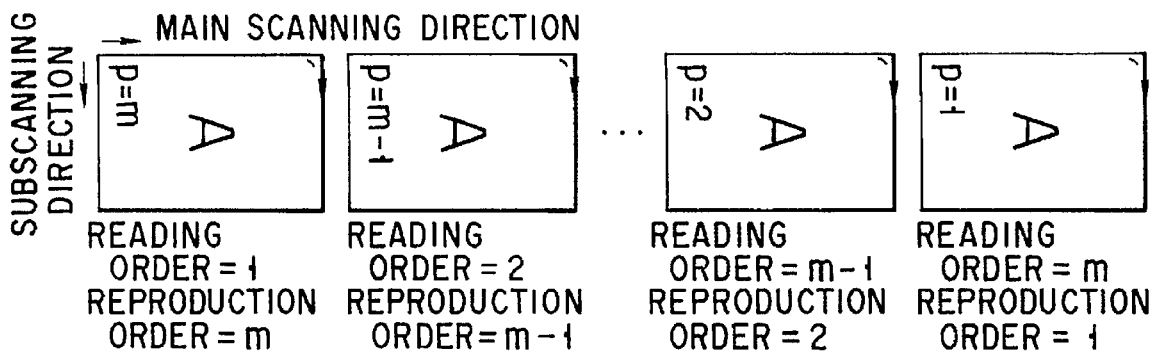
FIGS. 50A to 50D are views for explaining still another storage direction or still another read start position or read direction of each image in the page memory.

FIG. 50A is a view corresponding to 2.1.2-d) to explain a readout operation for reproducing a one-side portrait original O on a two-side portrait sheet with rotation. The image of each even-numbered sheet is identical in readout order to that of each odd-numbered sheet.

Figure 50B:
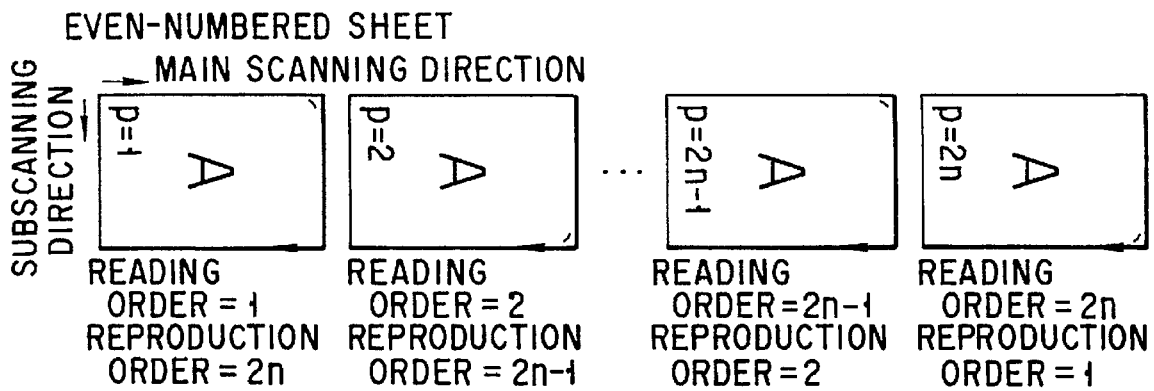

FIG. 50B is a view corresponding to mode 2.2.1-a) to explain a readout operation for reproducing manually set portrait originals O on a two-side landscape sheet.

Figure 50C:
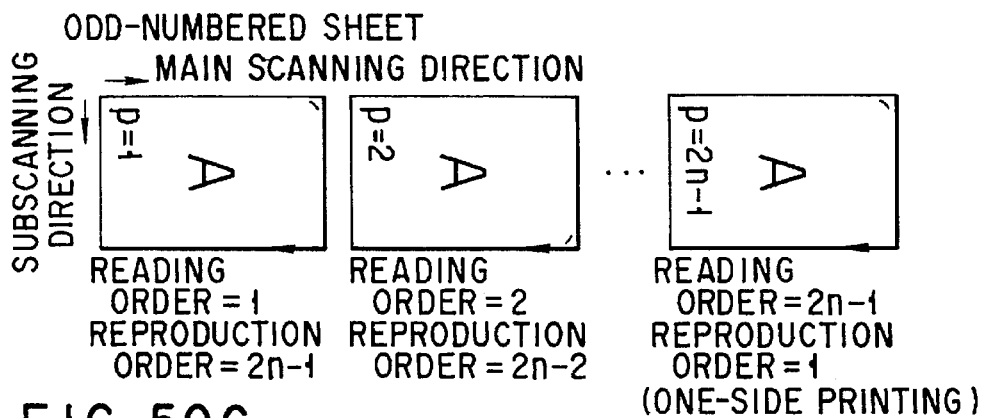

FIG. 50C is a view for explaining an operation identical to that of FIG. 50B except that the number of originals is an odd number.

Figure 50D:
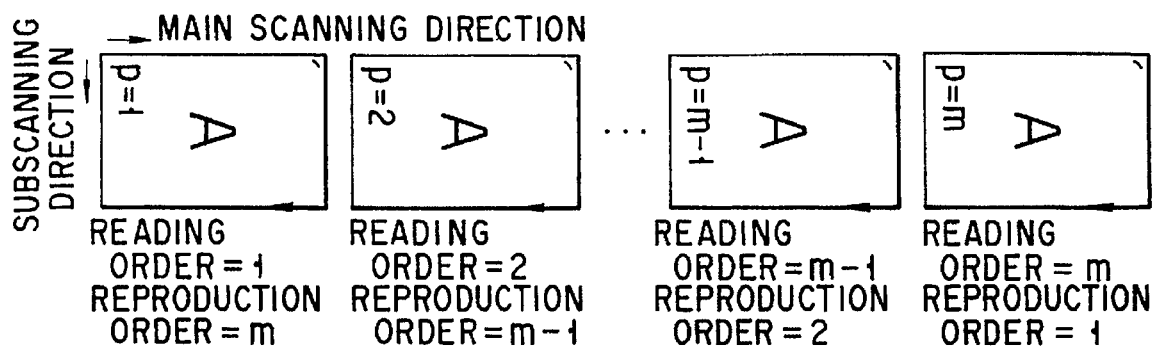

FIG. 50D is a view corresponding to mode 2.2.1-b) to explain a readout operation for reproducing manually set portrait originals O on a two-side landscape sheet.

Figure 51A:
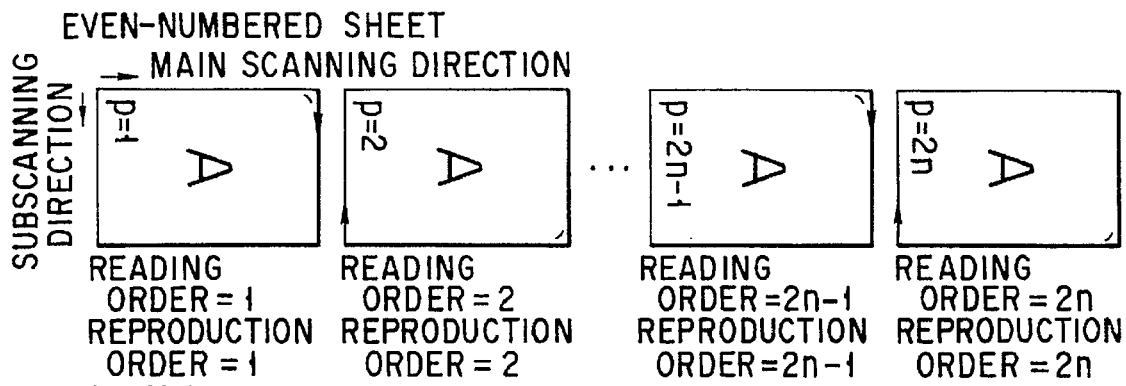
FIGS. 51A to 51D are views for explaining still another storage direction or still another read start position or read direction of each image in the page memory.

FIG. 51A is a view corresponding to mode 2.2.2-a) to explain a readout operation for reproducing manually set portrait originals O on a two-side portrait sheet with rotation.

Figure 51B:
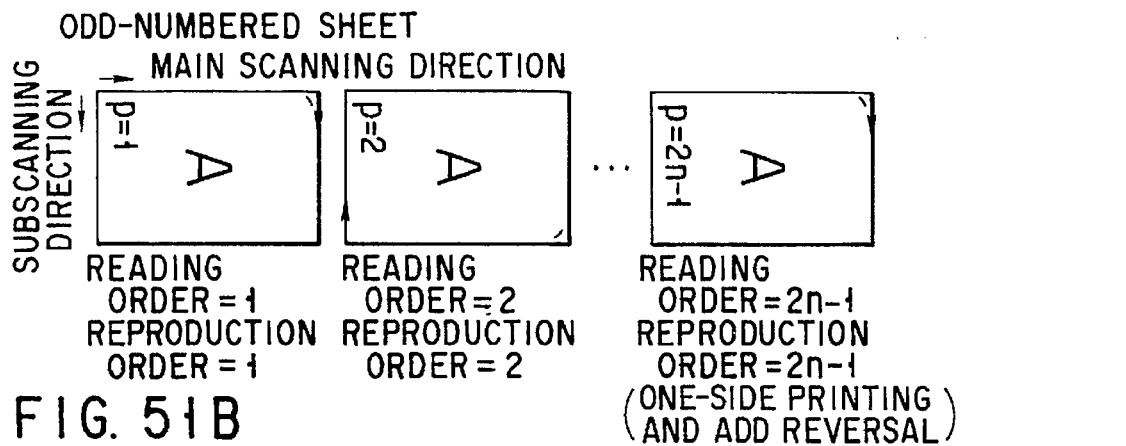

FIG. 51B is a view for explaining an operation identical to that of FIG. 51A except that the number of originals is an odd number.

Figure 51C:
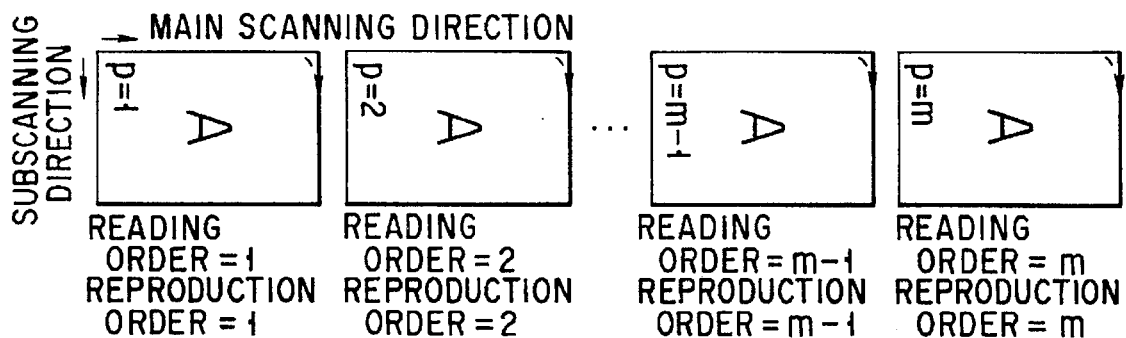

FIG. 51C is a view corresponding to mode 2.2.2-b) to explain a readout operation for reproducing a manually set portrait original O on a one-side portrait sheet with rotation.

Figure 51D:
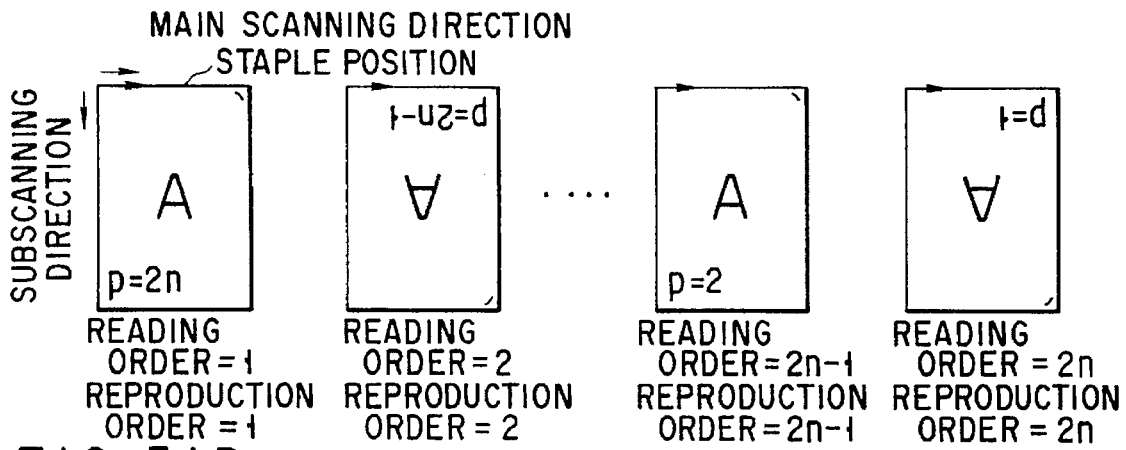
Figure 52A:
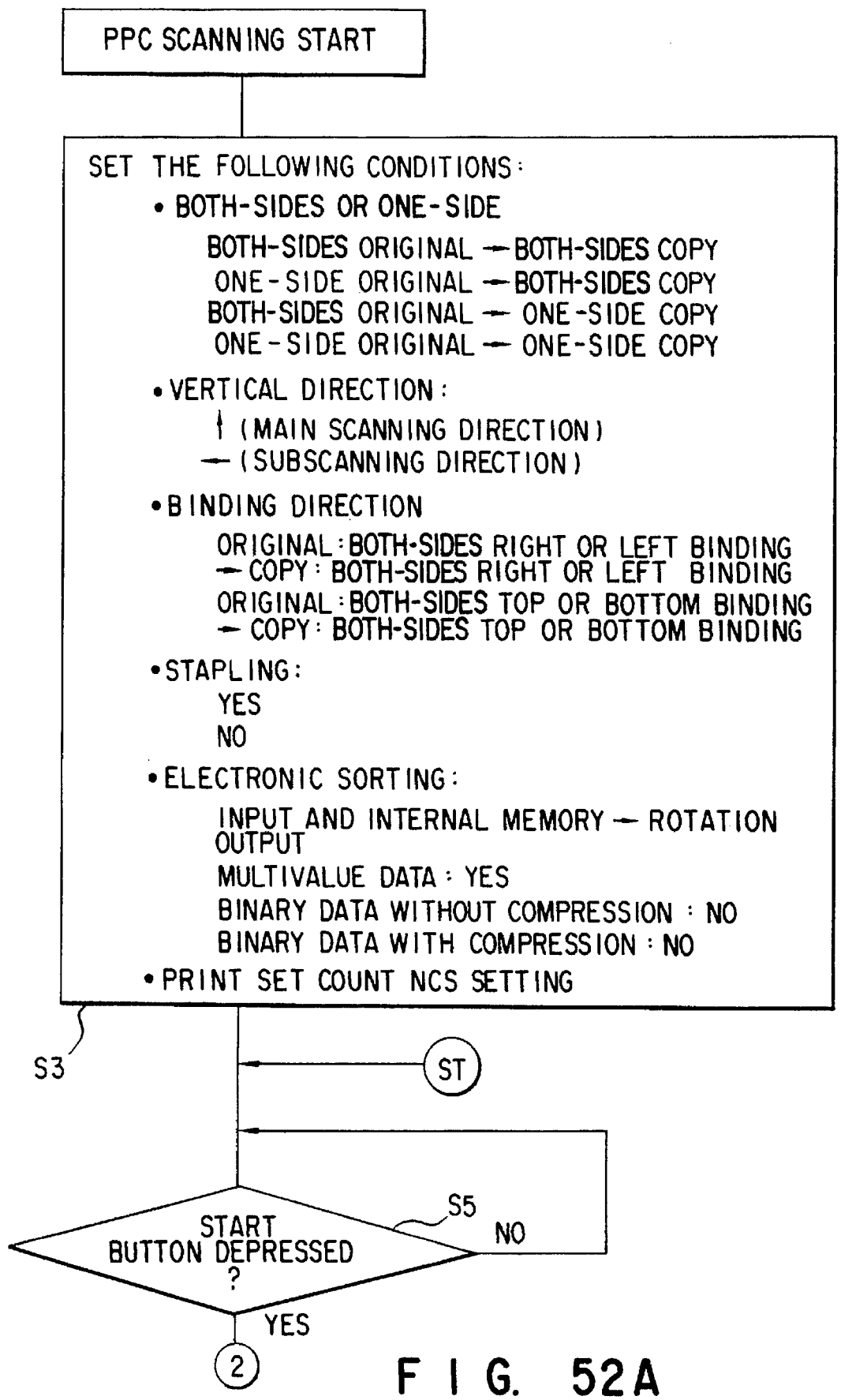
FIGS. 52A to 52E are flow charts for explaining reproduction operations of the image forming/storage apparatus according to the present invention.
Figure 52B:
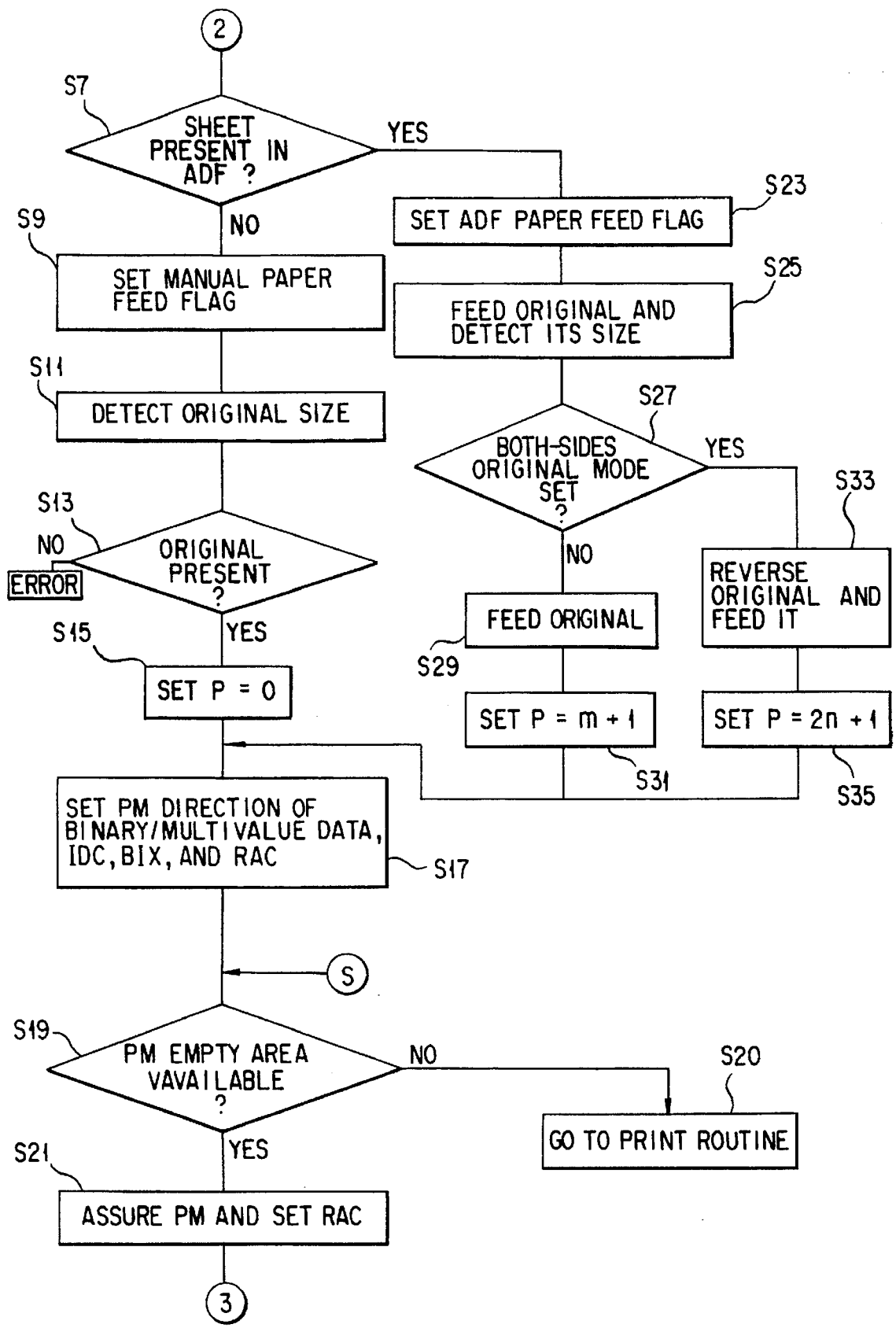
Figure 52C:
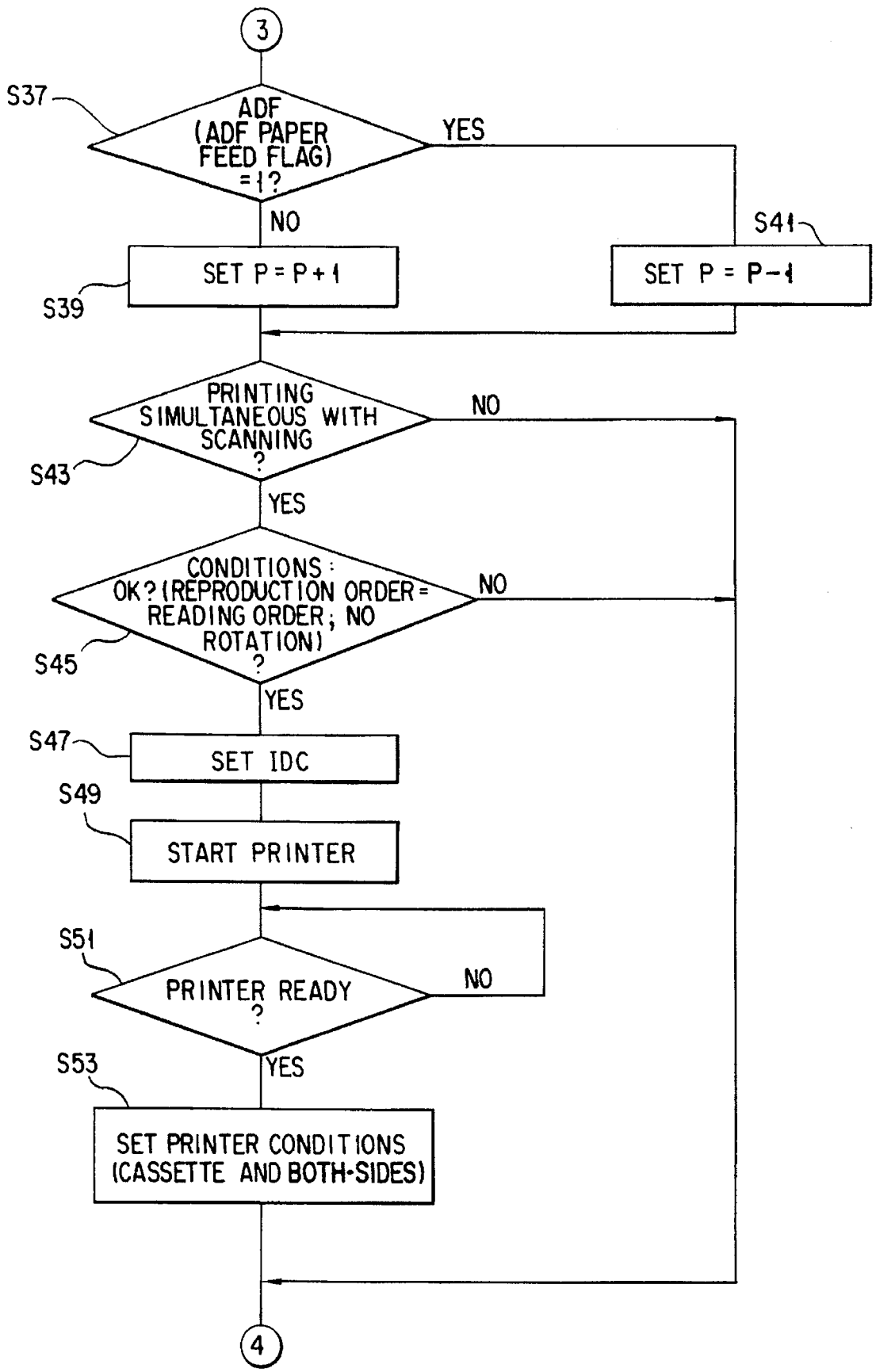
Figure 52D:
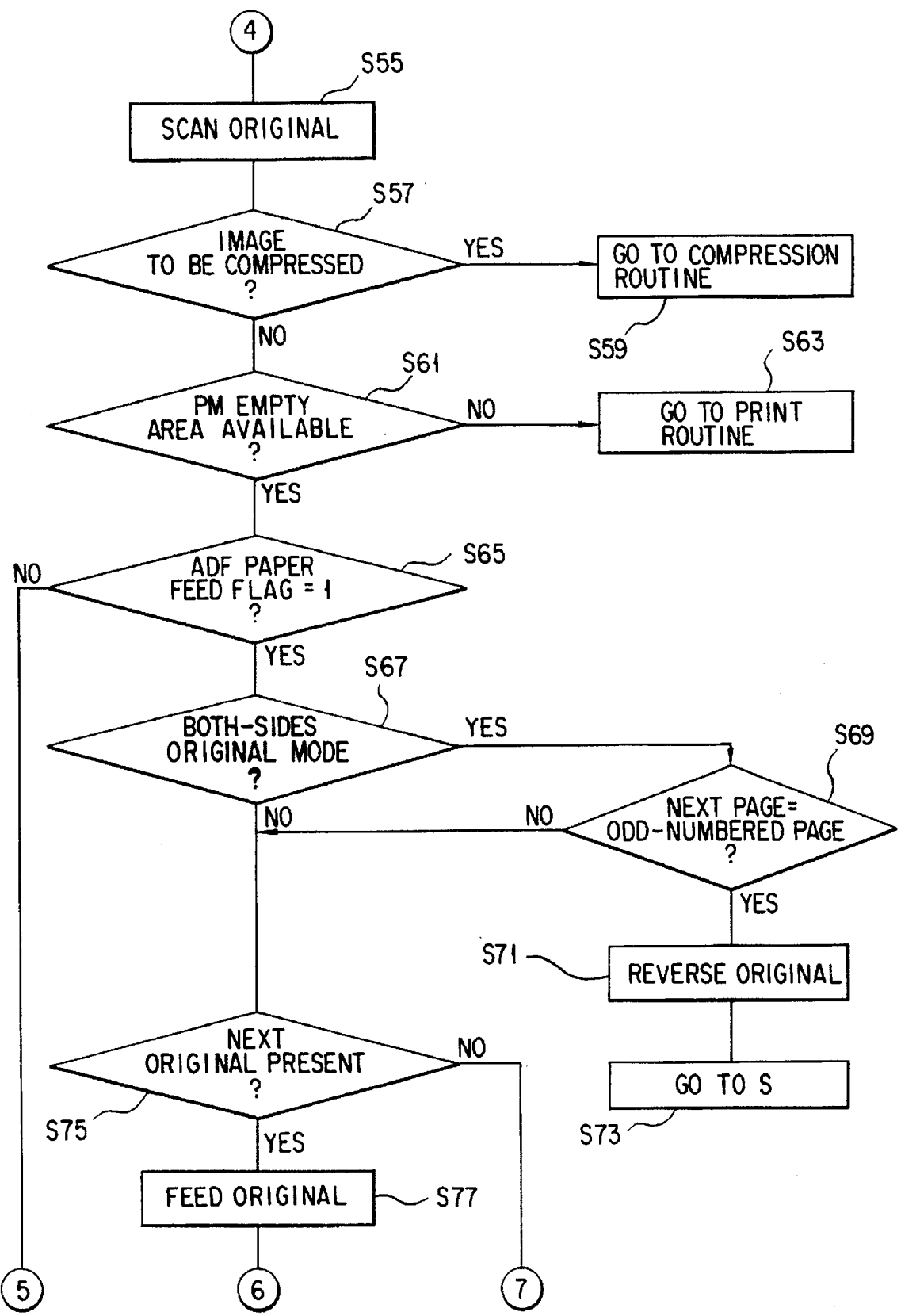
Figure 52E:
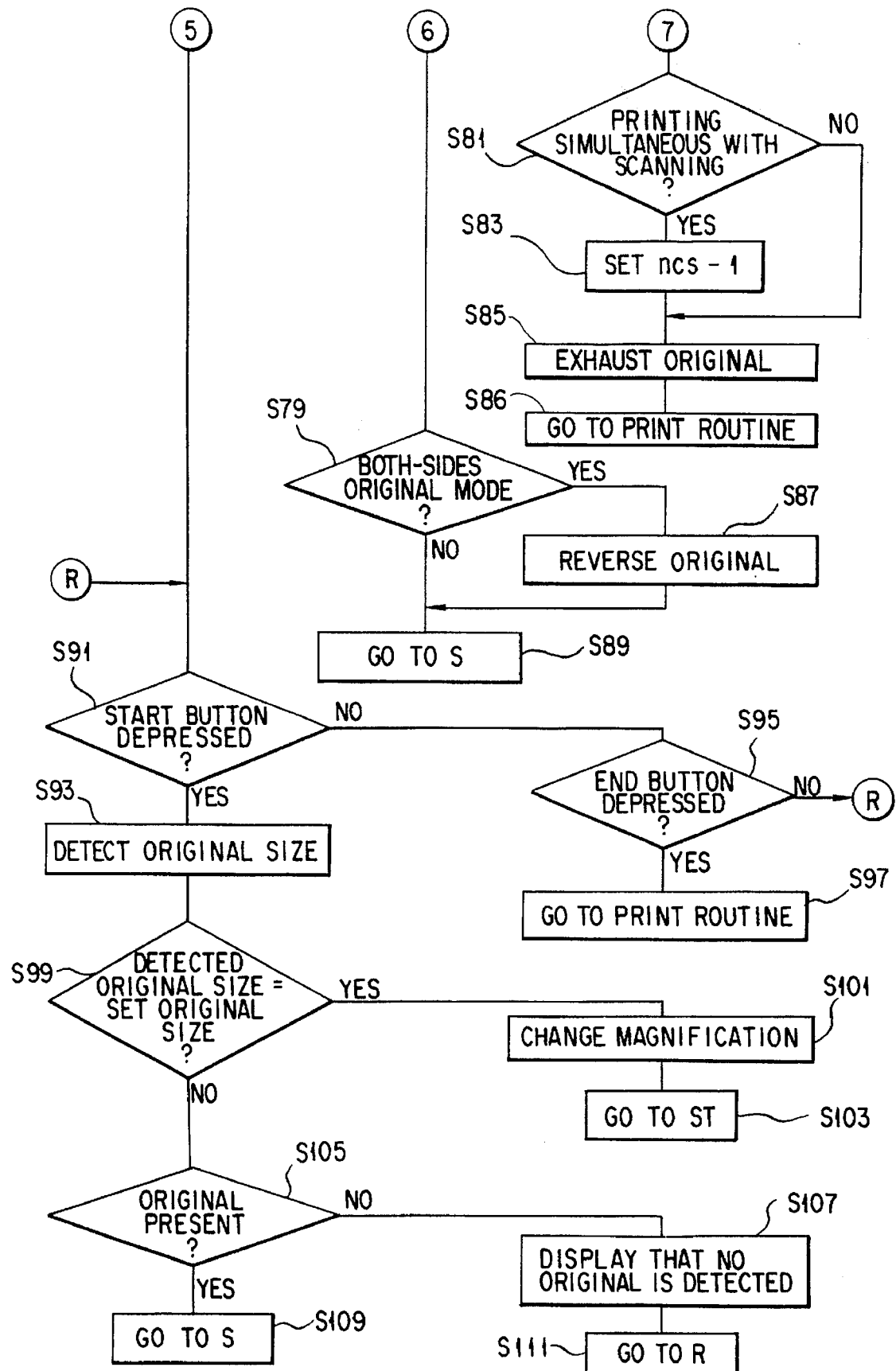

FIG. 51D is a view corresponding to 3.1.1-a) representing rear-side stapling to explain a readout operation for reproducing a two-side portrait original O on a two-side portrait sheet.

The above operations have been described in reproduction of the respective modes in FIGS. 41D to 51D and will be summarized as follows.

More specifically, in consideration of stapling, to bind copy sheets by the stapler unit 88 on the front side, the following operations are required.

To vertically align the original O with the subscanning direction and reproduce it, the image is rotated in the apparatus such that the front side is located on the print binding side, and the images are reproduced from the first page on the two-side sheets. Alternatively, the images are reproduced from the first page on one-side sheets, and the sheets are then reversed by the ADD 81.

To vertically align the original O with the main scanning direction and reproduce it, the images are rotated and printed such that the front side is located on the upper end of the reproduced print, and the images are reproduced from the last page on the two- or one-side sheets.

The following operations must be performed when the copy sheets are bound by the rear-side stapler unit.

The order of pages to be reproduced is reversed with respect to the front-side stapler unit 88. In addition, in one-side reproduction, the sheets reversed by the ADD 81 at the front-side stapler 88 need not be stapled by the rear-side stapler. The sheets not reversed by the ADD 81 must be reversed by the ADD 81 at this time.

In summary, when the sheets are to be stapled by the front-side stapler unit 88 in the copy modes in FIGS. 41D to 51D, the following operations must be performed.

To read a two-side original O vertically aligned in the subscanning direction by the ADF 61 and reproduce it on a two-side sheet, the images must be rotated through 180° from the first page and reproduced.

To read a two-side original O vertically aligned in the subscanning direction by the ADF 61 and reproduce it on one-side sheets, the images must be rotated through 180° every other page and reversed by the ADD 81.

To read one-side originals O vertically aligned in the subscanning direction by the ADF 61 and reproduce them on a two-side sheet, the images must be rotated through 180° every other page and reproduced.

To read a one-side original O vertically aligned in the subscanning direction by the ADF 61 and reproduce it on a one-side sheet, the images are rotated through 180° from the first page and reversed by the ADD 81.

To read a two-side original O vertically aligned in the subscanning direction by the ADF 61 and reproduce it on a two-side sheet with rotation of 90°, the images must be rotated through 180° every other page from the last page.

To read a two-side original O vertically aligned in the subscanning direction by the ADF 61 and reproduce it on one-side sheets with rotation of 90°, the images must be rotated through 180° every other page from the last page.

To read a one-side original O vertically aligned in the subscanning direction by the ADF 61 and reproduce it on a two-side sheet with rotation of 90°, the images are reproduced from the last page.

To read a one-side original O vertically aligned in the subscanning direction by the ADF 61 and reproduce it on a one-side sheet with rotation of 90°, the images are reproduced from the last page.

To read a two-side original O vertically aligned in the main scanning direction by the ADF 61 and reproduce it on a two-side sheet, the images are rotated through 180° and reproduced from the last page.

To read a two-side original O vertically aligned in the main scanning direction by the ADF 61 and reproduce it on one-side sheets, the images are rotated through 180° and reproduced from the last page.

To read one-side originals O vertically aligned in the main scanning direction by the ADF 61 and reproduce them on a two-side sheet, the images are rotated through 180° and reproduced from the last page, and the last odd-numbered page is reproduced on a one-side sheet.

To read a one-side original O vertically aligned in the main scanning direction by the ADF 61 and reproduce it on a one-side sheet, the images are rotated through 180° and reproduced from the last page.

To read a two-side original O vertically aligned in the main scanning direction by the ADF 61 and reproduce it on a two-side sheet with rotation of 90°, the images must be rotated through 180° every other page and reproduced from the first page.

To read a two-side original O vertically aligned in the main scanning direction by the ADF 61 and reproduce it on one-side sheets with rotation of 90°, the images must be rotated through 180° every other page and reversed by the ADD 81.

To read one-side originals O vertically aligned in the main scanning direction by the ADF 61 and reproduce them on a two-side sheet with rotation of 90°, the images are rotated through 180° every other page.

To read a one-side original O vertically aligned in the main scanning direction by the ADF 61 and reproduce it on a one-side sheet with rotation of 90°, the images must be rotated through 180° every other page and reversed by the ADD 81.

To manually read originals O vertically aligned in the subscanning direction and reproduce them on a two-side sheet, the images must be rotated through 180° every other page and reproduced. The images are reproduced from the first page. The last odd-numbered page must be reproduced on a one-side sheet and reversed by the ADD 81.

To read a manually set original O vertically aligned in the subscanning direction and reproduce it on a one-side sheet, the pages are reversed by the ADD 81 and output.

To read manually set originals O vertically aligned in the subscanning direction and reproduce them on a two-side sheet with rotation of 90°, the images must always be rotated through 90° and reproduced. Reproduction is performed from the first page. The last odd-numbered page is reproduced on a one-side sheet and reversed by the ADD 81.

To read an original O vertically aligned in the subscanning direction by the ADF 61 and reproduce it on a one-side sheet with rotation of 90°, the image is inverted by the ADD 81 and output.

To read manually set originals O vertically aligned in the main scanning direction and reproduce them on a two-side sheet, the images are rotated through 180° and reproduced. Reproduction is performed from the last page. The last odd-numbered page is reproduced on a one-side sheet.

To read a manually set original O vertically aligned in the main scanning direction and reproduce it on a one-side sheet, the images are rotated through 180° and reproduced. Reproduction is performed from the last page.

To read manually set originals O aligned in the main scanning direction and reproduce them on a two-side sheet with rotation of 90°, the images are rotated through 180° every other page and reproduced. Reproduction is performed from the first page. The last odd-numbered page is reproduced on a one-side sheet and reversed by the ADD 81.

To read manually set originals O vertically aligned in the main scanning direction and reproduce them on a two-side sheet with rotation of 90°, the images are always rotated through 90° and reproduced. Reproduction is performed from the first page. The pages are reversed by the ADD 81.

The pages are rotated through 180° and the reproduction order and reproduction posture of each page must be reversed for the rear-side stapler unit with respect to the front-side stapler unit. The pages reversed by the ADD 81 need not be reversed again, but the pages not reversed by the ADD 81 are reversed.

The memory sorting operation for facilitating the distinction between the sets in reproduction of a plurality of sets, using a stapler unit will be described in the same manner as that without using the stapler unit.

Conventionally, to reproduce a plurality of sets, each page is reproduced by the number of sets, and the copied sheets are sorted one by one into destination sorter bins by a mechanical sorter or the like.

However, if an image memory has an enough space, the above operations are repeated for each set upon reproducing each set to easily recognize the distinction between the adjacent sets. As described above, the finisher can be used to rotate and copy the image information in the page memory so as to locate the binding portions of the output copy sheets adjacent to each other. The reproduction mode is changed for each set, as described above, to clearly recognize the distinction between the adjacent sets without using a mechanical sorter, thereby improving operability.

The above operations are alternately performed in the following combinations, so that the two adjacent sets are output in an angular difference of 90°.

Modes 1.1.1-a) and 1.1.2-a) are alternately changed for reproduction in units of sets.

Modes 1.1.1-b) and 1.1.2-b) are alternately changed for reproduction in units of sets.

Modes 1.1.1-c) and 1.1.2-c) are alternately changed for reproduction in units of sets.

Modes 1.1.1-d) and 1.1.2-d) are alternately changed for reproduction in units of sets.

Modes 1.2.1-a) and 1.2.2-a) are alternately changed for reproduction in units of sets.

Modes 1.2.1-b) and 1.2.2-b) are alternately changed for reproduction in units of sets.

Modes 2.1.1-a) and 2.1.2-a) are alternately changed for reproduction in units of sets.

Modes 2.1.1-b) and 2.1.2-b) are alternately changed for reproduction in units of sets.

Modes 2.1.1-c) and 2.1.2-c) are alternately changed for reproduction in units of sets.

Modes 2.1.1-d) and 2.1.2-d) are alternately changed for reproduction in units of sets.

Modes 2.2.1-a) and 2.2.2-a) are alternately changed for reproduction in units of sets.

Modes 2.2.1-b) and 2.2.2-b) are alternately changed for reproduction in units of sets.

This reproduction is based on an assumption that the pages are bound on the right or left side. In binding the pages on the top or bottom ends, the reproduction procedures for vertical alignment in the main scanning direction are performed for vertical alignment in the subscanning direction, and vice versa.

The reproduction orders with respect to the original reading orders and the readout directions of the odd- and even-numbered pages in the 24 copy modes in consideration of the staple position will be described below.

II. Reproduction in Consideration of Staple Position (necessary operations for binding the copy sheets by a front-side stapler unit)

1. Vertical Alignment in Subscanning Direction 1.1 Reading by ADF 61

1.1.1-a) Two-Side Portrait Original O→Two-Side Portrait Sheet Reproduction

Reproduction Order: Opposite to the reading order

Readout Direction of Pages:

Odd-Numbered Page: Readout is started from the lower right corner in the left main scanning direction and the upper subscanning direction (180°).

Even-Numbered Page: Readout is started from the lower right corner in the left main scanning direction and the upper subscanning direction (180°).

1.1.1-b) One-Side Portrait Original O→Two-Side Portrait Sheet Reproduction

Reproduction Order: Opposite to the reading order

Readout Direction of Pages:

Odd-Numbered Page: Readout is started from the lower right corner in the left main scanning direction and the upper subscanning direction (180°), and the reproduction start page is reversed by the ADD 81.

Even-Numbered Page: Readout is started from the upper left corner in the right main scanning direction and the lower subscanning direction (0°).

1.1.1-c) Two-Side Portrait Original O→One-Side Portrait Sheet Reproduction

Reproduction Order: Opposite to the reading order

Readout Direction of Pages:

Odd-Numbered Page: Readout is started from the lower right corner in the left main scanning direction and the upper subscanning direction (180°), and the page is reversed by the ADD 81.

Even-Numbered Page: Readout is started from the upper left corner in the right main scanning direction and the lower subscanning direction (0°), and the page is reversed by the ADD 81.

1.1.1-d) One-Side Portrait Original O→One-Side Portrait Sheet Reproduction

Reproduction Order: Opposite to the reading order

Readout Direction of Pages:

Odd-Numbered Page: Readout is started from the lower right corner in the left main scanning direction and the upper subscanning direction (180°), and the page is reversed by the ADD 81.

Even-Numbered Page: Readout is started from the lower right corner in the left main scanning direction and the upper subscanning direction (180°), and the page is reversed by the ADD 81.

1.1.2-a) Two-Side Portrait Original O→Two-Side Landscape Sheet Reproduction with Rotation Reproduction Order: The same as the reading order Readout Direction of Pages:

Odd-Numbered Page: Readout is started from the upper right corner in the lower main scanning direction and the left subscanning direction (90° counterclockwise).

Even-Numbered Page: Readout is started from the lower left corner in the upper main scanning direction and the right subscanning direction (90° clockwise).

1.1.2-b) One-Side Portrait Original O→Two-Side Landscape Sheet Reproduction with Rotation Reproduction Order: The same as the reading order Readout Direction of Pages:

Odd-Numbered Page: Readout is started from the lower left corner in the upper main scanning direction and the right subscanning direction (90° clockwise), and the reproduction start page is reproduced on a one-side sheet.

Even-Numbered Page: Readout is started from the lower left corner in the upper main scanning direction and the right subscanning direction (90° clockwise).

1.1.2-c) Two-Side Portrait Original O→One-Side Landscape Sheet Reproduction with Rotation Reproduction Order: The same as the reading order Readout Direction of Pages:

Odd-Numbered Page: Readout is started from the upper right corner in the lower main scanning direction and the left subscanning direction (90° counterclockwise).

Even-Numbered Page: Readout is started from the lower left corner in the upper main scanning direction and the right subscanning direction (90° clockwise).

1.1.2-*d*) One-Side Portrait Original O→One-Side Landscape Sheet Reproduction with Rotation Reproduction Order: The same as the reading order Readout Direction of Pages:

Odd-Numbered Page: Readout is started from the lower left corner in the upper main scanning direction and the right subscanning direction (90° clockwise).

Even-Numbered Page: Readout is started from the lower left corner in the upper main scanning direction and the right subscanning direction (90° clockwise).

1.2 Manual Setting 1.2.1-*a*) Portrait Original O→Two-Side Portrait Sheet Reproduction Reproduction Order: The same as the reading order Readout Direction of Pages:

Odd-Numbered Page: Readout is started from the upper left corner in the right main scanning direction and the lower subscanning direction (0°), the reproduction start page is printed on a one-side page, and the page is reversed by the ADD 81.

Even-Numbered Page: Readout is started from the lower right corner in the left main scanning direction and the upper subscanning direction (180°).

1.2.1-*b*) Portrait Original O→One-Side Portrait Sheet Reproduction

Reproduction Order: The same as the reading order

Readout Direction of Pages:

Odd-Numbered Page: Readout is started from the upper left corner in the right main scanning direction and the lower subscanning direction (0°), and the page is reversed by the ADD 81.

Even-Numbered Page: Readout is started from the upper left corner in the right main scanning direction and the lower subscanning direction (0°), and the page is reversed by the ADD 81.

1.2.2-*a*) Portrait Original O→Two-Side Portrait Sheet Reproduction

Reproduction Order: Opposite to the reading order

Readout Direction of Pages:

Odd-Numbered Page: Readout is started from the upper right corner in the lower main scanning direction and the left subscanning direction (90° counterclockwise), and the reproduction start page is printed on a one-side sheet.

Even-Numbered Page: Readout is started from the upper right corner in the lower main scanning direction and the left subscanning direction (90° counterclockwise).

1.2.2-*b*) Portrait Original O→One-Side Landscape Sheet Reproduction

Reproduction Order: Opposite to the reading order

Readout Direction of Pages:

Odd-Numbered Page: Readout is started from the upper right corner in the lower main scanning direction and the left subscanning direction (90° counterclockwise).

Even-Numbered Page: Readout is started from the upper right corner in the lower main scanning direction and the left subscanning direction (90° counterclockwise).

2. Vertical Alignment in Main Scanning Direction 2.1 Reading by ADF 61

2.1.1-*a*) Two-Side Portrait Original O→Two-Side Landscape Sheet Reproduction

Reproduction Order: The same as the reading order

Readout Direction of Pages:

Odd-Numbered Page: Readout is started from the lower right corner in the left main scanning direction and the upper subscanning direction (180°).

Even-Numbered Page: Readout is started from the lower right corner in the left main scanning direction and the upper subscanning direction (180°).

2.1.1-*b*) One-Side Portrait Original O→Two-Side Landscape Sheet Reproduction

Reproduction Order: The same as the reading order

Readout Direction of Pages:

Odd-Numbered Page: Readout is started from the lower right corner in the left main scanning direction and the upper subscanning direction (180°), and the reproduction start page is reproduced on a one-side sheet.

Even-Numbered Page: Readout is started from the lower right corner in the left main scanning direction and the upper subscanning direction (180°).

2.1.1-*c*) Two-Side Portrait Original O→One-Side Landscape Sheet Reproduction

Reproduction Order: The same as the reading order

Readout Direction of Pages:

Odd-Numbered Page: Readout is started from the lower right corner in the left main scanning direction and the upper subscanning direction (180°).

Even-Numbered Page: Readout is started from the lower right corner in the left main scanning direction and the upper subscanning direction (180°).

2.1.1-*d*) One-Side Portrait Original O→One-Side Landscape Sheet Reproduction

Reproduction Order: The same as the reading order

Readout Direction of Pages:

Odd-Numbered Page: Readout is started from the lower right corner in the left main scanning direction and the upper subscanning direction (180°).

Even-Numbered Page: Readout is started from the lower right corner in the left main scanning direction and the upper subscanning direction (180°).

2.1.2-*a*) Two-Side Portrait Original O→Two-Side Portrait Sheet Reproduction with Rotation Reproduction Order: Opposite to the reading order Readout Direction of Pages:

Odd-Numbered Page: Readout is started from the upper right corner in the lower main scanning direction and the left subscanning direction (90° counterclockwise).

Even-Numbered Pate: Readout is started the lower left corner in the upper main scanning direction and the right subscanning direction (90° clockwise).

2.1.2-*b*) One-Side Portrait Original O→Two-Side Portrait Sheet Reproduction with Rotation Reproduction Order: Opposite to the reading order Readout Direction of Pages:

Odd-Numbered Page: Readout is started from the upper right corner in the lower main scanning direction and the left subscanning direction (90° counterclockwise), and the reproduction start page is printed on a one-side sheet.

Even-Numbered Page: Readout is started from the lower left corner in the upper main scanning direction and the right subscanning direction (90° clockwise).

2.1.2-*c*) Two-Side Portrait Original O→One-Side Portrait Sheet Reproduction with Rotation Reproduction Order: Opposite to the reading order Readout Direction of Pages:

Odd-Numbered Page: Readout is started from the upper right corner in the lower main scanning direction and the left subscanning direction (90° counterclockwise), and the page is reversed by the ADD 81.

Even-Numbered Page: Readout is started from the upper right corner in the lower main scanning direction and the left subscanning direction (90° counterclockwise), and the page is reversed by the ADD 81.

2.1.2-*d*) One-Side Portrait Original O→One-Side Portrait Sheet Reproduction with Rotation Reproduction Order: Opposite to the reading order Readout Direction of Pages:

Odd-Numbered Page: Readout is started from the upper right corner in the lower main scanning direction and the left subscanning direction (90° counterclockwise), and the page is reversed by the ADD 81.

Even-Numbered Page: Readout is started from the upper right corner in the lower main scanning direction and the left subscanning direction (90° counterclockwise), and the page is reversed by the ADD 81.

2.2 Manual Setting 2.2.1-*a*) Portrait Original O→Two-Side Landscape Sheet Reproduction Reproduction Order: Opposite to the reading order Readout Direction of Pages:

Odd-Numbered Page: Readout is started from the lower right corner in the left main scanning direction and the upper subscanning direction (180°), and the reproduction start page is printed on a one-side page.

Even-Numbered Page: Readout is started from the lower right corner in the left main scanning direction and the upper subscanning direction (180°).

2.2.1-*b*) Portrait Original O→One-Side Portrait Sheet Reproduction

Reproduction Order: Opposite to the reading order

Readout Direction of Pages:

Odd-Numbered Page: Readout is started from the lower right corner in the left main scanning direction and the upper subscanning direction (180°).

Even-Numbered Page: Readout is started from the lower right corner in the left main scanning direction and the upper subscanning direction (180°).

2.2.2-*a*) Portrait Original O→Two-Side Portrait Sheet Reproduction

Reproduction Order: The same as the reading order

Readout Direction of Pages:

Odd-Numbered Page: Readout is started from the upper right corner in the lower main scanning direction and the left subscanning direction (90° counterclockwise), and the reproduction start page is printed on a one-side sheet and reversed by the ADD 81.

Even-Numbered Page: Readout is started from the lower left corner in the upper main scanning direction and the right subscanning direction (90° clockwise).

2.2.2-*b*) Portrait Original O→One-Side Portrait Sheet Reproduction

Reproduction Order: The same as the reading order

Readout Direction of Pages:

Odd-Numbered Page: Readout is started from the lower left corner in the upper main scanning direction and the right subscanning direction (90° clockwise), and the page is reversed by the ADD 81 and output.

Even-Numbered Page: Readout is started from the lower left corner in the upper main scanning direction and the right subscanning direction (90° clockwise), and the page is reversed by the ADD 81 and output.

The operations for outputting copy sheets to bind them with the rear-side stapler unit will be described below. In this case, the reproduction order and the page readout direction are given as follows.

III. Reproduction at Rear-Side Stapler Unit 3.1.1-*a*) Two-Side Portrait Original O→Two-Side Portrait Sheet Reproduction Reproduction Order: The same as the reading order Readout Direction of Pages:

Odd-Numbered Page: Readout is started from the upper left corner in the right main scanning direction and the lower subscanning direction (0°).

Even-Numbered Page: Readout is started from the upper left corner in the right main scanning direction and the lower subscanning direction (0°).

Figure 53:
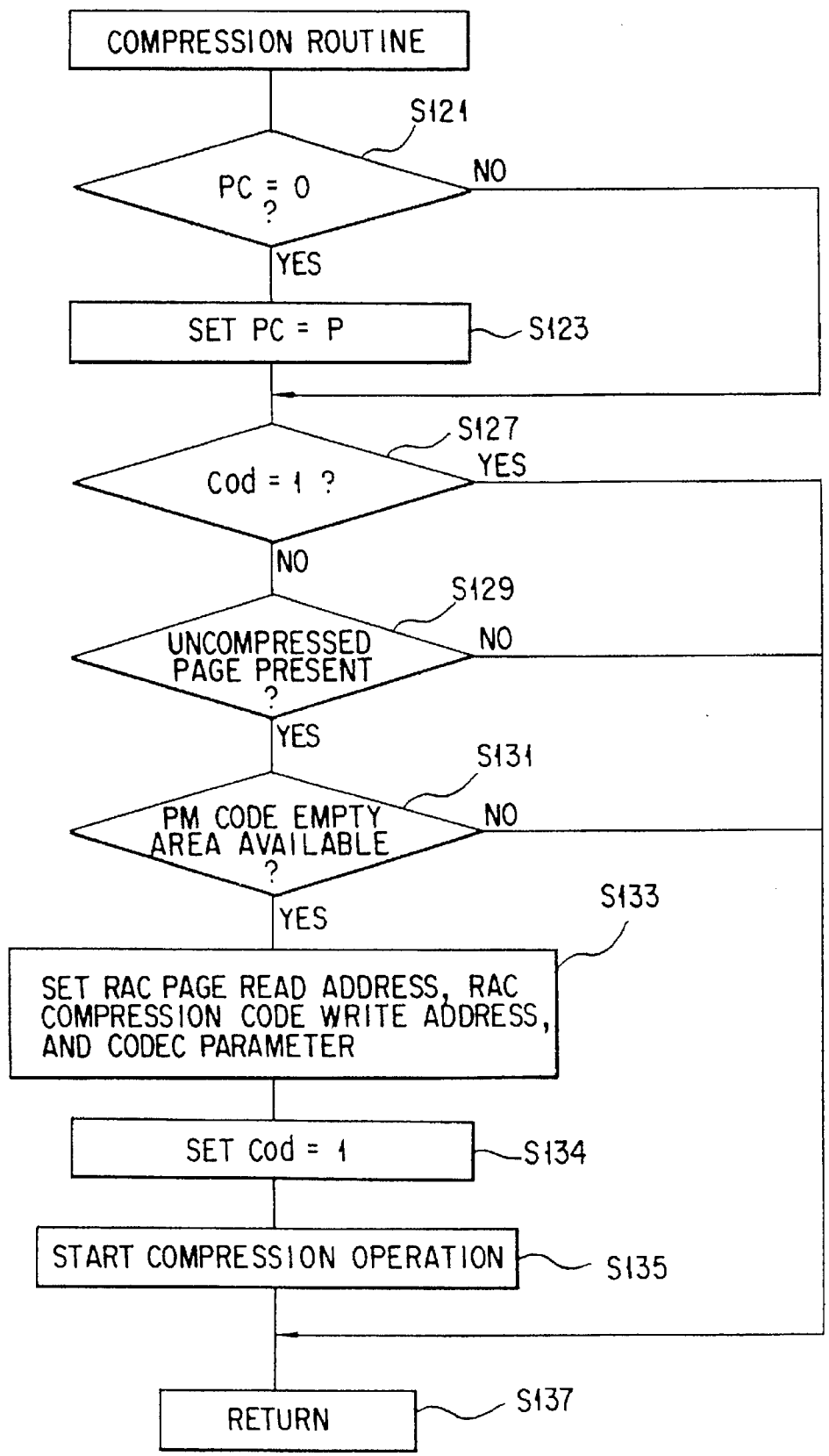
FIG. 53 is a flow chart for explaining a compression routine as one of the reproduction operations of the image forming/storage apparatus of the present invention.
Figure 54A:
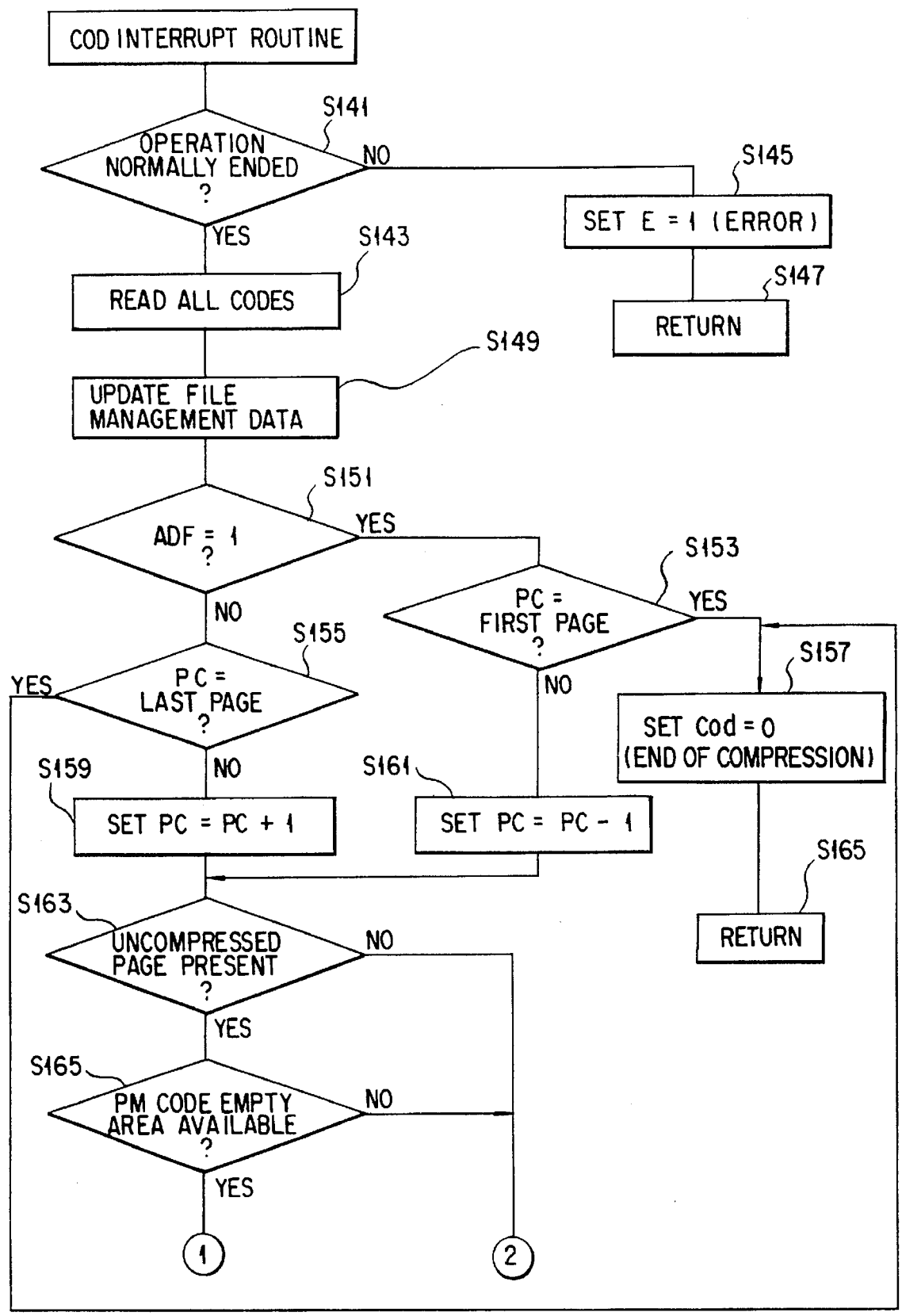
Figure 55A:
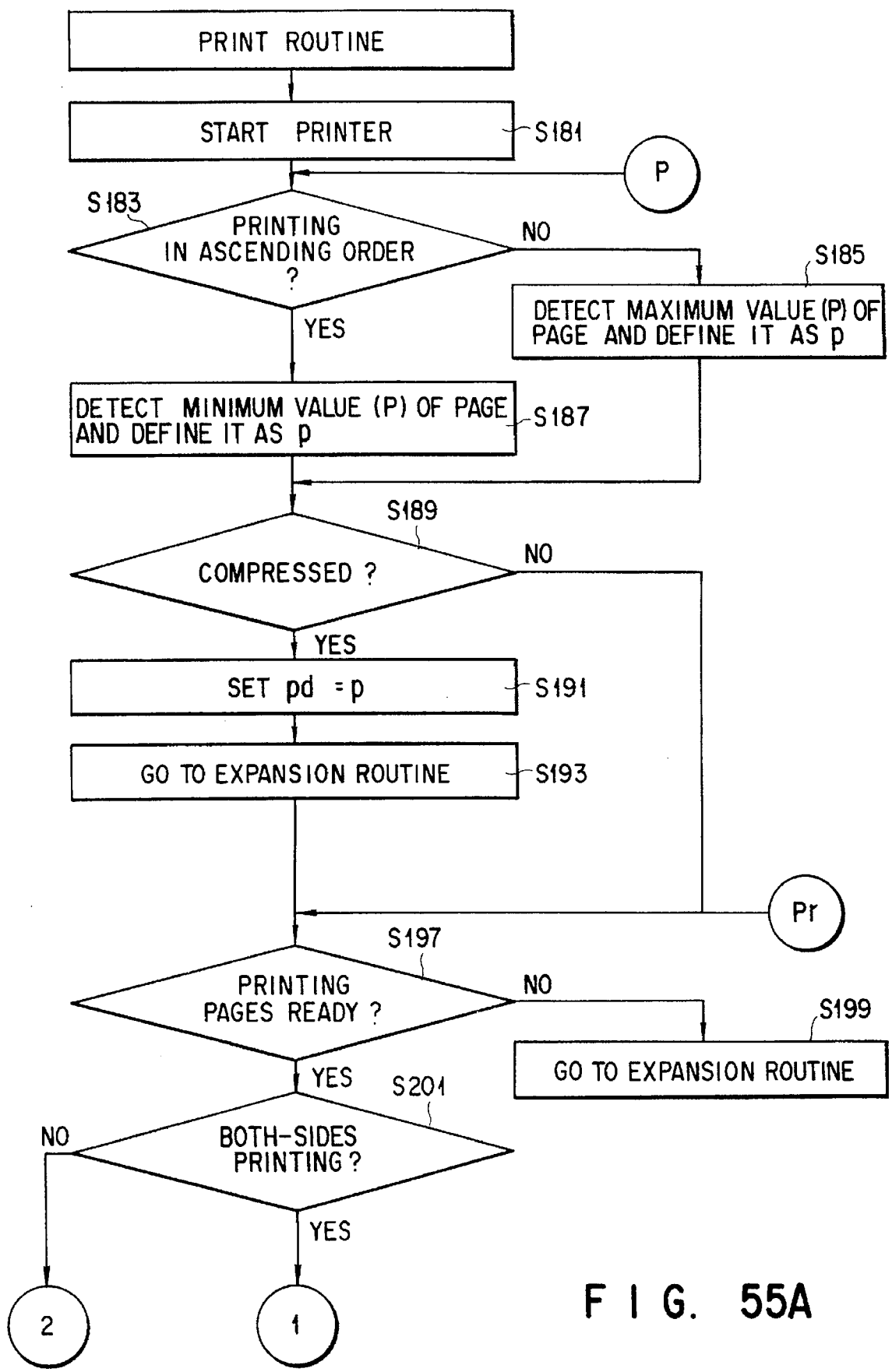
Figure 55C:
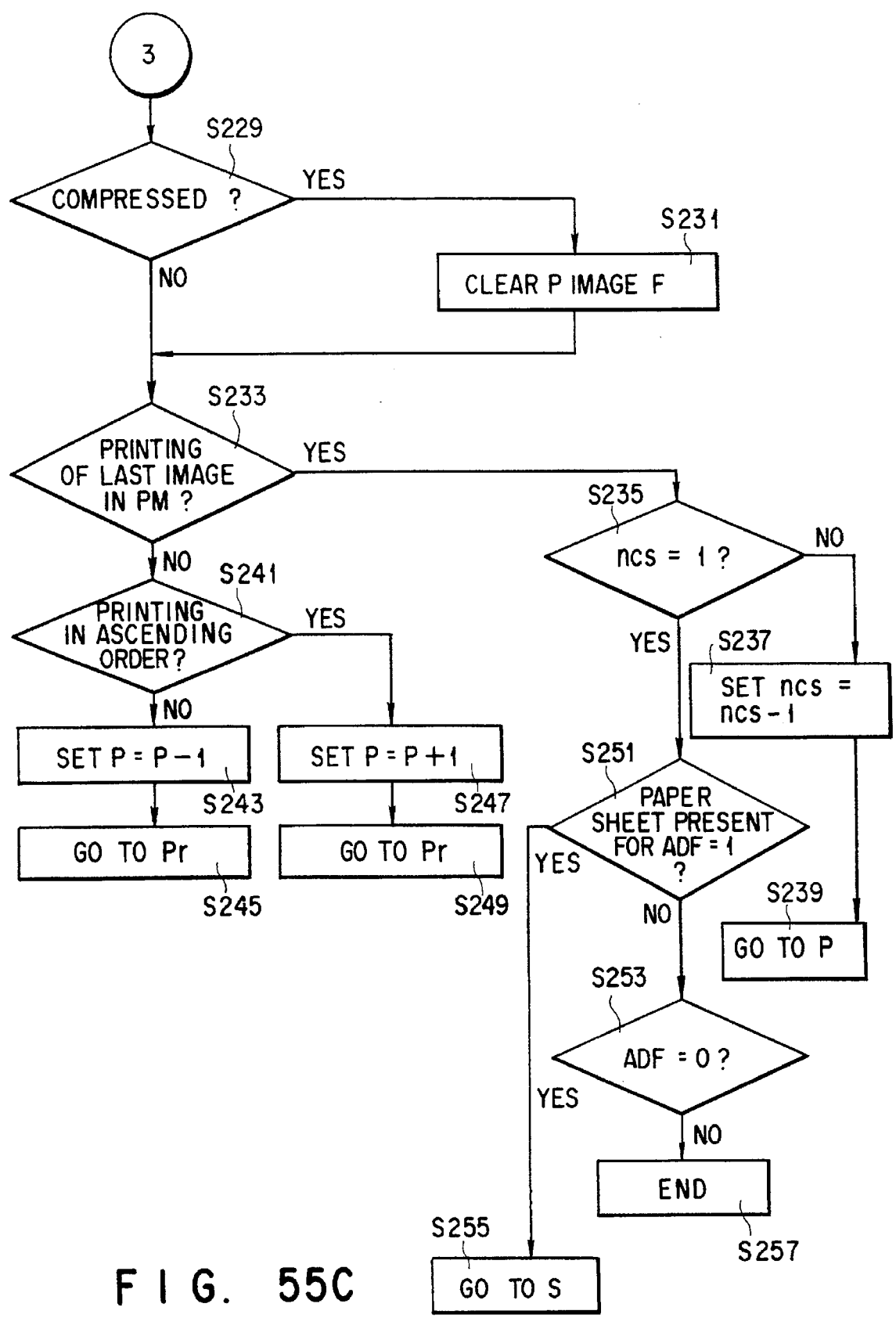
Figure 56:
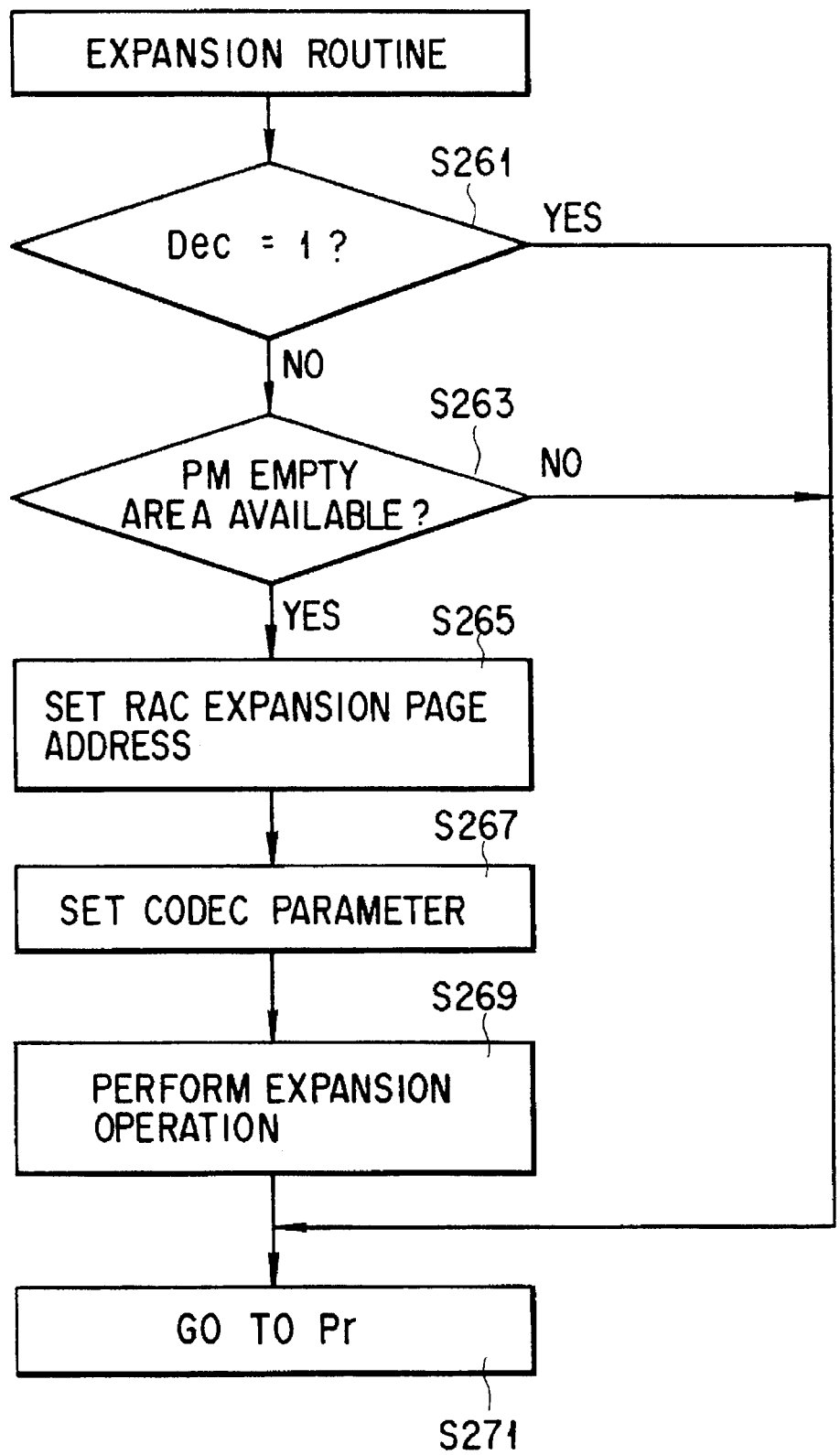
FIG. 56 is a flow chart for explaining an expansion routine as one of the reproduction operations of the image forming/storage apparatus according to the present invention.
Figure 58:
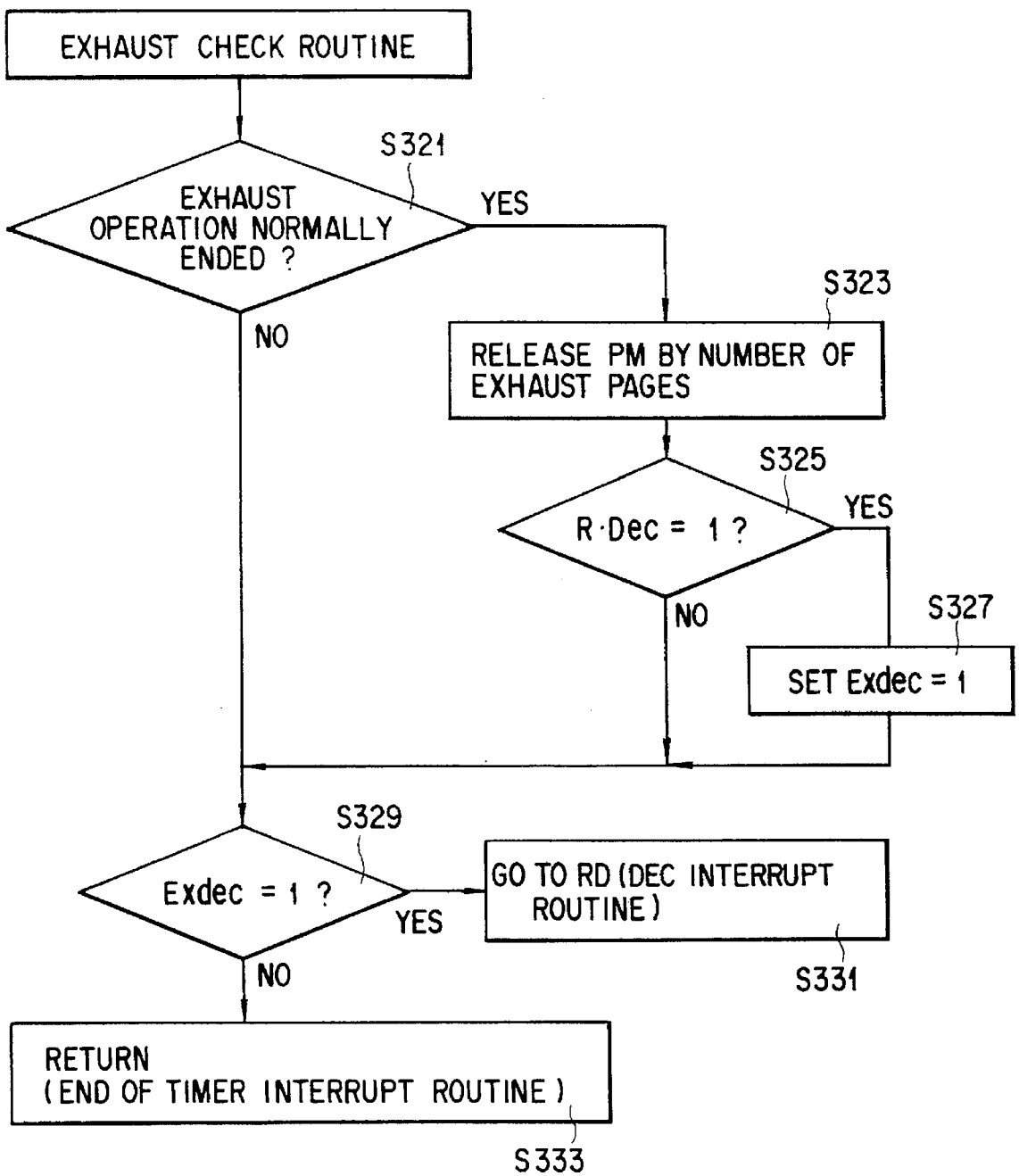
FIG. 58 is a flow chart for explaining an exhaust check routine as one of the reproduction operations of the image forming/storage apparatus according to the present invention.

The flow charts for explaining the above operations are shown in FIGS. 52A to 58. FIGS. 52A to 52E are the chart charts for explaining reproduction operations of the image forming/storage apparatus according to the present invention. FIG. 53 is the flow chart for explaining a compression routine as one of the reproduction operations of the image forming/storage apparatus of the present invention. FIGS. 54A and 54B are the flow charts for explaining a COD interrupt routine as one of the reproduction operations of the image forming/storage apparatus of the present invention. FIGS. 55A to 55C are the flow charts for explaining a print routine as one of the reproduction operations of the image forming/storage apparatus of the present invention. FIG. 56 is the flow chart for explaining an expansion routine as one of the reproduction operations of the image forming/storage apparatus of the present invention. FIG. 57 is the flow chart for explaining a DEC interrupt routine as one of the reproduction operations of the image forming/storage apparatus of the present invention. FIG. 58 is the flow chart for explaining an exhaust check routine as one of the reproduction operations of the image forming/storage apparatus of the present invention.

These routines will be described with reference to the corresponding flow charts.

In the flow charts for explaining reproduction operations of the image forming/storage apparatus of the present invention in FIGS. 52A to 52E, first of all, the operator sets various conditions for a copy mode before PPC scanning using the scanner 13 is performed. More specifically, a two- or one-side original or copy sheet is selected, the vertical direction of an original is set, the binding direction of a copy sheet is set, an operation with or without a stapler unit is set, rotation outputs in the electronic sorting function are selected, and the number of print sets is set.

It is then determined whether the start button is depressed (S5) and whether ADF sheet is present (S7).

If YES in steps S5 and S7, an ADF paper feed flag is set (S23) to feed an original and detect its size (S25). It is then determined in step S27 whether a two-side original mode is set. If NO in step S27, an original is simply fed (S29), and the page number is set as P=m+1 (S31). If YES in step S27, the original is reversed and fed to set the last lower-surface page, and P=2n+1 is set (S35).

If an ADF sheet is absent, a manual paper feed flag is set (S9). It is determined in step S13 whether an original is present. If NO in step S13, the page number is set as P=0 (S15). The direction of the page memory (PM) for the binary/multivalue data, IDC, BIX, and RAC is set (S17). When this routine is executed for the second and subsequent cycles, it is determined whether a page memory empty area is available (S19). If NO in step S19, control is shifted to the print routine (S20). However, if a memory is available for the routines of the first cycle and the second or subsequent cycle, a page PM for storing a scanned image or images in the page memory is assured, and RAC is set (S21). It is determined whether ADF=1 is set (S37). It is determined whether the ADF paper feed flag is set as ADF=1 (S37). If YES in step S37, P=P−1 is set because scanning is performed in the descending order (S41). However, if NO in step S37, P=P+1 is set because scanning is performed in the ascending order (S39).

It is determined whether printing is performed simultaneously with scanning (S43). If NO in step S43, scanning is immediately performed (S55). If YES in step S43, it is determined whether conditions for determining whether the reproduction order is identical to the read order and whether printing with rotation is required are OK (S45). If NO in step S45, scanning simultaneous with printing is canceled, and scanning is immediately performed; otherwise, printing hardware for performing printing simultaneous with scanning is set in IDC (S47) to start the printer (S49). If the printer is ready, a command is output to set printer conditions (S53). When the scanner is operated, the printer automatically starts a printing operation and prints an image in accordance with image data from the scanner.

An original is then scanned (S55) to determine whether the image is to be compressed (S57). If YES in step S57, control is shifted to the compression routine (S59); otherwise, it is determined whether a PM empty area is available (S61). If NO in step S61, control is shifted to the print routine (S63). If YES in step S61, the ADF paper feed flag=1 is determined (S65). If YES in step S65, it is determined whether a two-side copy mode is set (S67). If YES in step S67, it is determined whether the next copy cycle is for an odd-numbered page (S69). If YES in step S69, the original is reversed, and the flow returns to the ST in FIG. 52A (S73). If NO in step S69, it is determined whether the next original is present (S75). If YES in step S75, an original is fed (S77). In addition, it is determined whether a two-side copy mode is set (S79). If YES in step S79, the original is reversed (S87), and the flow returns to the S in FIG. 52A (S89). When a two-side original is fed from the ADF, the odd-numbered pages of the originals are generally fed from the last page. In addition, the reverse operation is performed because the lower surface becomes the last page. This is caused by the mechanical structure of the ADF.

If NO in step S75, scanning is ended. At this time, it is determined whether scanning is performed simultaneously with printing (S81). If YES in step S81, nsc −1 is set (S83) to reduce the number of sets. The original is exhausted, and control is then shifted to the print routine (S85).

If the ADF paper feed flag is determined in step S65 not to be 1, in order to manually set each original, it is determined again whether the start button is depressed for each scanned page (S91). If YES in step S91, the original size is detected (S93) to determine whether the detected original size coincides with the set original size (S101). If NO in step S101, the magnification is changed (S101), and the flow returns to the ST in FIG. 52A (S103).

If YES in step S99, it is determined whether an original is present (S105). If YES in step S105, the flow returns to the S in FIG. 52A to scan the original again; otherwise, a message representing that no original is detected is displayed (S107), and control is shifted again to the R in FIG. 52E (S111).

In the flow chart for explaining the compression routine in FIG. 53, it is determined whether the compression page counter is set as PC=0 (S121). PC=P (scanned page number) is set (S123). It is determined whether Cod=1 is set (S127). If YES in step S127, the flow returns to the main routine (S137). If NO in step S127, it is determined whether an uncompressed page is present (S129). If NO in step S127, the flow returns to the main routine (S137). However, if YES in step S127, it is determined whether a code empty area of the page memory is available (S131). If YES in step S131, an RAC page read address is set, an RAC compression code write address is set, and a CODEC parameter is set (S133). Cod=1 is set (S134), the compression operation is started (S135), and the flow returns to the main routine (S137). The compression/expansion LS2.CODEC generates an interrupt at the end of operation.

In the flow charts for explaining the compression operation, i.e., the COD interrupt routine in FIGS. 54A and 54B, first of all, it is determined whether an operation is normally ended (S141). If NO in step S141, E=1 is set (indicating an error), and the flow returns to the main routine (S147). However, if YES in step S141, all the Codes (compression symbol) are read (S143) to update file management data (S149). It is determined whether ADF=1 is set (S151). If NO in step S151, it is determined in the manual original input mode whether PC="last page" is set (S155). If YES in step S151, it is determined in the ADF original feed mode whether PC="first page" is set (S153). If YES in step S153, Cod=0 is set to stop operating the Codec (S157) to end compression. The flow returns to the main routine (S165). If NO in step S153, PC=PC−1 is set in the counter updating operation (S161).

If NO in the decision block to determine in the manual original input mode whether the PC="last page" is set (S155), PC=PC+1 is set (S159).

It is determined whether an uncompressed page is present (S163). If NO in step S163 until the read operation cannot be performed due to a shortage of the PM capacity although an original is present, Cod=0 is set (S169), and the flow returns to the main routine (S175). However, if YES in step S163, it is determined whether a PM code empty area is available (S165). If YES in step S165, an RAC compression page address is set as a preparation for compressing the next page (S167). The CODEC parameter is set (S171), and the compression operation is started (S173). The flow then returns to the main routine (S175).

In the flow charts for explaining the print routine in FIGS. 55A to 55C, first of all, the printer is started as a preliminary operation (S181). It is determined whether printing in an ascending order is performed (S183). If NO in step S183, the maximum value of a page is detected and defined as p (S185). If YES in step S183, the minimum value of the page is detected and defined as p (S187). It is determined whether compression is performed (S189). If YES in step S189, pd=p is set in the expansion counter (S191). Control is shifted to the expansion routine (S193). After the expansion routine, it is determined whether the printing pages are ready (S197). If NO in step S197, control is shifted to the expansion routine (S199). However, if YES in step S197, it is determined whether two-side printing is performed (S201). In printing in the ascending order, odd-numbered pages are supplied to the two-side unit, and even-numbered pages are recorded on the lower surfaces of the sheets from the two-side unit. In printing in the descending order, the even-numbered pages are supplied to the two-side unit, and the odd-numbered pages are recorded on the lower surfaces of the sheets from the two-side pages. The last odd-numbered page in printing in the ascending order is reversed using the reverse unit and exhausted (S209).

If printing with rotation is performed in step S219, IDC rotation is set (S221), and parameters are set in RAC, BIX, and IDC (S223). The start address and the readout direction are set (S225), and page printing is performed (S227).

It is determined whether compression is performed (S229). The image F of the printed page p is cleared (S231). If the image is not compressed, exhaust processing is determined to be OK, and the image is cleared. It is then determined whether an image is the last image in the PM (S233). If NO in step S233, the number of pages is updated to set p=p+1 so as to perform printing in the ascending order (S247). However, if printing is to be performed in the descending order, p=p−1 is set (S243). The image data is transferred to Pr to continue subsequent printing.

If YES in step S233 and the page is determined to be the last page, it is determined whether the number of sets is set to ncs=1 (S235), thereby checking whether printing for the designated number of sets has been completed. If YES in step S235, it is determined whether ADF=1 is set to perform scanning, provided that an original to be scanned is present (S251). If YES in step S251, the flow returns to the S in FIG. 52B (S255). If NO in step S251, it is determined whether ADF=0 is set (S253). If YES in step S253, the flow returns to the S in FIG. 52B (S255); otherwise, the flow is ended because a series of processes are completed (S257).

If nsc=1 is not set in step S235, nsc=nsc−1 is set to print the remaining sets (S237). Control is shifted to the remaining print routine (P).

In the flow chart for explaining the expansion routine in FIG. 56, first of all, it is determined whether a CODEC in-operation flag Dec=1 is set (S261). If YES in step S261, the CODEC is in operation, and control is shifted to the print routine; otherwise, it is determined whether a PM empty area is available. An RAC expansion page address is set (S265). A CODEC parameter is set (S267), and an expansion operation is performed (S269). Finally, the flow returns to the print routine Pr (S271).

In the flow chart for explaining the expansion DEC interrupt routine in FIG. 57, it is determined whether an operation is normally ended in the CODEC interrupt (S287). If NO in step S287, E=1 is set (the operation is processed as an error) (S283), and the flow returns to the main routine (S285). If YES in step S287, in order to obtain a next expansion page, it is then determined whether printing in the ascending order is performed (S287), and pd=pd+1 is set (S293). If NO in step S287 and printing is determined to be performed in the descending order, it is determined whether pd=1 is set (S291). If NO in step S291, pd=pd−1 is set (S295). In either case, if the page is the last or first page, it indicates the end of expansion, so that Dec=0 is set, and the flow returns to the main routine.

It is determined whether a PM empty area is available (S299). The RAC expansion page address is set (S305), and the CODEC parameter is set (S307). After the expansion operation is completed (S311), the flow returns to the main routine (S313).

If NO in step S299, Dec=0 is set (S309), and the flow returns to the main routine (S313).

Finally, in the flow chart for explaining the exhaust check routine in FIG. 58, it is determined whether an exhaust operation is normally ended (S321). If YES in step S321, the PM area corresponding to the number of exhausted pages is released (S323). It is then determined whether a flag representing the presence/absence of a nonprinted, unexpanded page, i.e., R·Dec is determined to be R·Dec=1 (S325). If YES in step S325, Exdec=1 is set (S327). It is determined whether Exdec=1 is set (S329). If YES in step S329, control is shifted to the DEC interrupt routine (S331) to start expansion. However, if NO in step S329, the timer interrupt routine is ended and returns to the main routine (S333).

As has been described above, the image forming apparatus of the present invention uses an image memory copy function and a rotation function to perform appropriate operations corresponding to a given copy mode, thereby realizing an electronic sorting function without preparing a mechanical sorter mechanism. That is, in copying original images as a plurality of pages to obtain a predetermined number of sets, each set is obtained, and the next set is rotated and exhausted onto the exhaust tray, so that two adjacent sets of copy sheets are exhausted and stacked in the vertical and lateral directions, respectively.

In the image forming apparatus of the present invention, in realizing the above electronic sorting function, special operations such as a normal reduction/enlargement operation can be simultaneously performed.

In automatic binding of copy sheets constituting a plurality of sets by a stapler unit of a finisher in units of sets using the sorting function, these copy sheets must have an appropriate staple position. That is, the upper left corner of each copy sheet must be generally located at the position of the stapler unit. In the above case, the image forming apparatus of the present invention appropriate rotate and copy memory images of the original images. The original images are printed and exhausted with appropriate orientations and orders such that the staple positions of the portrait and landscape copy sheets are located at the optimal positions. More specifically, when stapling is to be performed by a front-side stapler unit (88 in FIG. 2B), the landscape sheets (205) must be printed and exhausted such that the front side of the original is defined as the upper end, and the images are printed in an order from page N to page 1 with upper surfaces facing the ceiling. The portrait sheets (203) must be printed and exhausted such that the front side of the original is defined as the left side, and the images are printed in an order from page 1 to page N with upper surfaces facing the ground. In consideration of the conditions required by the copy modes in response to the demands on the finisher side, the image forming apparatus of the present invention appropriately rotates and copies original images and exhausts the copy originals with appropriate orientations and orders, thereby realizing automatic stapling.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An image forming apparatus comprising:

means for binding a plurality of to-be-outputted image forming mediums in a predetermined position of the image forming mediums;

means for reading out a plurality of image data of a plurality of originals;

means for storing the plurality of image data;

means for automatically rotating and storing the plurality of image data to cause the binding means to bind the plurality of image forming mediums in the predetermined position;

means for, when vertical directions of the plurality of image data of the plurality of originals alternately differ, rotating the plurality of image data of the plurality of originals to make the vertical directions thereof uniform; and means for reading out and forming the plurality of image data, which have been rotated, on the plurality of image forming mediums.

2. An image forming apparatus comprising:

means for binding a plurality of to-be-outputted image forming mediums in a predetermined position of the image forming medium;

means for reading out a plurality of image data of a plurality of originals;

means for storing the plurality of data;

means for automatically rotating and storing the plurality of image data to cause the binding means to bind the plurality of image forming mediums in the predetermined position;

means for rotating the plurality of image data to make the vertical directions thereof uniform when vertical directions of the plurality of image data of the plurality of originals rotating alternately differ;

means for forming the plurality of image data, which have been rotated, on the plurality of image forming mediums;

means for reading out the plurality of image data from the storing means in a first order, for reading out the plurality of image data from the storing means in a second order opposite to the first order, and for forming the image data on the plurality of image forming mediums, when carrying out binding process and electronic sorting process; and electronic sorting process means for outputting the plurality of image forming mediums arranged in groups of a predetermined number in a first direction in the first order and for outputting the plurality of image forming mediums in a second direction perpendicular to the first direction in the second order opposite to the first order using the image forming means.

3. An image forming apparatus comprising:

an original table for supporting a plurality of originals thereon;

original convey means for sequentially conveying each one of the plurality of originals on the original table;

means for reading an image from one of a plurality of originals placed on the original table;

means for storing a plurality of images read by the reading means;

means for designating image formation of a plurality of sets of image forming mediums for the plurality of originals;

means for sequentially reading out the images stored in the storing means;

means for controlling the reading out means so as to perform a first reading operation for reading out the images from the storing means in an image storage direction of the storing means and a second reading operation for reading out the images from the storing means through 90° in units of the sets each constituted by a plurality of image forming mediums;

means for supplying image forming media mediums having different supply directions for each plurality of originals in accordance with a designation from the designating means; and means for forming, for each set, images, sequentially read out by the reading means in accordance with the first and second reading operation of the controlling means, on the image forming medium having the different supply directions and supplied from the supply means, reconveying means for conveying image forming mediums from the image forming means to the image forming means again;

means for causing the image forming means to form image data read out from the readout means on the other surface of the original image forming medium conveyed by the reconvey means;

first determining means for determining whether an original on the original table is an original conveyed by the original convey means or an original directly placed on the original table;

second determining means for determining whether an original is a two-side original when conveyance of the original from the original convey means is determined by the first determining means;

third determining means for determining whether a vertical direction of the two-side original image is rotated at a right angle with respect to the binding direction;

fourth determining means for determining whether the image formation is performed on one or both of surfaces of the image forming mediums;

fifth determining means for determining whether the vertical direction of the image forming medium is aligned with the binding direction in two-side image formation; and means for selecting whether an operation for reading out image data in the storing means in the data storage direction of the readout means and an operation for reading out the image data rotated a half turn are alternately switched for each page of the image data readout by the readout means when an image is to be formed on an image forming medium rotated through 90° with respect to a conveying direction of the original image.

4. An apparatus according to claim 3, further comprising:

sixth determining means for determining whether an initial readout state of the readout means represents a state rotated clockwise through 90° or a state rotated counterclockwise through 90°, the selecting means performing selection also in consideration of a determination result of the sixth determining means.

5. An apparatus according to claim 3, further comprising:

means for determining whether an original placed on the original table is the original conveyed by the original convey means or the original directly placed on the original table; and means for selecting, of all pages stored in the storing means, an operation for reading out images from the storing means in a storage order or an operation for reading out the images from the storing means in a reverse order compared with the storage order.

6. An image forming apparatus comprising:

an original table for supporting a plurality of originals thereon;

original convey means for sequentially conveying each one of the plurality of originals on the original table;

means for reading an image from one of the originals placed on the original table;

means for storing a plurality of images read by the reading means;

means for designating image formation of a plurality of sets of image forming mediums for the plurality of originals;

means for binding the image forming mediums in units of the sets;

means for sequentially reading out the images stored in the storing means;

means for controlling the reading out means so as to perform a first reading operation for reading out the image from the storing means in an image storage direction of the storing means and a second reading operation for reading out the image from the storing means through 90° in units of the sets each constituted by a plurality of image forming mediums;

means for supplying image forming mediums having different supply directions for each plurality of originals in accordance with a designation from the designating means;

switching means for switching the readout order of the readout means, for all pages stored in the storing means, between an order of reading out the image from the storing means in the storage order and an order of reading out the image in a reverse order in comparison with the storage order so as to match a vertical direction of the original image with a binding direction of the binding means, and the supply direction of the image forming medium with the binding direction of the binding means; and means for forming, for each set, images, sequentially read out by the readout means in accordance with the first and second reading operation of the controlling means, on the image forming mediums having the different supply directions and supplied from the supply means.

7. An apparatus according to claim 6, further comprising:

reconveying means for conveying an image forming medium from the image forming means to the image forming means again;

means for causing the image forming means to form image data read out from the readout means on the other surface of the image forming medium conveyed by the reconvey means;

means for exhausting an image forming medium which has undergone the image formation;

means for binding a plurality of image forming media exhausted by the exhausting means;

means for designating whether the binding means is used;

first determining means for determining whether an original on the original table is an original conveyed by the original convey means or an original directly placed on the original table;

second determining means for determining whether an original is a two-side original when conveyance of the original from the original convey means is determined by the first determining means;

third determining means for determining whether a vertical direction of the two-side original image is rotated through 90° with respect to the binding direction;

fourth determining means for determining whether the image formation is performed on one or both surfaces of the image forming medium;

fifth determining means for determining whether the vertical direction of the image forming medium is aligned with the binding direction in two-side image formation;

first selecting means for selecting whether an operation for reading out image data in the data storage direction of the readout means and an operation for reading out the image data rotated a half turn are alternately switched for each page in read access of the image data by the readout means in accordance with determination results of the first to fifth determining means and whether the binding means designated by the designating means is used;

second selecting means for selecting whether an operation for reading out image data clockwise through 90° with respect to the data storage direction of the readout means and an operation for reading out the image data counterclockwise through 90° are alternately switched for each page in read access of the image data by the readout means in accordance with determination results of the first to fifth determining means and whether the binding means designated by the designating means is used; and means for selecting, of all pages stored in the storing means, an operation for reading out images from the storing means in a storage order or an operation for reading out the images from the storing means from a last image in accordance with the determination results of the first to fifth determining means and whether the binding means designated by the designating means is used.

8. An apparatus according to claim 6, further comprising:

reconveying means for conveying an image forming medium from the image forming means to the image forming means again;

means for causing the image forming means to form image data read out from the readout means on the other surface of the original image forming medium conveyed by the reconveying means;

first determining means for determining whether an original on the original table is an original conveyed by the original convey means or an original directly placed on the original table;

second determining means for determining whether an original is a two-side original when conveyance of the original from the original convey means is determined by the first determining means;

third determining means for determining whether a vertical direction of the two-side original image is rotated through 90° with respect to the binding direction;

fourth determining means for determining whether the image formation is performed on one or both of surfaces of the image forming medium;

fifth determining means for determining whether the vertical direction of the image forming medium is aligned with the binding direction in two-side image formation; and means for selecting whether an operation for reading out image data stored in the data storage direction of the readout means and an operation for reading out the image data through 180° are alternately switched for each page in read access of the image data by the readout means in accordance with the determination results of the first to fifth determining means.

9. An image forming apparatus for forming original images of first mediums having a vertical direction on second mediums selected a plurality of predetermined specifications, comprising:

first means for determining whether a sorting mode for repeatedly forming, by a predetermined number of sets, a plurality of the second mediums on which the original images on a plurality of the first mediums are formed is selected;

second means for determining a specific one of the plurality of predetermined specifications;

means for scanning the original image on the first medium, the scanning means scanning the original images on which of the plurality of the first mediums if the first determining means determines that the sorting mode is selected;

means for storing the original image obtained by the scanning means, the storing means storing each of the plurality of original images if the first determining means determines that the sorting mode is selected;

means for binding one end of each of a plurality of the second mediums having images formed thereon and oriented the same so that each one of the plurality of second mediums are all bound together with the images thereon in the same direction;

third means for determining an angular difference in the binding direction of the binding means and the vertical direction of the original image in the storing means if the first determining means determines that the sorting mode is selected;

fourth means for determining an angular difference of 90° for each set upon formation of the original images on the second mediums constituting the predetermined number of sets of image forming mediums and determining a rotation angle of the original image in the storing means so as to eliminate the angular difference determined by the third determining means in correspondence with the predetermined specification determined by the second determining means and selected from the plurality of predetermined specifications if the first determining means determines that the sorting mode is selected;

means for reading out the original image in accordance with the rotation angle determined by the fourth determining means if the first determining means determines that the sorting mode is selected;

means for determining a readout order of the original image stored in the storing means regardless of a storage order, the readout order being determined such that copy results are bound in the same direction when the vertical directions of the original images are aligned with the images thereon in the same direction and the copy results are bound by the binding means; and means for forming the original image stored in the storing means on the second mediums in accordance with the readout order determined by the readout order determining means, thereby causing the forming means to form the second mediums having the original images formed in the same direction and constituting the predetermined number of sets respectively having the angular difference of 90° so as to correspond to the predetermined specification determined by the second determining means and selected from the plurality of predetermined specifications and match the binding direction of the binding means if the first determining means determines that the sorting mode is selected.

* * * * *